(12) United States Patent
Okawa et al.

(10) Patent No.: US 9,748,614 B2
(45) Date of Patent: Aug. 29, 2017

(54) BATTERY TEMPERATURE REGULATING DEVICE

(75) Inventors: Hideaki Okawa, Kariya (JP); Hiroshi Kishita, Anjo (JP); Yasumitsu Omi, Okazaki (JP); Masayuki Takeuchi, Nukata-gun (JP); Nobuharu Kakehashi, Toyoake (JP); Kouji Miura, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 634 days.

(21) Appl. No.: 14/002,060

(22) PCT Filed: Apr. 5, 2012

(86) PCT No.: PCT/JP2012/002389
§ 371 (c)(1),
(2), (4) Date: Aug. 28, 2013

(87) PCT Pub. No.: WO2012/144148
PCT Pub. Date: Oct. 26, 2012

(65) Prior Publication Data
US 2014/0038009 A1 Feb. 6, 2014

(30) Foreign Application Priority Data

Apr. 18, 2011 (JP) .................................. 2011-91849

(51) Int. Cl.
*H01M 10/50* (2006.01)
*H01M 10/63* (2014.01)
(Continued)

(52) U.S. Cl.
CPC ....... *H01M 10/502* (2013.01); *H01M 10/486* (2013.01); *H01M 10/617* (2015.04);
(Continued)

(58) Field of Classification Search
None
See application file for complete search history.

(56) References Cited

U.S. PATENT DOCUMENTS 7,061,208 B2 6/2006 Nishihata et al.
2012/0295142 A1* 11/2012 Yan ..................... H01M 6/5038
429/62

FOREIGN PATENT DOCUMENTS

DE WO 2011057853 A1 * 5/2011 .......... H01M 6/5038
JP 8-251714 9/1996
(Continued)

OTHER PUBLICATIONS

Office Action dated Dec. 18, 2015 in corresponding Chinese Application No. 201280018893.1.
(Continued)

*Primary Examiner* — Patrick Ryan
*Assistant Examiner* — Haixia Zhang
(74) *Attorney, Agent, or Firm* — Harness, Dickey & Pierce, P.L.C.

(57) ABSTRACT

A battery temperature regulating device is applied to a battery pack configured by parallely connecting battery groups, each of which is a series connection of battery cells capable of charge and discharge. The device regulates temperatures of the battery groups. The battery temperature regulating device includes a heat transfer unit that transfers heat of a part of the battery groups to another battery group.

13 Claims, 36 Drawing Sheets

(51) Int. Cl.
*H02J 7/04* (2006.01)
*H01M 10/48* (2006.01)
*H01M 10/6569* (2014.01)
*H01M 10/6555* (2014.01)
*H01M 10/617* (2014.01)
*H01M 10/44* (2006.01)
*H01M 10/625* (2014.01)

(52) U.S. Cl.
CPC ... *H01M 10/6555* (2015.04); *H01M 10/6569* (2015.04); *H02J 7/047* (2013.01); *H01M 10/443* (2013.01); *H01M 10/625* (2015.04)

(56) References Cited

FOREIGN PATENT DOCUMENTS

| JP | 2001-23703 A | 1/2001 |
|---|---|---|
| JP | 3644241 B2 | 2/2005 |
| JP | 3781366 B2 | 3/2006 |
| JP | 4029351 B2 | 10/2007 |
| JP | 2010-22151 A | 1/2010 |
| JP | 2010-44895 A | 2/2010 |
| JP | 2011-217487 A | 10/2011 |

OTHER PUBLICATIONS

Office action dated Jul. 29, 2014 in corresponding Japanese Application No. 2011-091849.
International Search Report and Written Opinion of the ISA with English translations for PCT/JP2012/002389, ISA/JP, mailed Jul. 10, 2012.
Office action dated Jan. 28, 2014 in corresponding Japanese Application No. 2011-091849.
Office action dated May 12, 2015 in corresponding Chinese Application No. 2012 80018893.1.

\* cited by examiner

BATTERY TEMPERATURE REGULATING DEVICE

CROSS REFERENCE TO RELATED APPLICATION

This application is a 371 U.S. National Stage of International Application No. PCT/JP2012/002389, filed Apr. 5, 2012, which is based on Japanese Patent Application No. 2011-91849 filed on Apr. 18, 2011, the disclosures of which are incorporated herein by reference.

TECHNICAL FIELD

The present disclosure relates to a battery temperature regulating device configured by parallely-connecting battery groups, which are formed as a result of series-connection of battery cells that can perform discharge and charge.

BACKGROUND ART

Conventionally, there are proposed various battery temperature regulating devices that can regulate a temperature of a battery group formed as a result of series-connection of battery cells that can perform discharge and charge (see, for example, Patent documents 1 to 3).

Specifically, in Patent document 1, there is disclosed a proposal to flow a charging current through a resistance for equalized charge and to use heat energy produced in the resistance for the temperature rising of the battery group in order to quickly raise the temperature of the battery group.

To limit a variation in capacity of electricity stored SOC (state of charge) in each second battery due to temperature variation between secondary batteries constituting a battery group, a proposal to limit a charging power of the secondary battery to a predetermined power that is not dependent on temperature in a case of a great temperature difference between the secondary batteries is disclosed in Patent document 2.

In Patent documents 3, there is disclosed a proposal that a cell discharge current is made larger than a cell group discharge current to limit unnecessary discharge from a battery cell at the time of equalization of the battery cells constituting a battery group.

However, in the above-described Patent documents 1-3, a configuration for performing charge/discharge and temperature regulation of each battery cell in a battery group by series-connection of the battery cells is only disclosed. There is no consideration of charge/discharge and temperature regulation carried out for each battery group in a battery pack configured by parallely-connecting the battery groups.

On the other hand, in Patent application No. 2010-82219 (hereinafter referred to as an earlier application example), the inventors have previously proposed, for example, a battery control system that can perform charge/discharge and temperature regulation for each battery group in a battery pack.

Specifically, the earlier application example includes a first switching means that switches into a state in which charge/discharge is possible for each battery group, a second switching means that switches into a state in which temperature regulation is possible for each battery group, and a control means that controls the first switching means and the second switching means. In accordance with the temperature and capacity of stored electricity of each battery group, charge/discharge and temperature regulation of each battery group are switched by the control means.

However, in the earlier application example, there is an issue that a large amount of energy (e.g., heat energy) needs to be given from the outside every time the temperature regulation is carried out for each battery group and it is difficult to save energy.

PRIOR ART DOCUMENTS

Patent Documents

Patent document 1: Japanese Patent No. 3644241
Patent document 2: Japanese Patent No. 3781366
Patent document 3: Japanese Patent No. 4029351

SUMMARY

It is an object of the present disclosure to provide a battery temperature regulating device that can regulate temperature of each battery group with an increase in an amount of energy given from an outside limited when regulating a temperature of a battery pack.

To achieve the above object, in a mode of the present disclosure, a battery temperature regulating device is adapted for a battery pack that is configured by parallely connecting a plurality of battery groups, each of which is a series connection of a plurality of battery cells capable of charge and discharge. The device is configured to regulate temperatures of the plurality of battery groups and includes a heat transfer means for transferring heat of a part of the plurality of battery groups to another part of the plurality of battery groups.

Accordingly, by efficient use of the heat of a part of the battery groups, temperature of another battery group can be regulated. As a result, temperature of each battery group can be regulated with an increase in the amount of energy given from the outside limited.

Moreover, for example, the part of the plurality of battery groups includes at least one of a currently-used one of the plurality of battery groups, and an already-used one of the plurality of battery groups. The another part of the plurality of battery groups includes one of the plurality of battery groups that is to be subsequently-used.

Accordingly, of the battery groups, the heat of the battery group being used, or the already used battery group is transferred to the battery group that is to be subsequently used. As a result, the heat of the battery group being used or the already used battery group can be efficiently used. "Use" of the battery group does not only mean discharge, but it also includes a meaning of charge.

Furthermore, the battery temperature regulating device may further include a use battery determination means for determining one of the plurality of battery groups that is to be subsequently-used. The use battery determination means determines one of the another part of the plurality of battery groups having the largest amount of heat that is exchanged with the part of the plurality of battery groups to be the one of the plurality of battery groups that is to be subsequently-used. Accordingly, the battery group having the larger amount of heat that is exchanged with a part of the battery groups can be used preferentially.

In addition, for example, the part of the plurality of battery groups includes a currently-used one of the plurality of battery groups. The another part of the plurality of battery groups includes one of the plurality of battery groups having a larger amount of stored electricity than the currently-used one of the plurality of battery groups. When an amount of electricity stored in the part of the plurality of battery groups becomes smaller than a predetermined reference amount, the heat transfer means transfers the heat of the part of the plurality of battery groups to the another part of the plurality of battery groups. Accordingly, the heat of the battery group being used can be transferred preferentially to the battery group with the larger amount of stored electricity.

Also, the heat transfer means may include a refrigeration cycle having an evaporation means for evaporating refrigerant, and a heat release means. The evaporation means exchanges heat between low-pressure refrigerant and the part of the plurality of battery groups via a heat medium to absorb heat from the part of the plurality of battery groups, and the heat release means exchanges heat between high-pressure refrigerant and the another part of the plurality of battery groups via a heat medium, so that the heat transfer means transfers the heat of the part of the plurality of battery groups to the another part of the plurality of battery groups. As above, by using the refrigeration cycle as the heat transfer means, the heat of a part of the battery groups can be absorbed, and the absorbed heat can be transferred to another battery group. Through the regulation of the amount of heat absorbed by the refrigerant in the evaporation means and the amount of heat released from the refrigerant in the heat release means, the amount of heat transferred from a part of the battery groups to another battery group can be controlled.

Additionally, the heat transfer means may include a thermoelectric element having a heat release part that releases heat upon energization thereof and a heat absorption part that absorbs heat upon energization thereof. The heat absorption part absorbs heat from the part of the plurality of battery groups via a heat medium. The heat release part releases heat to the another part of the plurality of battery groups via a heat medium.

As above, by use of the thermoelectric element having the heat release part and the heat absorption part as the heat transfer means, the heat of a part of the battery groups can be absorbed, and the absorbed heat can be transferred to another battery group. Through the regulation of the amount of heat absorbed by the heat absorption part of the thermoelectric element, and the amount of heat released from the heat release part of the thermoelectric element, the amount of heat transferred from a part of the battery groups to another battery group can be controlled.

Lastly, the heat transfer means may be disposed at a heat medium circuit through which a heat medium flows. The heat transfer means may include a flow passage switching means for switching a heat medium flow passage in the heat medium circuit. The flow passage switching means may be configured to be capable of switching into the heat medium flow passage for guiding the heat medium, which absorbs the heat of the part of the plurality of battery groups, into the another part of the plurality of battery groups.

Accordingly, the heat of a part of the battery groups can be transferred to another battery group via the heat medium.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
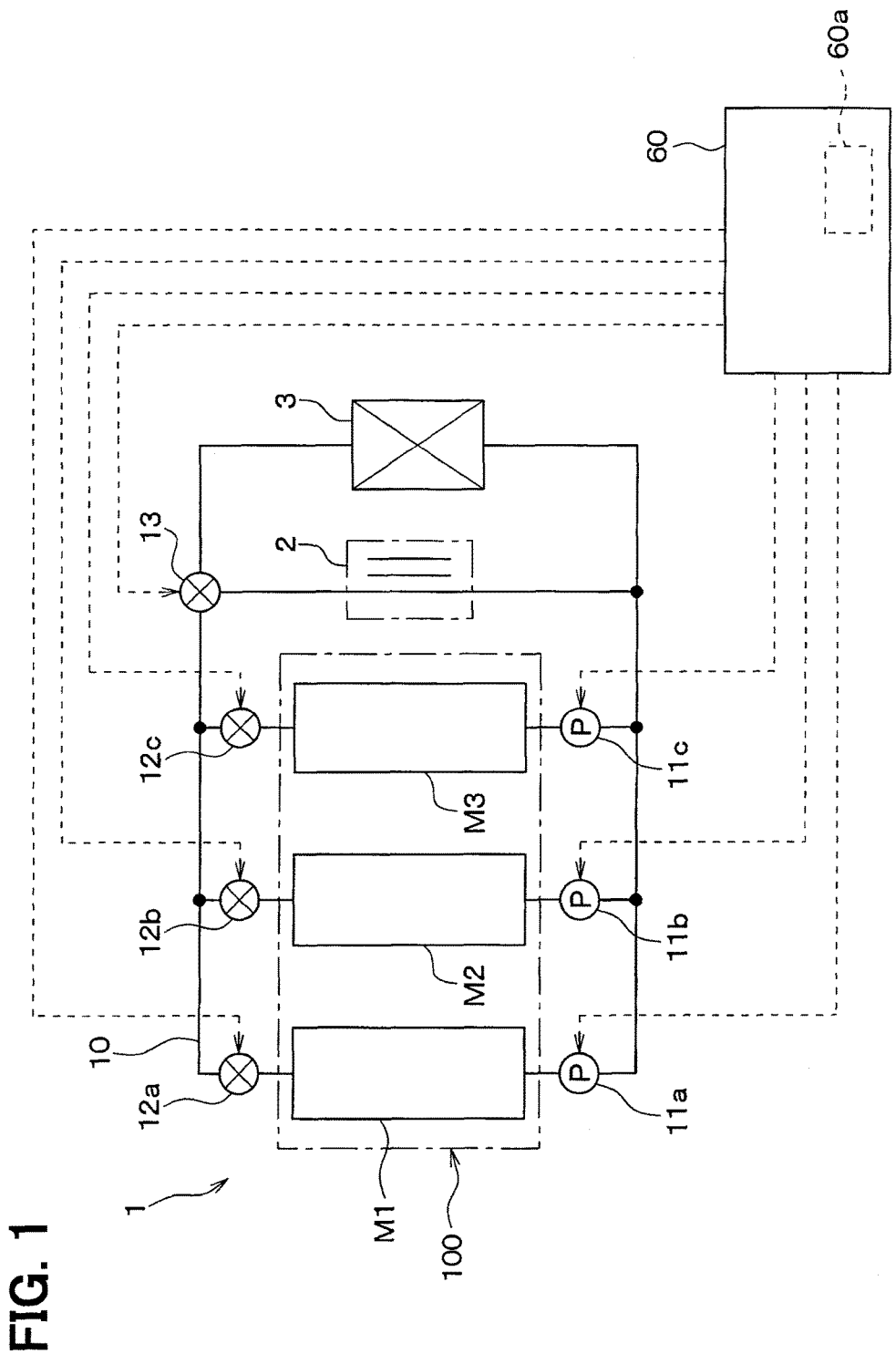
FIG. 1 is a diagram illustrating an entire configuration of a temperature regulating device in accordance with a first embodiment.

Embodiments will be described below in reference to the drawings. For the same or equivalent component in the following embodiments, its corresponding reference numeral is used in the drawings.

First Embodiment

A first embodiment will be described with reference to FIGS. 1 to 9. In the present embodiment, a temperature regulating device 1 of the present disclosure is applied to a temperature regulating means 1 that regulates temperature of a battery pack 100 disposed in a vehicle. An electric vehicle or hybrid vehicle that can travel by an electric motor (not shown) for traveling with the battery pack 100 serving as its power source is assumed for the vehicle.

As illustrated in FIG. 1, the temperature regulating device 1 of the present embodiment includes a heat medium circuit 10 parallely-connecting modules M1 to M3 in the battery pack 100, a high-temperature heat source (e.g., a heat exchange part through which high-pressure refrigerant in a refrigeration cycle for air-conditioning the vehicle interior flows; a heat exchange part through which engine coolant flows) 2, and an outdoor heat exchanger 3 that performs heat exchange between outside air and a heat medium. Water, oil, air or the like can be used for the heat medium.

Figure 2:
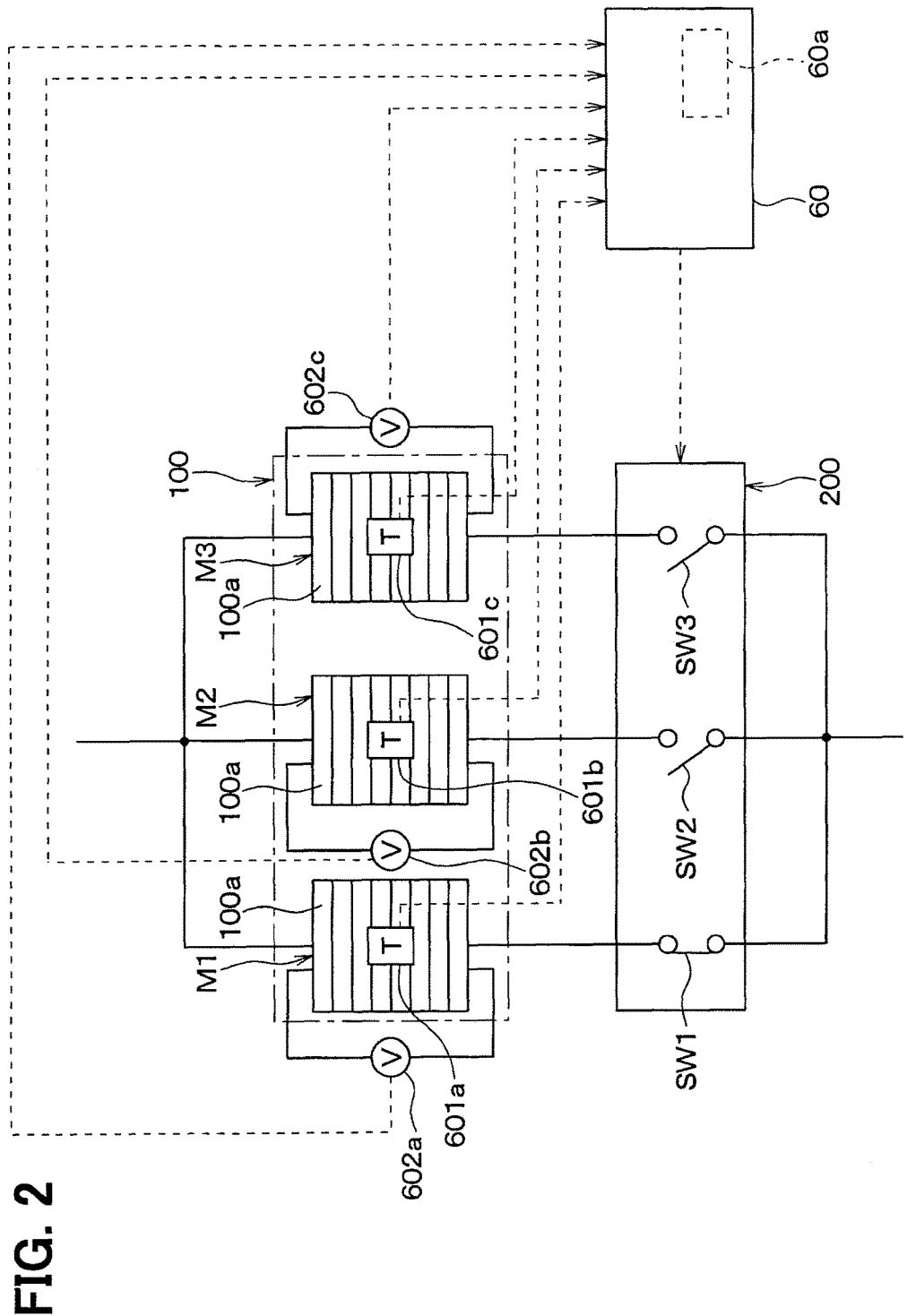
FIG. 2 is a diagram illustrating a mode of an electrical connection of battery groups in a battery pack.

As illustrated in FIG. 2, the battery pack 100 of the present embodiment is by obtained by parallely-connecting three first to third modules M1 to M3 each of which is configured by a series-connection of battery cells 100a, and serves as a high-voltage power supply which generates a predetermined high voltage required in the vehicle. The battery cell 100a which is the smallest unit of each of the modules M1 to M3 is configured by a secondary battery (e.g., lithium ion battery, lead storage battery) that can perform charge and discharge.

The battery pack 100 is connected to an inverter (not shown) through a distributor 200. This inverter converts a direct current supplied from the modules M1 to M3 of the battery pack 100 into an alternating current, and supplies (discharges) the converted alternating current into various kinds of electric loads such as the electric motor for traveling. In the present embodiment, the vehicle travel energy is reversely converted into electrical energy via a motor generator or the inverter at the time of regeneration of the vehicle. The modules M1 to M3 can be charged with the reversely converted electrical energy.

The distributor 200 includes first to third switches SW1 to SW3 provided at respective wires connecting the modules M1 to M3 and the inverter. These first to third switches SW1 to SW3 can individually perform switching between their corresponding modules M1 to M3 and the inverter. For example, the first switch SW1 is turned on, so that the first module M1 and the inverter are connected together to put the first module M1 into a state where it can perform charge and discharge. In this case, the second and third switches SW2 and SW3 are turned off, so that the second and third modules M2, M3 are in a state where they cannot perform charge or discharge. The switches SW1 to SW3 are connected to a control device 60 which will be described in greater detail hereinafter and their switchings are controlled based on an output signal from the control device 60.

Battery temperature sensors (battery temperature detection means) 601a to 601c that detect battery temperatures, voltage sensors 602a to 602c that detect voltages of the modules M1 to M3, and so forth are provided for the modules M1 to M3 of the battery pack 100. These sensors 601a to 601c, and 602a to 602c are connected to the control device 60 which will be described below to output detecting signals (detection values) into the control device 60.

With reference back to FIG. 1, heat medium passages (not shown) through which a heat medium flows are formed inside the modules M1 to M3 of the battery pack 100. Heat is exchanged between the modules M1 to M3 and the heat medium via the heat medium passages.

At the heat medium circuit 10 on one end sides of the modules M1 to M3 (one end side in a stacking direction of the battery cells 100a), there are arranged first to third heat medium pumps (heat medium pressure-feeding means) 11a to 11c that pressure-feed the heat medium into the heat medium passages formed inside the modules M1 to M3.

Each of the heat medium pumps 11a to 11c is an electrically-operated pump that is constituted of a pressure-feeding mechanism, and an electric motor which drives the pressure-feeding mechanism. Operations of the electric motors of the heat medium pumps 11a to 11c are controlled by control signals outputted from the control device 60.

First to third opening and closing valves 12a to 12c for controlling inflows of the heat media into the heat medium passages formed inside the modules M1 to M3 are arranged at the heat medium circuit 10 on the other end side of the modules M1 to M3 (the other end side in the stacking direction of the battery cells 100a). Each of the opening and closing valves 12a to 12c is an electromagnetic valve whose opening and closing operation is controlled by the control signal (control voltage) outputted from the control device 60.

Heat medium flow passages in the heat medium circuit 10 can be switched through opening and closing of the first to third opening and closing valves 12a to 12c. For example, the first opening and closing valve 12a being open, and the second and third opening and closing valves 12b, 12c being closed can be switch into the heat medium flow passage through which the heat medium flows into the heat medium passage formed inside the first module M1. Accordingly, the opening and closing valves 12a to 12c of the present embodiment serve as a flow passage switching means that switches the heat medium flow passage in the heat medium circuit 10.

A flow passage switching valve 13 for switching the heat medium flow passage in the heat medium circuit 10 is disposed between the high-temperature heat source 2 and the outdoor heat exchanger 3 in the heat medium circuit 10. Operation of the flow passage switching valve 13 is controlled by the control signal (control voltage) outputted from the control device.

These flow passage switching valve 13 is configured as an electromagnetic valve having a function as an opening and closing valve that does not flow the heat medium into the high-temperature heat source 2 or the outdoor heat exchanger 3 in addition to a function as a three-way valve that switches between a flow passage through which the heat medium flows into the high-temperature heat source 2-side, and a flow passage through which the heat medium flows into the outdoor heat exchanger 3-side. In other words, the flow passage switching valve 13 switches the heat medium circuit 10 between the heat medium flow passage through which the heat medium pressure-fed by the heat medium pumps 11a to 11c flows into the high-temperature heat source 2, the heat medium flow passage through which the heat medium flows into the outdoor heat exchanger 3, and the heat medium flow passage through which the heat medium does not flow into either of the high-temperature heat source 2 and the outdoor heat exchanger 3.

Accordingly, the flow passage switching valve 13 of the present embodiment serves as the flow passage switching means for switching the heat medium flow passage in the heat medium circuit 10 similar to the opening and closing valves 12a to 12c. The flow passage switching valve 13 may be configured by two electromagnetic valves of a three-way valve and an opening and closing valve.

The control device 60 constituting an electric control part of the present embodiment will be described. The control device 60 is configured by a widely-known microcomputer including a CPU, ROM, and RAM and its peripheral circuit. In this control device 60, a control program for performing charge/discharge control and temperature regulation control of the modules M1 to M3 constituting the battery pack 100 is stored in a storage means such as the ROM. The control device 60 is a control means for performing various kinds of operations and processings based on the control program.

Various kinds of sensors such as the battery temperature sensors 601a to 601c, and the voltage sensors 602a to 602c, which have been described above are connected to an input side of the control device 60. The output signals from various kinds of sensors are inputted into the control device 60.

Various kinds of control object equipments such as the first to third switches SW1 to SW3, the heat medium pumps 11a to 11c, the opening and closing valves 12a to 12c, and the flow passage switching valve 13, which have been described above, are connected to an output side of the control device 60. The control device 60 outputs a predetermined output signal to various kinds of control object equipments.

A control means which controls various kinds of control object equipments is integrally configured with the control device 60 to control these. In the present embodiment, a configuration (hardware and software) of the control device for controlling operations of control equipments serves as control means for the control equipments.

For example, a configuration of the control device 60 for controlling the operations of the electric motors of the heat medium pumps 11a to 11c constitutes a heat medium pressure-feeding control means. A configuration of the control device 60 for controlling the operations of the first to third opening and closing valves 12a to 12c and the flow passage switching valve 13 constitutes a flow passage switching control means.

A configuration of the control device 60 which controls the operations of the first to third switches SW1 to SW3 constitutes a charge and discharge control means. A configuration of the control device 60 for determining the modules M1 to M3 that perform charge and discharge constitutes a use battery determination means 60a.

Figure 3:
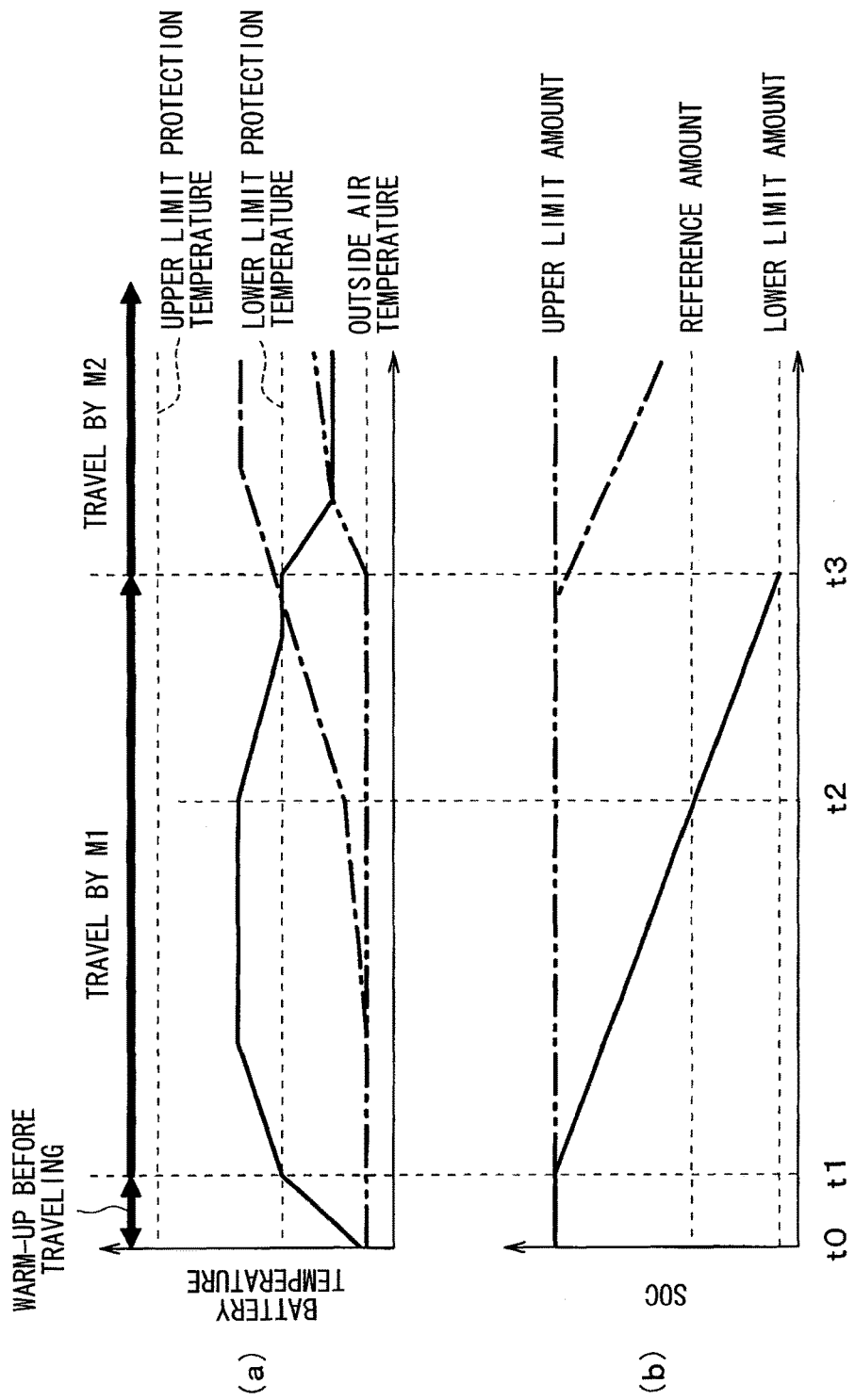
FIG. 3 is a timing chart illustrating a process for heat transfer between modules of the first embodiment.

A concrete example of control processing carried out by the control device 60 of the present embodiment will be described in reference to a timing chart illustrated in FIG. 3. A diagram (a) in FIG. 3 illustrates changes of temperatures of the modules M1 to M3. A diagram (b) in FIG. 3 illustrates changes of the amounts of electricity stored in the modules M1 to M3. Continuous lines in FIG. 3 indicate the changes of the temperature and amount of stored electricity of the first module M1. Alternate long and short dash lines in FIG. 3 indicate the changes of the temperature and amount of stored electricity of the second module M2. Alternate long and two short dashes lines in FIG. 3 indicate the changes of the temperature and amount of stored electricity of the third module M3.

In the present embodiment, there will be described a control processing for discharge and temperature control of the modules M1 to M3 in a case of the vehicle travel being started in a state where the amount of electricity stored SOC in each of the modules M1 to M3 is an upper limit amount and the battery temperature is lower than a lower limit temperature such as in winter. The control device 60 of the present embodiment makes the modules discharge an electrical current in predetermined order of the first module M1→the second module M2→the third module M3.

When an ignition switch of the vehicle is turned on, the control device 60 repeats loading of the detecting signals by various kinds of sensors, determination of operating states (output signals) of various kinds of control object equipments in accordance with the detecting signal or the like, and signal outputs into various kinds of control object equipments with each predetermined control period τ.

Specifically, when the ignition switch of the vehicle is turned on, as warming-up process before traveling, warming-up of the first module M1 that is to be used (discharge) first is started (time t0).

In this warming-up process before traveling (warming-up process of the first module M1), the first opening and closing valve 12a in the heat medium circuit 10 is opened, and the second and third opening and closing valves 12b, 12c are closed. Furthermore, the control device 60 switches into the heat medium flow passage through which the heat medium flows toward the high-temperature heat source 2 side by the flow passage switching valve 13.

Then, the control device 60 determines the operating states of various kinds of control equipments. For example, the control signal (rotating speed) outputted into the electric motor of the first heat medium pump 11a is determined such that the battery temperature of the first module M1 is in a predetermined protection temperature range.

Figure 4:
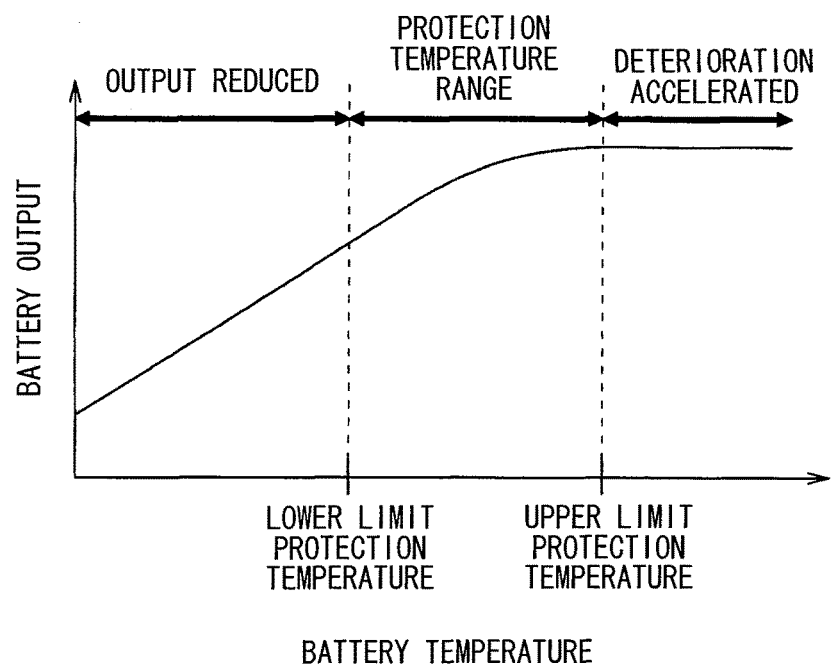
FIG. 4 is a diagram illustrating a protection temperature range of each module.

As illustrated in battery temperature characteristics in FIG. 4, the protection temperature range is set in a range that is equal to or higher than a lower limit protection temperature that is set to limit output reductions of the modules M1 to M3 of the battery pack 100 and so forth, and that is equal to or lower than an upper limit protection temperature that is set to limit deterioration of the modules M1 to M3 and so forth.

The control signals outputted into the electric motors of the second and third heat medium pumps 11b, 11c are determined so as to stop the operations of the second and third heat medium pumps 11b, 11c (the rotating speed is determined to be zero).

Figure 5:
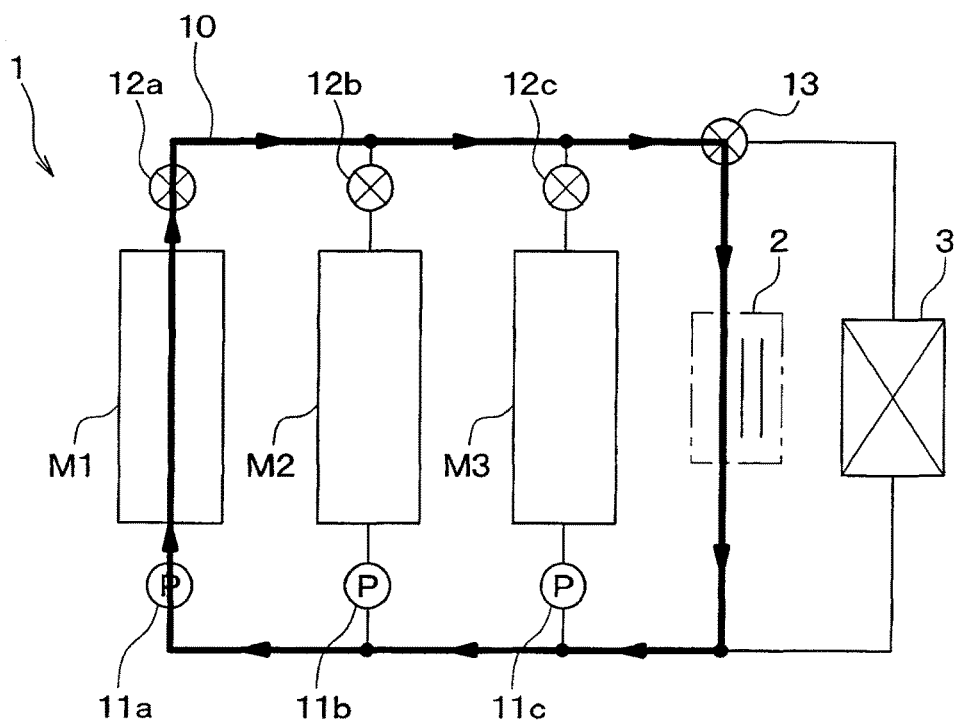
FIG. 5 is a diagram illustrating a flow of a heat medium at time of warming-up of a first module of the first embodiment.

When the output signals determined as above are outputted from the control device 60 into various kinds of control object equipments, in the warming-up process before traveling, as indicated by black arrows in FIG. 5, the heat medium pressure-fed by the first heat medium pump 11a circulates around the heat medium circuit 10 in order of the first module M1→the high-temperature heat source 2→the first heat medium pump 11a.

More specifically, the heat medium absorbs the heat of the high-temperature heat source 2 when passing through the high-temperature heat source 2, and its temperature rises. After that, when the heat medium whose temperature is raised passes through the heat medium passage of the first module M1, the heat of the heat medium is released into the first module M1.

As above, in the warming-up process before traveling of the vehicle, the warming-up of the first module M1 can be realized by raising the temperature of the first module M1 using the heat of the high-temperature heat source 2.

Next, when the battery temperature of the first module M1 is raised to the lower limit protection temperature or higher (see time t1 in FIG. 3), the control device 60 turns on the first switch SW1 with the second and third switches SW 2 and 3 of the distributor 200 turned off. Accordingly, the electric motor for traveling is driven using electrical energy accumulated in the first module M1. Thus, traveling using the first module M1 is started. During use (discharge) of the first module M1, it is self-heated, so that the warming-up process of the first module M1 (transfer of heat from the high-temperature heat source 2 to the module M1) is stopped.

Traveling of the vehicle by the first module M1 is continued, and when the amount of electricity stored in the first module M1 becomes smaller than a predetermined reference amount (see time t2 in FIG. 3), warming-up of the second module M2 that is to be subsequently used (discharge) is started. The reference amount is determined such that a time taken for the temperature of the second module M2 to be raised to the lower limit protection temperature or higher through the warming-up process is shorter than a time taken for the first module M1 to reach a lower limit amount.

The first module M1 which is currently in use (discharging electricity) is maintained at a relatively high temperature (upper limit protection temperature or lower) because of its temperature rising in the warming-up process before traveling of the vehicle and its self-heating during the discharge. Accordingly, in the present embodiment, warming-up of the second module M2 is carried out by making efficient use of the heat of the currently used first module M1.

In this warming-up process of the second module M2, the first and second opening and closing valves 12a, 12b of the heat medium circuit 10 are opened, and the third opening and closing valve 12c is closed. Furthermore, the flow passage switching valve 13 switches into the heat medium flow passage whereby the heat medium does not flow into either of the high-temperature heat source 2 and the outdoor heat exchanger 3. Then, the first heat medium pump 11a is operated with the operations of the second and third heat medium pumps 11b, 11c stopped.

Figure 6:
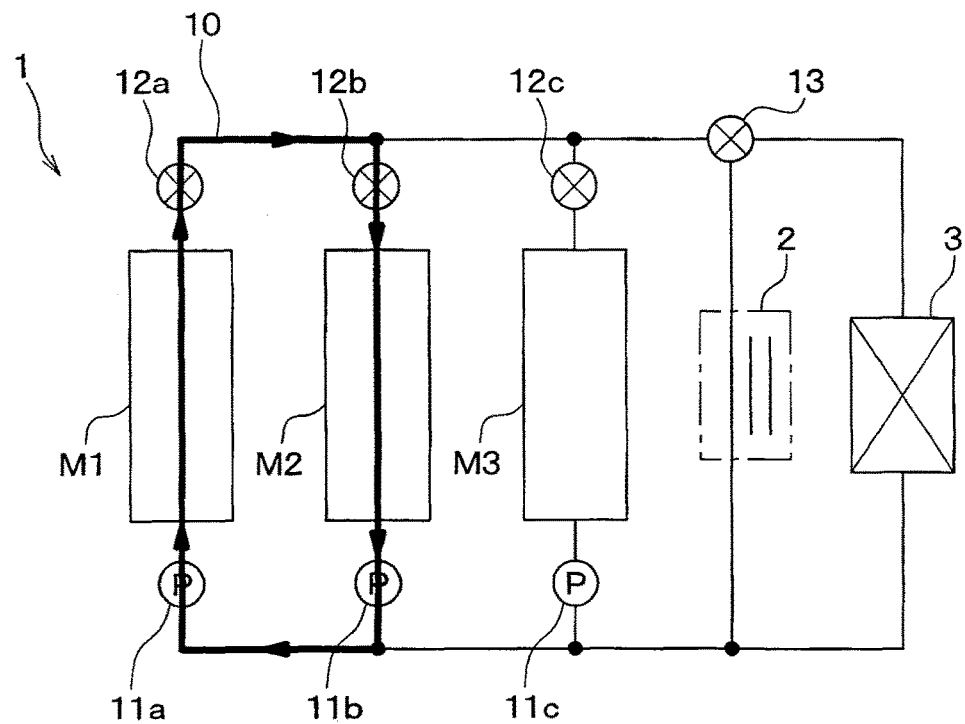
FIG. 6 is a diagram illustrating a flow of the heat medium at time of warming-up of a second module of the first embodiment.

As a result, in the warming-up process of the second module M2, as indicated by black arrows in FIG. 6, the heat medium pressure-fed by the first heat medium pump 11a circulates around the heat medium circuit 10 in order of the first module M1→the second module M2→the first heat medium pump 11a. Thus, the heat medium, which has passed through the heat medium passage of the first module M1 to absorb the heat of the first module M1, flows through the heat medium passage of the second module M2, and the heat of the heat medium is released into the second module M2.

As above, in the warming-up process of the second module M2, the heat of the first module M1 is transferred to the second module M2, so that warming-up of the second module M2 can be realized. At the time of warming-up of the second module M2, the first module M1 is cooled. Therefore, the above warming-up process of the second module M2 can be considered to be a cooling process of the first module M1.

Next, when the amount of electricity stored in the first module M1 approach a predetermined lower limit amount (see time t3 in FIG. 3), the power source for vehicle traveling is switched from the first module M1 into the second module M2. Specifically, the first switch SW1 of the distributor 200 is switched from ON into OFF, and the second switch SW2 is switched from OFF into ON. Accordingly, the electric motor for traveling is driven using electrical energy accumulated in the second module M2. Thus, traveling using the second module M2 is started. During use (discharge) of the second module M2, it is self-heated, so that the warming-up process of the second module M2 (transfer of heat from the first module M1 to the second module M2) is stopped.

If the battery temperature (remaining heat) of the module M1, which has completed the discharge and been already used, is higher than the battery temperature of the third module M3 that is to be subsequently used after the second module M2, the first warming-up of the third module M3 is carried out by efficient use of the heat of the used first module M1.

In this first warming-up process of the third module M3, the first and third opening and closing valves 12a, 12c of the heat medium circuit 10 are opened, and the second opening and closing valve 12b is closed. Furthermore, the flow passage switching valve 13 switches into the heat medium flow passage whereby the heat medium does not flow into either of the high-temperature heat source 2 and the outdoor heat exchanger 3. Then, the first heat medium pump 11a is operated with the operations of the second and third heat medium pumps 11b, 11c stopped.

Figure 7:
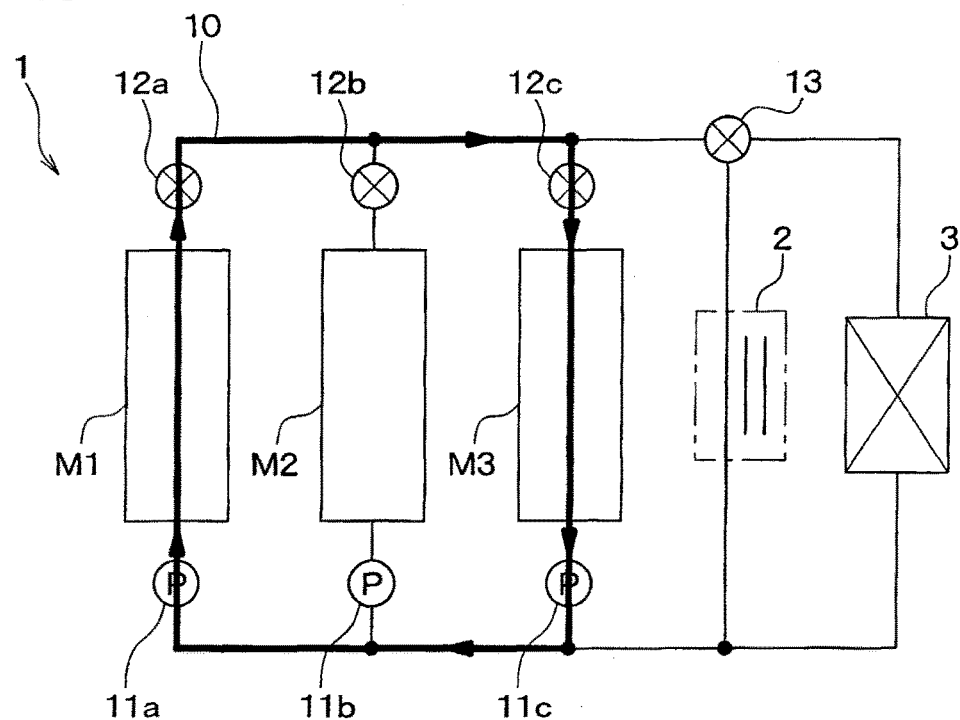
FIG. 7 is a diagram illustrating a flow of the heat medium at time of first warming-up of a third module of the first embodiment.

As a result, in the first warming-up process of the third module M3, as indicated by black arrows in FIG. 7, the heat medium pressure-fed by the first heat medium pump 11a circulates around the heat medium circuit 10 in order of the first module M1→the third module M3→the first heat medium pump 11a. Thus, the heat medium, which has passed through the heat medium passage of the first module M1 to absorb the heat of the first module M1, flows through the heat medium passage of the third module M3, and the heat of the heat medium is released into the third module M3.

As above, in the first warming-up process of the third module M3, the heat of the used first module M1 is transferred to the third module M3 that is to be subsequently used. Accordingly, the first warming-up of the third module M3 can be realized. At the same time as the first warming-up of the third module M3, the first module M1 can be cooled.

Traveling of the vehicle by the second module M2 is continued, and when the amount of electricity stored in the second module M2 becomes smaller than a predetermined reference amount (not shown), the second warming-up of the third module M3 that is to be subsequently used (discharge) is started.

In the second warming-up process of the third module M3, the second and third opening and closing valves 12b, 12c of the heat medium circuit 10 are opened, and the first opening and closing valve 12a is closed. Furthermore, the flow passage switching valve 13 switches into the heat medium flow passage whereby the heat medium does not flow into either of the high-temperature heat source 2 and the outdoor heat exchanger 3. Then, the second heat medium pump 11b is operated with the operations of the first and third heat medium pumps 11a, 11c stopped.

Figure 8:
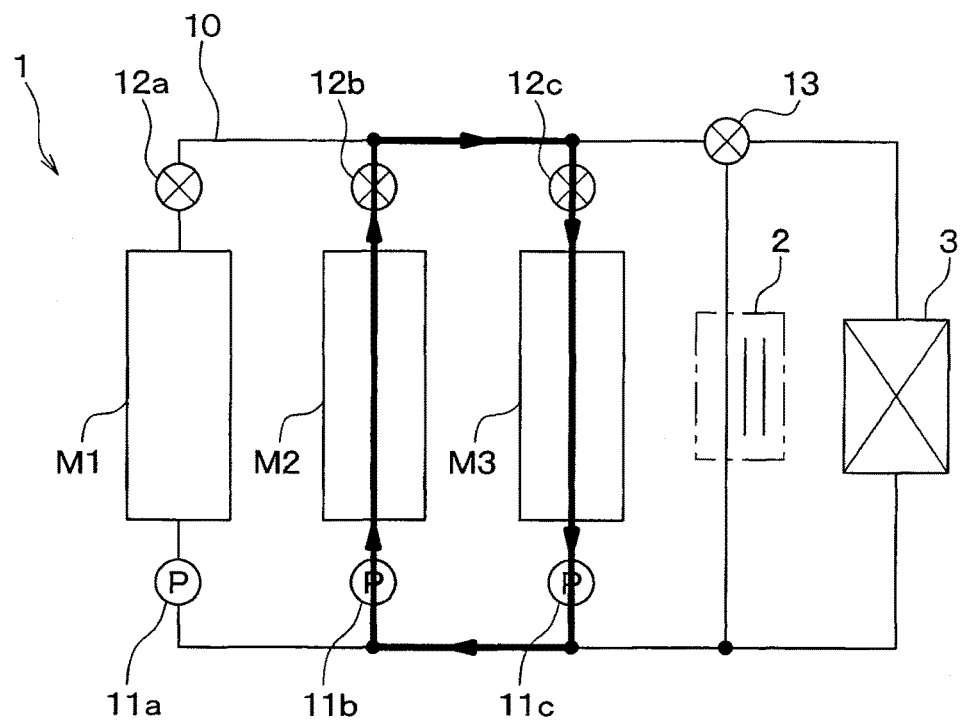
FIG. 8 is a diagram illustrating a flow of the heat medium at time of second warming-up of the third module of the first embodiment.

As a result, in the second warming-up process of the third module M3, as indicated by black arrows in FIG. 8, the heat medium pressure-fed by the second heat medium pump 11b circulates around the heat medium circuit 10 in order of the second module M2→the third module M3→the second heat medium pump 11b.

As above, in the second warming-up process of the third module M3, the heat of the currently used second module M2 is transferred to the third module M3. Accordingly, warming-up of the third module M3 can be realized, and the second module M2 can be cooled.

When the amount of electricity stored in the second module M2 approach a predetermined lower limit amount (not shown), the power source for vehicle traveling is switched from the second module M2 into the third module M3. Specifically, the second switch SW2 is switched from ON into OFF with the first switch SW of the distributor 200 turned off. In addition, the third switch SW3 is switched from OFF into ON. Accordingly, the electric motor for traveling is driven using electrical energy accumulated in the third module M3. Thus, traveling using the third module M3 is started. After that, when traveling by the third module M3 is ended, cooling of the third module M3 is started.

In the cooling process of the third module M3, the third opening and closing valve 12c in the heat medium circuit 10 is opened, and the first and second opening and closing valves 12a, 12b are closed. Furthermore, the flow passage switching valve 13 switches into the heat medium flow passage through which the heat medium flows toward the outdoor heat exchanger 3. Then, the third heat medium pump 11c is operated with the operations of the first and second heat medium pumps 11a, 11b stopped.

Figure 9:
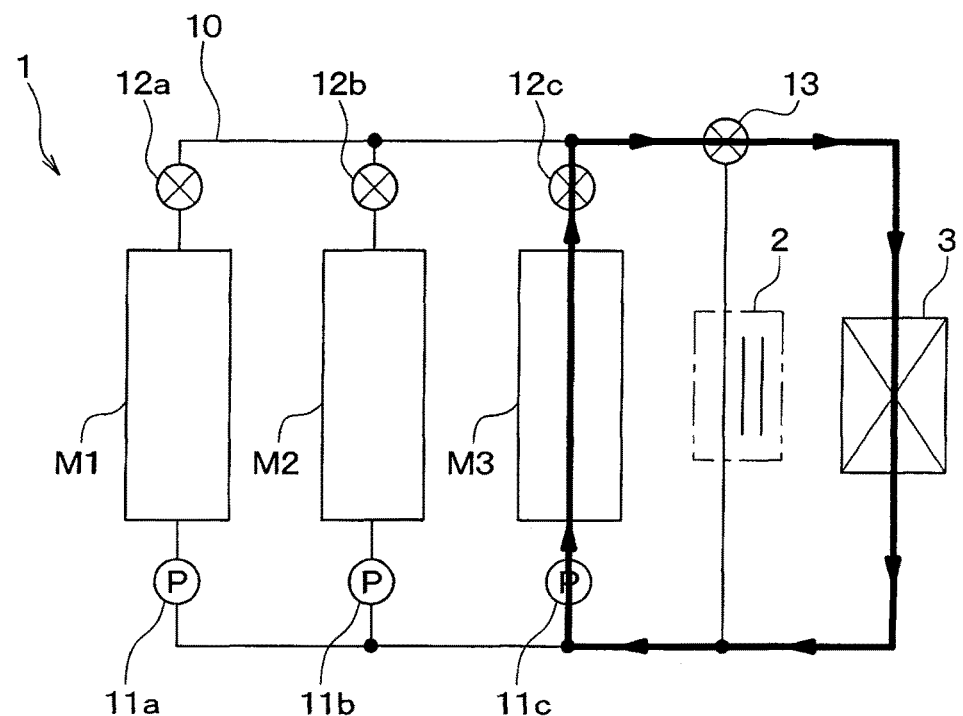
FIG. 9 is a diagram illustrating a flow of the heat medium at time of cooling of the third module of the first embodiment.

As a result, in the cooling process of the third module M3, as indicated by black arrows in FIG. 9, the heat medium pressure-fed by the third heat medium pump 11c circulates around the heat medium circuit 10 in order of the third module M3→the outdoor heat exchanger 3→the third heat medium pump 11c.

As above, in the cooling process of the third module M3, the heat of the used third module M3 is released to the outside air through the outdoor heat exchanger 3, so that cooling of the third module M3 can be realized.

In the temperature regulating device 1 of the above-described present embodiment, through control of the operations of the first to third heat medium pumps 11a to 11c, the first to third opening and closing valves 12a to 12c, and the flow passage switching valve 13, by efficient use of the heat of a part of the modules M1 to M3, the temperature of another part of the modules can be regulated. Accordingly, temperatures of the modules M1 to M3 in the battery pack 100 can be efficiently regulated with an increase in the amount of energy given from the outside limited.

In the present embodiment, out of the modules M1 to M3, the heat of the module in use or the module already used is transferred to the module that is to be subsequently used. Accordingly, the heat of the module in use or the module already used can be efficiently used.

The first to third heat medium pumps 11a to 11c, the first to third opening and closing valves 12a to 12c, and the flow passage switching valve 13 of the present embodiment constitute a heat transfer means that transfers the heat of a part of the modules M1 to M3 to another part of the modules.

Second Embodiment

A second embodiment will be described in reference to FIGS. 10 to 15.

The present embodiment is different from the first embodiment in that one heat medium pump 11 is disposed in a heat medium circuit 10, and that a heat medium flows into heat medium passages of modules M1 to M3 using the one heat medium pump 11. In the present embodiment, explanation will be given with the description of a part similar or equivalent to the first embodiment omitted or simplified.

Figure 10:
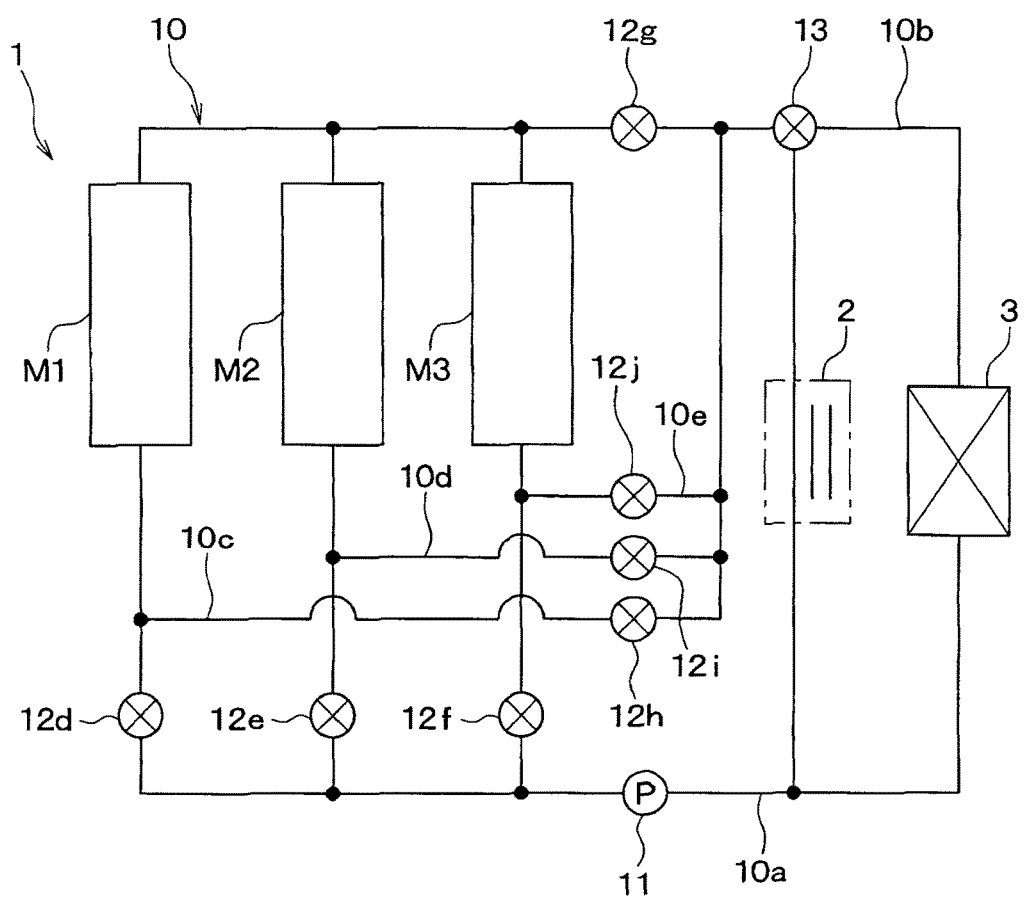
FIG. 10 is a diagram illustrating an entire configuration of a temperature regulating device in accordance with a second embodiment.

As illustrated in FIG. 10, a temperature regulating device 1 of the present embodiment includes fourth to sixth opening and closing valves 12d to 12f at positions where the first to third heat medium pumps 11a to 11c are arranged in the heat medium circuit 10. Basic configurations of the fourth to sixth opening and closing valves 12d to 12f are similar to the first to third opening and closing valves 12a to 12c which are described in the first embodiment.

The heat medium pump 11 which pressure-feeds the heat medium is provided at a branch passage 10a of the heat medium circuit 10 where a flow of the heat medium branches. This heat medium pump 11 is arranged between connection points of the branch passage 10a with the fourth to sixth opening and closing valves 12d to 12f, and a connection point of the branch passage 10a with a high-temperature heat source 2 and an outdoor heat exchanger 3.

A seventh opening and closing valve 12g is provided at a merging passage 10b of the heat medium circuit 10 where the heat media merge together. This seventh opening and closing valve 12g is disposed between connection points of the merging passage 10b with the modules M1 to M3, and a flow passage switching valve 13.

First to third auxiliary passages 10c to 10e for changing heat medium flow passages of at least two modules of the modules M1 to M3 are provided in the heat medium circuit 10. Furthermore, eighth to tenth opening and closing valves 12h to 12j for opening or closing the auxiliary passages 10c to 10e are provided respectively for the auxiliary passages 10c to 10e.

Specifically, the first auxiliary passage 10c connects together a point between the fourth opening and closing valve 12d and the first module M1, and a point between the seventh opening and closing valve 12g and the flow passage switching valves 13. The second auxiliary passage 10d connects together a point between the fifth opening and closing valve 12e and the second module M2, and a point between the seventh opening and closing valve 12g and the flow passage switching valves 13. The third auxiliary passage 10e connects together a point between the sixth opening and closing valve 12f and the third module M3, and a point between the seventh opening and closing valve 12g and the flow passage switching valves 13.

Each of the fourth to tenth opening and closing valve 12d to 12j is configured as an electromagnetic valve whose operation is controlled by an output signal from a control device 60. Together with the flow passage switching valves 13, these fourth to tenth opening and closing valves 12d to 12j function as the flow passage switching means.

A flow of the heat medium in the heat medium circuit 10 at the time of warming-up processes of the first to third modules M1 to M3 in the above-configured heat medium circuit 10, and at the time of a cooling process of the third module M3 will be described in reference to FIGS. 11 to 15. In the present embodiment, timing for performing warming-up and cooling of the modules M1 to M3 is similar to the first embodiment.

(a) Warming-Up of the First Module M1

In the warming-up process of the first module M1, the fourth opening and closing valve 12d and the seventh opening and closing valve 12g in the heat medium circuit 10 are opened; and the opening and closing valves 12e, 12f, 12h to 12j other than the fourth and seventh opening and closing valves 12d, 12g are closed. Furthermore, the flow passage switching valve 13 switches into a heat medium flow passage through which the heat medium flows toward the high-temperature heat source 2. Then, the heat medium pump 11 is operated.

Figure 11:
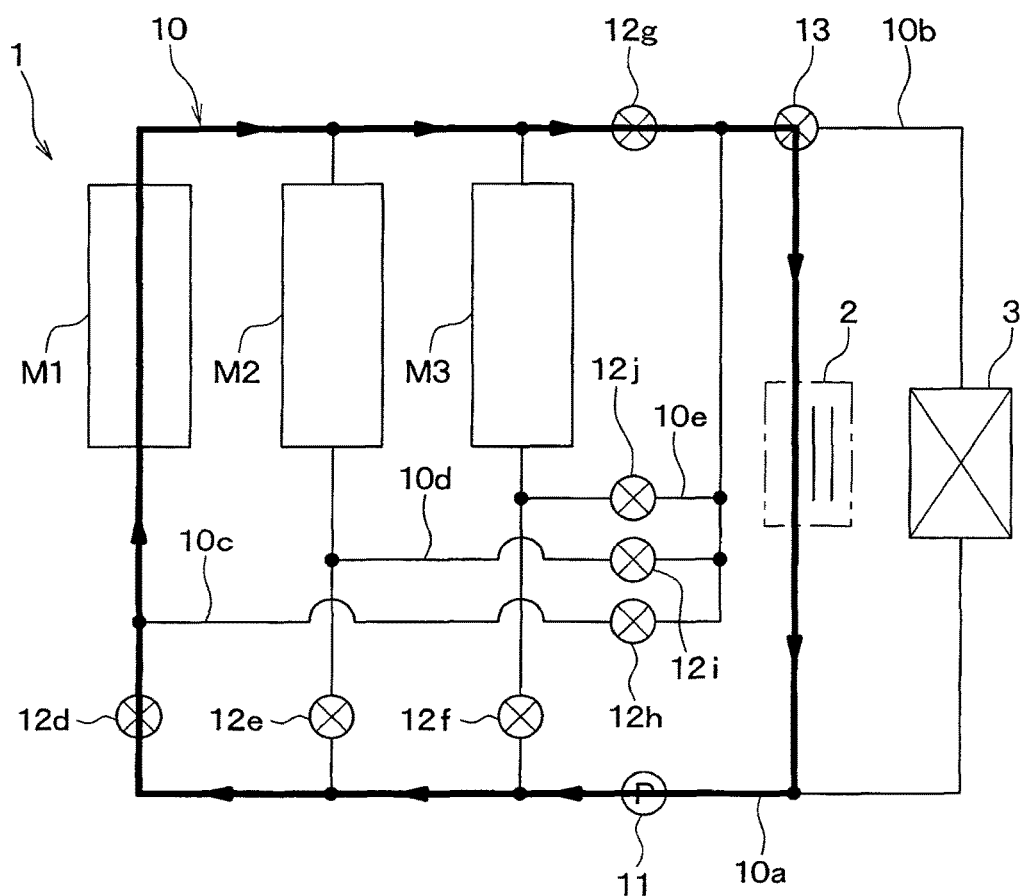
FIG. 11 is a diagram illustrating a flow of a heat medium at time of warming-up of a first module of the second embodiment.

As a result, in the warming-up process of the first module M1, as indicated by black arrows in FIG. 11, the heat medium pressure-fed by the heat medium pump 11 circulates around the heat medium circuit 10 in order of the first module M1→the high-temperature heat source 2→the heat medium pump 11. In this case, the heat of the high-temperature heat source 2 is released to the first module M1 via the heat medium.

As above, in the warming-up process of the first module M1, the heat of the high-temperature heat source 2 is transferred to the first module M1, so that warming-up of the first module M1 can be realized.

(b) Warming-Up of the Second Module M2

In the warming-up process of the second module M2, the fourth opening and closing valve 12d and the ninth opening and closing valve 12i in the heat medium circuit 10 are opened; and the opening and closing valves 12e to 12h, 12j other than the fourth and ninth opening and closing valves 12d, 12i are closed. Furthermore, the flow passage switching valve 13 switches into a heat medium flow passage through which the heat medium flows toward the high-temperature heat source 2. In this case, the operation of the high-temperature heat source 2 is stopped so that the heat of the high-temperature heat source 2 is not transferred to the heat medium. Then, the heat medium pump 11 is operated.

Figure 12:
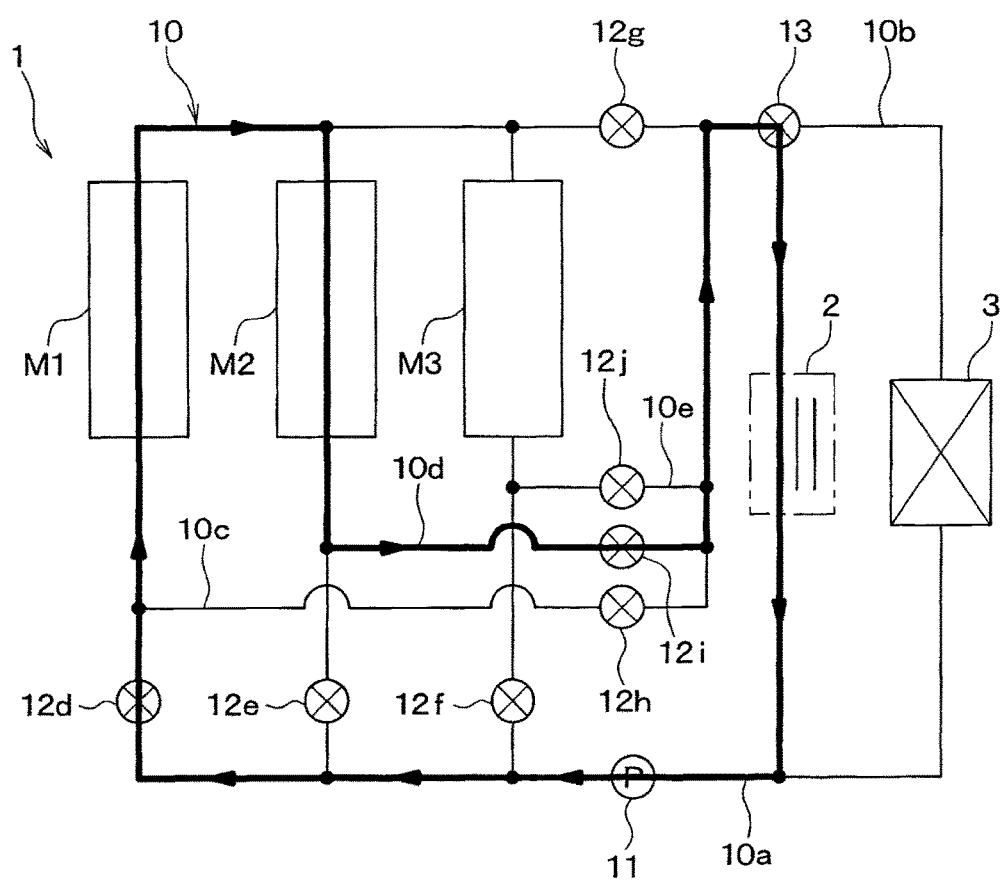
FIG. 12 is a diagram illustrating a flow of the heat medium at time of warming-up of a second module of the second embodiment.

As a result, in the warming-up process of the second module M2, as indicated by arrows in FIG. 12, the heat medium pressure-fed by the heat medium pump 11 circulates around the heat medium circuit 10 in order of the first module M1→the second module M2→the high-temperature heat source 2→the heat medium pump 11. In this case, the heat of the first module M1 is released to the second module M2 via the heat medium.

As above, in the warming-up process of the second module M2, the heat of the first module M1 is transferred to the second module M2, so that warming-up of the second module M2 can be realized. At the same time as the warming-up of the second module M2, the first module M1 can be cooled.

(c) First Warming-Up of the Third Module M3

In the first warming-up process of the third module M3, the fourth opening and closing valve 12d and the ninth and tenth opening and closing valves 12i, 12j in the heat medium circuit 10 are opened; and the opening and closing valves 12e to 12h other than the fourth opening and closing valve 12d and the ninth and tenth opening and closing valves 12i, 12j are closed. Furthermore, the flow passage switching valve 13 switches into a heat medium flow passage through which the heat medium flows toward the high-temperature heat source 2. In this case, the operation of the high-temperature heat source 2 is stopped so that the heat of the high-temperature heat source 2 is not transferred to the heat medium. Then, the heat medium pump 11 is operated.

Figure 13:
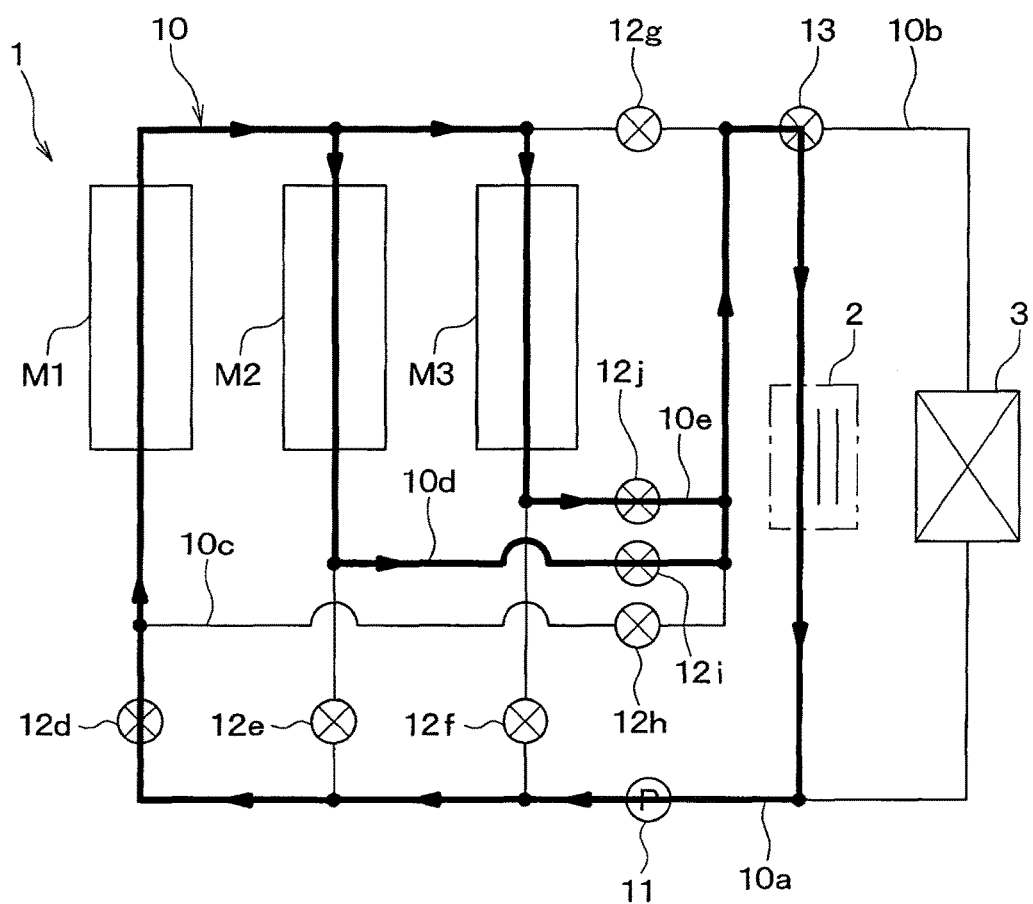
FIG. 13 is a diagram illustrating a flow of the heat medium at time of first warming-up of a third module of the second embodiment.

As a result, in the first warming-up process of the third module M3, as indicated by black arrows in FIG. 13, the heat medium pressure-fed by the heat medium pump 11 circulates around the heat medium circuit 10 in order of the first module M1→the second module M2 and the third module M3→the high-temperature heat source 2→the heat medium pump 11. In this case, the heat of the first module M1 is released to the second module M2 and the third module M3 via the heat medium.

As above, in the first warming-up process of the third module M3, the heat of the first module M1 is transferred to the second module M2 and the third module M3, so that warming-up of the second module M2 and the third module M3 can be realized. At the same time as the first warming-up of the second and third modules M2, M3, the first module M1 can be cooled.

(d) Second Warming-Up of the Third Module M3

In the second warming-up process of the third module M3, the fifth opening and closing valve 12e and the tenth opening and closing valve 12j in the heat medium circuit 10 are opened; and the opening and closing valves 12d, 12f to 12i other than the fifth opening and closing valve 12e and the tenth opening and closing valve 12j are closed. Furthermore, the flow passage switching valve 13 switches the heat medium flow passage such that the heat medium flows toward the high-temperature heat source 2. In this case, the operation of the high-temperature heat source 2 is stopped so that the heat of the high-temperature heat source 2 is not transferred to the heat medium. Then, the heat medium pump 11 is operated.

Figure 14:
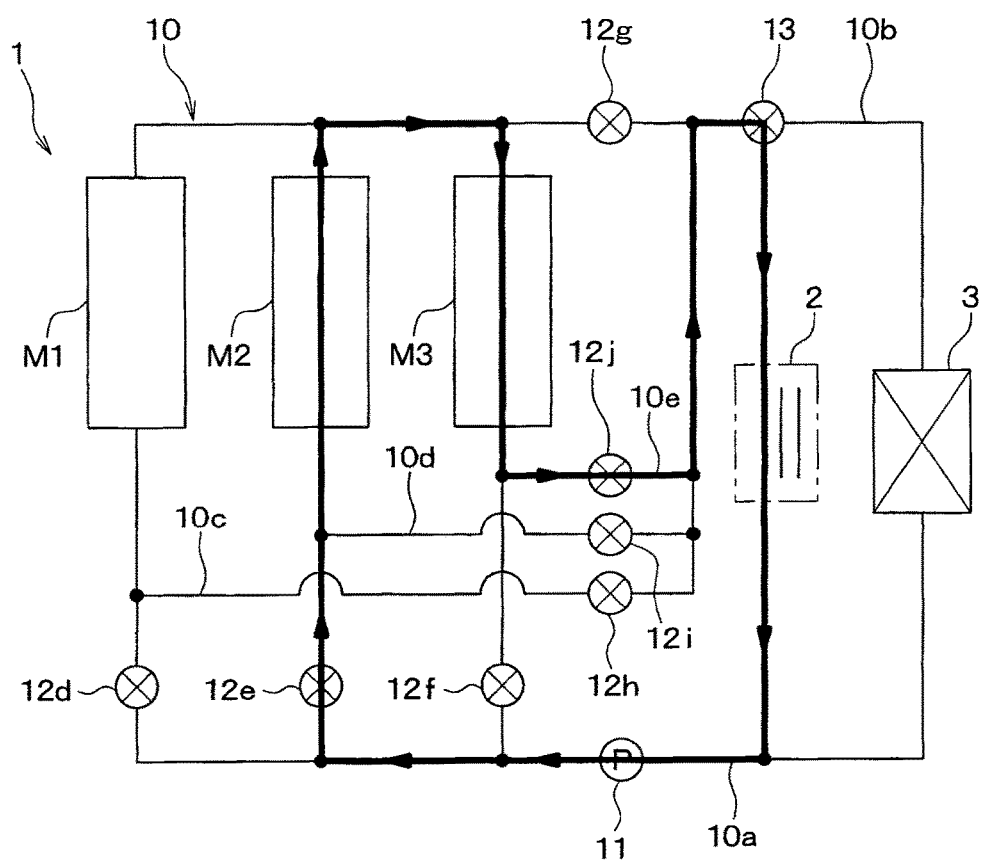
FIG. 14 is a diagram illustrating a flow of the heat medium at time of second warming-up of the third module of the second embodiment.

As a result, in the second warming-up process of the third module M3, as indicated by black arrows in FIG. 14, the heat medium pressure-fed by the heat medium pump 11 circulates around the heat medium circuit 10 in order of the second module M2→the third module M3→the high-temperature heat source 2→the heat medium pump 11. In this case, the heat of the second module M2 is released to the third module M3 via the heat medium.

As above, in the second warming-up process of the third module M3, the heat of the second module M2 is transferred to the third module M3, so that warming-up of the third module M3 can be realized. At the same time as the first warming-up of the third module M3, the second module M2 can be cooled.

(e) Cooling of the Third Module M3

In the cooling process of the third module M3, the sixth opening and closing valve 12*f* and the seventh opening and closing valve 12*g* in the heat medium circuit 10 are opened; and the opening and closing valves 12*d*, 12*e*, 12*h* to 12*j* other than the sixth opening and closing valve 12*f* and the seventh opening and closing valve 12*g* are closed. Furthermore, the flow passage switching valve 13 switches into a heat medium flow passage through which the heat medium flows toward the outdoor heat exchanger 3. Then, the heat medium pump 11 is operated.

Figure 15:
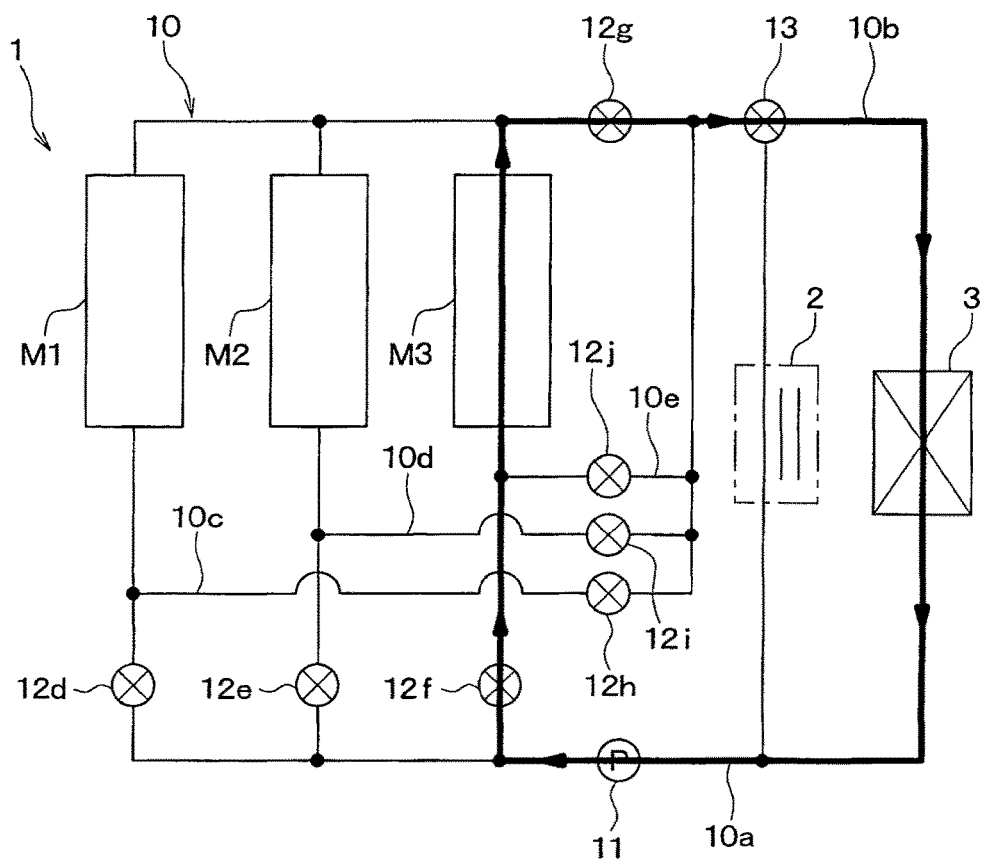
FIG. 15 is a diagram illustrating a flow of the heat medium at time of cooling of the third module of the second embodiment.

As a result, in the cooling process of the third module M3, as indicated by black arrows in FIG. 15, the heat medium pressure-fed by the heat medium pump 11 circulates around the heat medium circuit 10 in order of the third module M3→the outdoor heat exchanger 3→the heat medium pump 11. In this case, the heat of the third module M3 is released to the outside air through the outdoor heat exchanger 3.

As above, in the cooling process of the third module M3, the heat of the third module M3 is released to the outside air, so that cooling of the third module M3 can be realized.

In the above-described present embodiment, through control of the operations of the heat medium pump 11, the fourth to tenth opening and closing valves 12*d* to 12*j*, and the flow passage switching valve 13, by efficient use of the heat of a part of the modules M1 to M3, the temperature of another part of the modules can be regulated. Accordingly, similar to the first embodiment, temperatures of the modules M1 to M3 in the battery pack 100 can be efficiently regulated with an increase in the amount of energy given from the outside limited.

The heat medium pump 11, the fourth to tenth opening and closing valves 12*d* to 12*j*, and the flow passage switching valve 13 of the present embodiment constitute a heat transfer means that transfers the heat of a part of the modules M1 to M3 to another part of the modules.

Third Embodiment

A third embodiment will be described in reference to FIGS. 16 to 20. In the present embodiment, explanation will be given with the description of a part similar or equivalent to the first and second embodiments omitted or simplified.

A heat medium circuit 10 of the present embodiment is configured such that a first module M1, a second module M2, and a third module M3 are connected in series in this order on a downstream side of a heat medium pump 11, and that a high-temperature heat source 2 and an outdoor heat exchanger 3 are connected in parallel on a downstream side of the third module M3.

Figure 16:
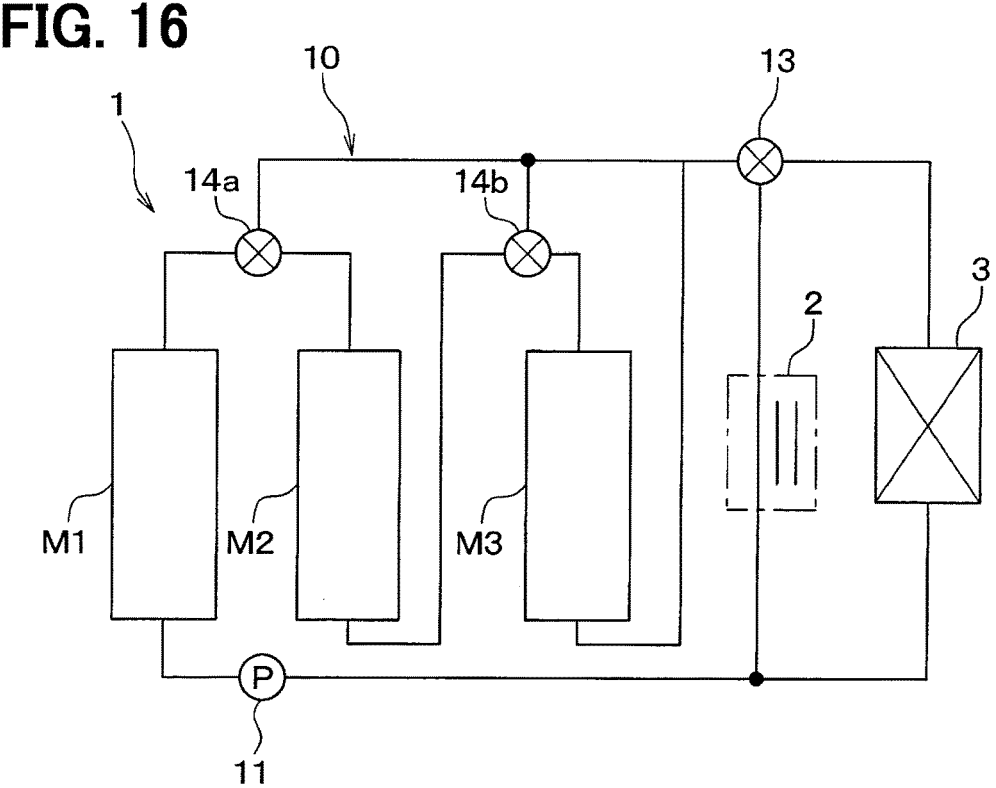
FIG. 16 is a diagram illustrating an entire configuration of a temperature regulating device in accordance with a third embodiment.

Specifically, as illustrated in FIG. 16, in the heat medium circuit 10 of the present embodiment, an inlet side of a heat medium passage of the first module M1 is connected to the downstream side of the heat medium pump 11; and an inlet side of a heat medium passage of the second module M2 and a flow passage switching valve 13 are connected to an outlet side of the heat medium passage of the first module M1 through a first three-way valve 14*a*. An inlet side of a heat medium passage of the third module M3 and the flow passage switching valve 13 are connected to an outlet side of the heat medium passage of the second module M2 through a second three-way valve 14*b*. The flow passage switching valve 13 is connected to an outlet side of the heat medium passage of the third module M3.

In accordance with an output signal from a control device 60, the first three-way valve 14*a* switches between a heat medium passage connecting the outlet side of the heat medium passage of the first module M1 and the inlet side of the heat medium passage of the second module M2; and a heat medium passage connecting the outlet side of the heat medium passage of the first module M1 and the flow passage switching valve 13.

In accordance with an output signal from the control device 60, the second three-way valve 14*b* switches between a heat medium passage connecting the outlet side of the heat medium passage of the second module M2 and the inlet side of the heat medium passage of the third module M3; and a heat medium passage connecting the outlet side of the heat medium passage of the second module M2 and the flow passage switching valve 13.

Each of the three-way valves 14*a*, 14*b* is configured as an electric-type three-way valve whose operation is controlled in accordance with the output signal from the control device 60. Together with the flow passage switching valve 13, each of the three-way valves 14*a*, 14*b* functions as the flow passage switching means.

A flow of the heat medium in the heat medium circuit 10 at the time of warming-up processes of the modules M1 to M3 in the above-configured heat medium circuit 10, and at the time of a cooling process of the third module M3 will be described in reference to FIGS. 17 to 20. In the present embodiment, timing for performing warming-up and cooling of the modules M1 to M3 is similar to the first embodiment.

(a) Warming-Up of the First Module M1

In the warming-up process of the first module M1, the first three-way valve 14*a* of the heat medium circuit 10 switches into the heat medium passage connecting the outlet side of the heat medium passage of the first module M1 and the flow passage switching valve 13. Furthermore, the flow passage switching valve 13 switches into a heat medium flow passage through which the heat medium flows toward the high-temperature heat source 2. Then, the heat medium pump 11 is operated.

Figure 17:
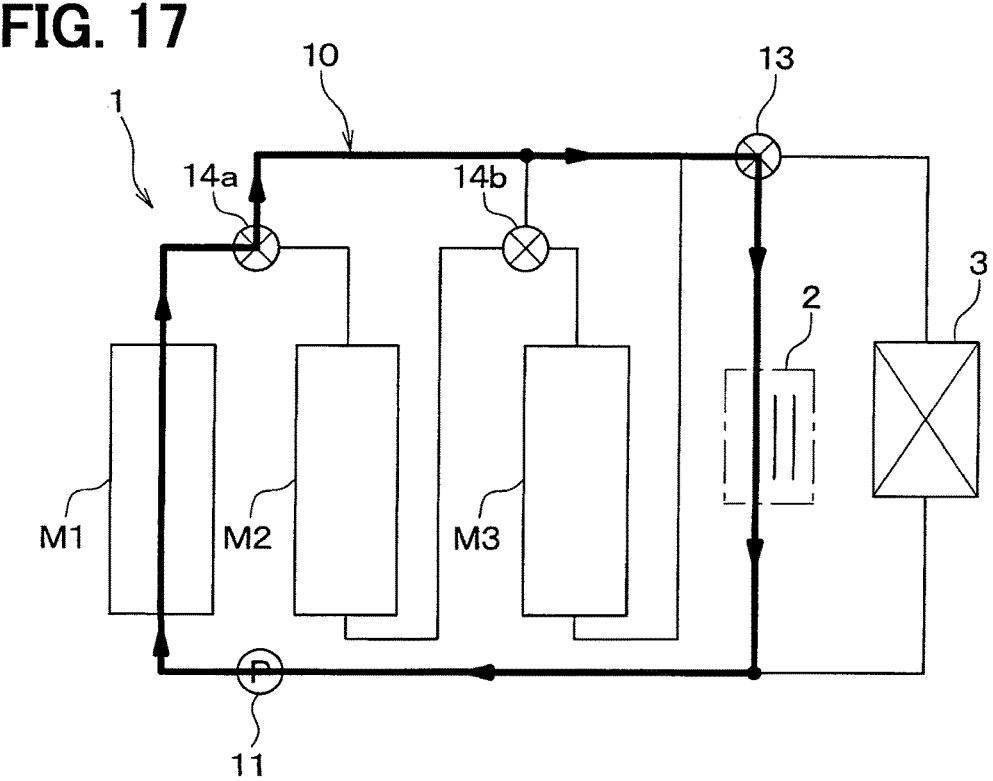
FIG. 17 is a diagram illustrating a flow of a heat medium at time of warming-up of a first module of the third embodiment.

As a result, in the warming-up process of the first module M1, as indicated by black arrows in FIG. 17, the heat medium pressure-fed by the heat medium pump 11 circulates around the heat medium circuit 10 in order of the first module M1→the high-temperature heat source 2→the heat medium pump 11. In this case, the heat of the high-temperature heat source 2 is released to the first module M1 via the heat medium.

As above, in the warming-up process of the first module M1, the heat of the high-temperature heat source 2 is transferred to the first module M1, so that warming-up of the first module M1 can be realized.

(b) Warming-Up of the Second Module M2

In the warming-up process of the second module M2, the first three-way valve 14*a* switches into the heat medium passage connecting the outlet side of the heat medium passage of the first module M1 and the inlet side of the heat medium passage of the second module M2. In addition, the second three-way valve 14*b* switches into the heat medium passage connecting the outlet side of the heat medium passage of the second module M2 and the flow passage switching valve 13. Furthermore, the flow passage switching valve 13 switches into a heat medium flow passage through which the heat medium flows toward the high-temperature heat source 2. In this case, the operation of the high-temperature heat source 2 is stopped so that the heat of the high-temperature heat source 2 is not transferred to the heat medium.

Figure 18:
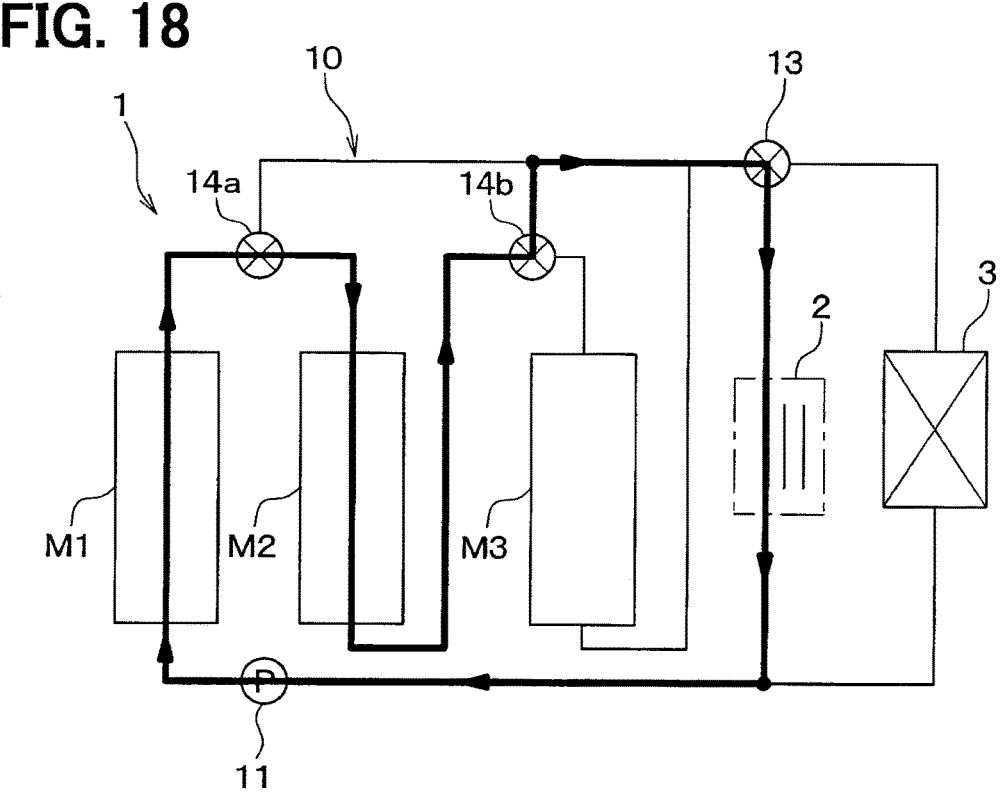
FIG. 18 is a diagram illustrating a flow of the heat medium at time of warming-up of a second module of the third embodiment.

As a result, in the warming-up process of the second module M2, as indicated by black arrows in FIG. 18, the heat medium pressure-fed by the heat medium pump 11 circulates around the heat medium circuit 10 in order of the first module M1→the second module M2→the high-temperature heat source 2→the heat medium pump 11. In this case, the heat of the first module M1 is released to the second module M2 via the heat medium.

As above, in the warming-up process of the second module M2, the heat of the first module M1 is transferred to the second module M2, so that warming-up of the second module M2 can be realized. At the same time as the warming-up of the second module M2, the first module M1 can be cooled.

(c) Warming-Up of the Third Module M3

In the warming-up process of the third module M3, the first three-way valve 14a of the heat medium circuit 10 switches into the heat medium passage connecting the outlet side of the heat medium passage of the first module M1 and the inlet side of the heat medium passage of the second module M2. In addition, the second three-way valve 14b switches into the heat medium passage connecting the outlet side of the heat medium passage of the second module M2 and the inlet side of the heat medium passage of the third module M3. Furthermore, the flow passage switching valve 13 switches into a heat medium flow passage through which the heat medium flows toward the high-temperature heat source 2. In this case, the operation of the high-temperature heat source 2 is stopped so that the heat of the high-temperature heat source 2 is not transferred to the heat medium. Then, the heat medium pump 11 is operated.

Figure 19:
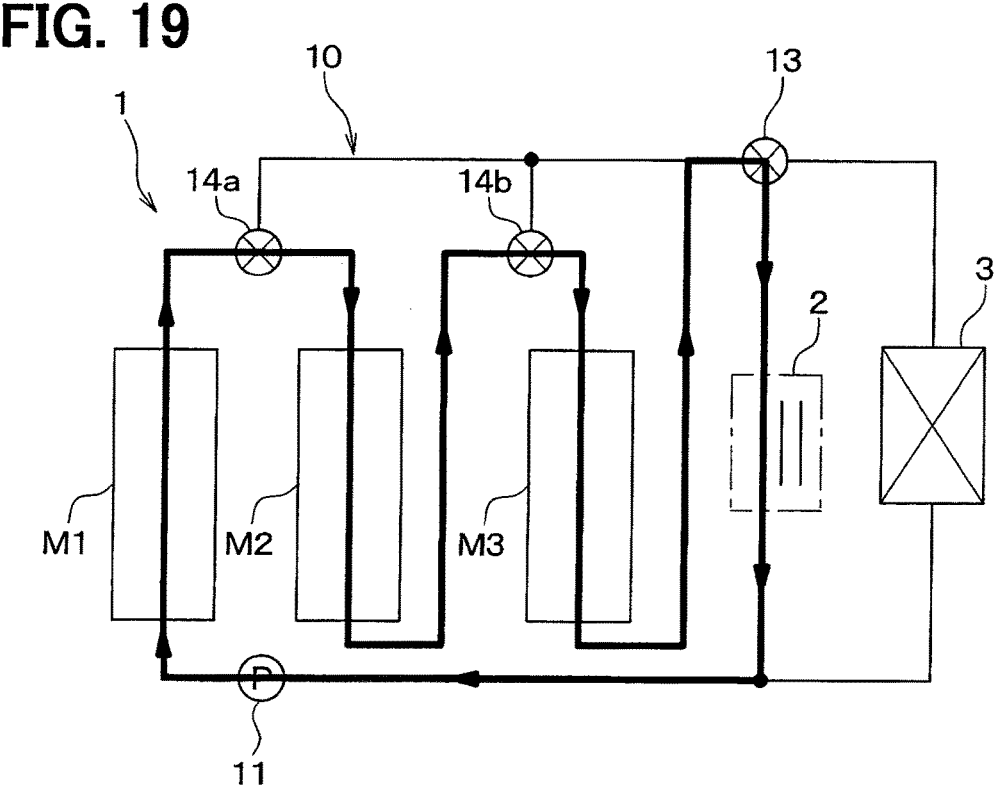
FIG. 19 is a diagram illustrating a flow of the heat medium at time of warming-up of a third module of the third embodiment.

As a result, in the warming-up process of the third module M3, as indicated by black arrows in FIG. 19, the heat medium pressure-fed by the heat medium pump 11 circulates around the heat medium circuit 10 in order of the first module M1→the second module M2→the third module M3→the high-temperature heat source 2→the heat medium pump 11. In this case, the heat of the first module M1 and the second module M2 is released to the third module M3 via the heat medium.

As above, in the warming-up process of the third module M3, the heat of the first module M1 and the second module M2 is transferred to the third module M3, so that warming-up of the third module M3 can be realized. At the same time as the warming-up of the third module M3, the first and second modules M1, M2 can be cooled.

(d) Cooling of the Third Module M3

In the cooling process of the third module M3, the first three-way valve 14a in the heat medium circuit 10 switches into the heat medium passage connecting the outlet side of the heat medium passage of the first module M1 and the inlet side of the heat medium passage of the second module M2. In addition, the second three-way valve 14b switches into the heat medium passage connecting the outlet side of the heat medium passage of the second module M2 and the inlet side of the heat medium passage of the third module M3. Furthermore, the flow passage switching valve 13 switches into a heat medium flow passage through which the heat medium flows toward the outdoor heat exchanger 3. Then, the heat medium pump 11 is operated.

Figure 20:
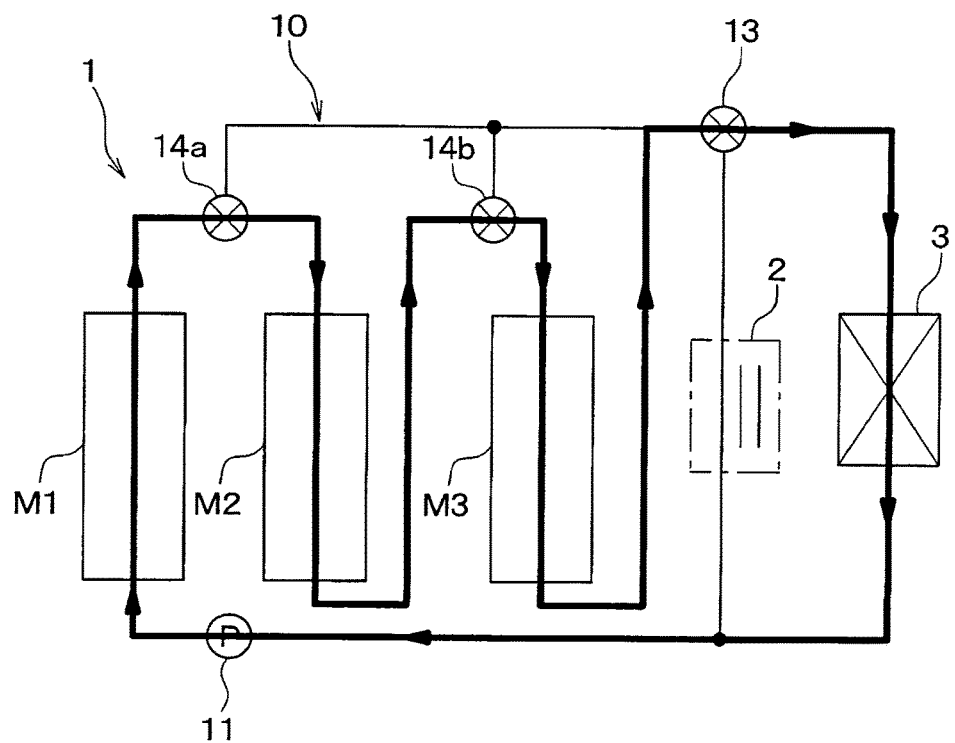
FIG. 20 is a diagram illustrating a flow of the heat medium at time of cooling of the third module of the third embodiment.

As a result, in the cooling process of the third module M3, as indicated by black arrows in FIG. 20, the heat medium pressure-fed by the heat medium pump 11 circulates around the heat medium circuit 10 in order of the first module M1→the second module M2→the third module M3→the outdoor heat exchanger 3→the heat medium pump 11. In this case, the heat of the third module M3 is released to the outside air through the outdoor heat exchanger 3.

As above, in the cooling process of the third module M3, the heat of the third module M3 is released to the outside air, so that cooling of the third module M3 can be realized.

In the above-described present embodiment, through control of the operations of the heat medium pump 11, the first and second three-way valves 14a, 14b, and the flow passage switching valve 13, by efficient use of the heat of a part of the modules M1 to M3, the temperature of another part of the modules can be regulated. Accordingly, similar to the first and second embodiments, temperatures of the modules M1 to M3 in the battery pack 100 can be efficiently regulated with an increase in the amount of energy given from the outside limited.

The heat medium pump 11, the first and second three-way valves 14a, 14b, and the flow passage switching valve 13 of the present embodiment constitute a heat transfer means that transfers the heat of a part of the modules M1 to M3 to another part of the modules.

Fourth Embodiment

A fourth embodiment will be described in reference to FIGS. 21 to 27.

In the present embodiment, it is illustrated that heat transfer between two first and second modules M1, M2 which constitute a battery pack 100 is carried out through a vapor-compression type refrigeration cycle 30. In the present embodiment, explanation will be given with the description of a part similar or equivalent to the first to third embodiments omitted or simplified.

Figure 21:
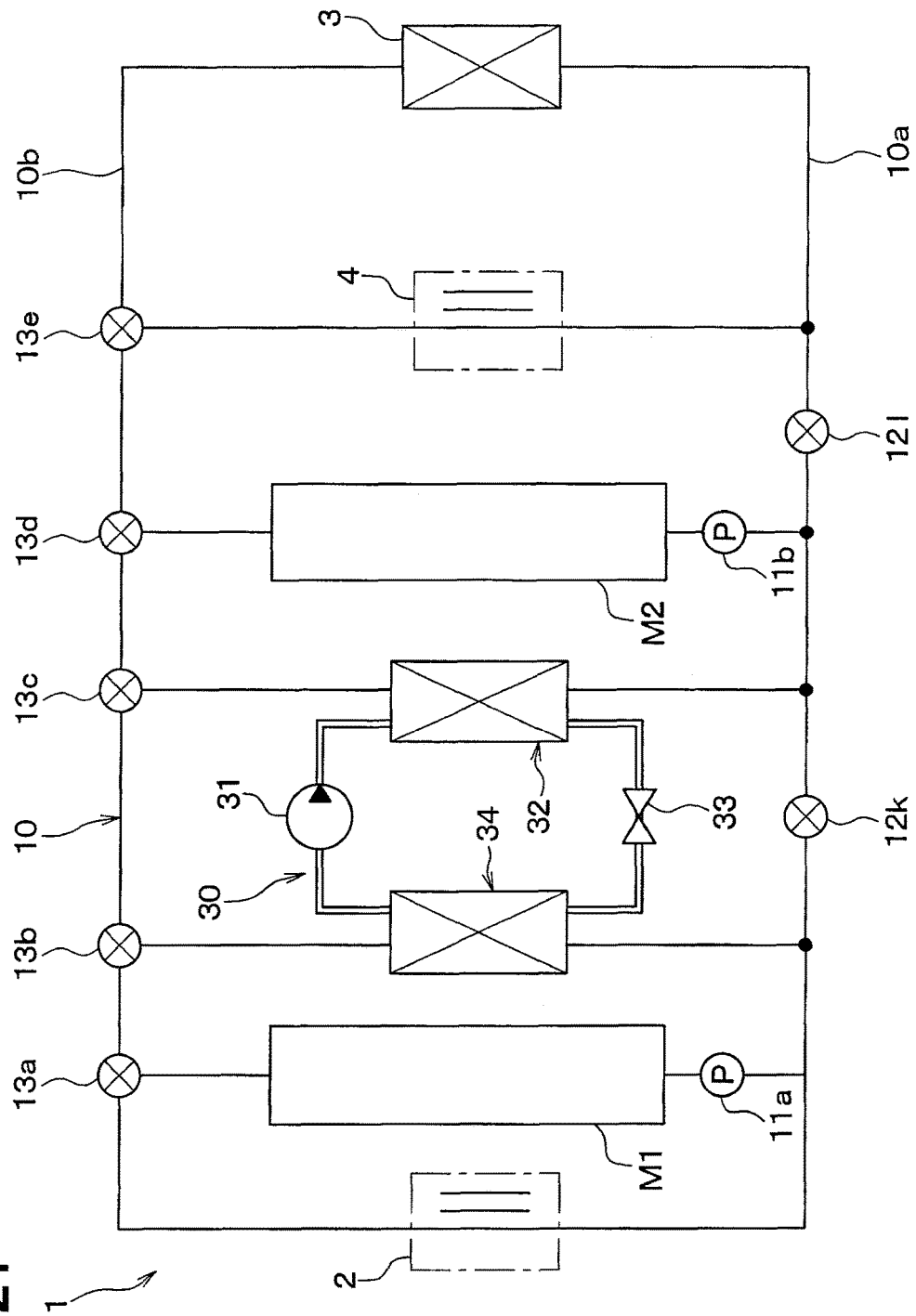
FIG. 21 is a diagram illustrating an entire configuration of a temperature regulating device in accordance with a fourth embodiment.

As illustrated in FIG. 21, a heat medium circuit 10 of the present embodiment is configured as a result of a parallel connection of the module M1, M2 in the battery pack 100; a high-temperature heat source 2; an outdoor heat exchanger 3 that performs heat exchange between outside air and a heat medium; a low-temperature heat source (e.g., a heat exchange part through which low-pressure refrigerant in a refrigeration cycle for air-conditioning the vehicle interior flows); and a condenser 32 and an evaporator 34 in the refrigeration cycle 30 for battery temperature regulation which will be described in greater detail hereinafter. In the present embodiment, they are connected together such that the high-temperature heat source 2, the first module M1, the evaporator 34, the condenser 32, the second module M2, the low-temperature heat source 4, and the outdoor heat exchanger 3 are arranged in this order.

First and second heat medium pumps 11a, 11b which pressure-feed the heat medium into heat medium passages formed inside the modules M1, M2 are arranged in the heat medium circuit 10 on one end sides of the modules M1 and M2.

At a branch passage 10a of the heat medium circuit 10 where a flow of the heat medium branches, an eleventh opening and closing valve 12k for opening or closing a heat medium passage between an outlet side of the evaporator 34 and an outlet side of the condenser 32 is disposed; and a twelfth opening and closing valve 12l for opening or closing a heat medium passage between an inlet side of a second heat medium pump 11b and an inlet side of the low-temperature heat source 4 is disposed.

These eleventh and twelfth opening and closing valves 12k, 12l are electromagnetic valves whose operations are controlled by output signals from a control device 60. Opening and closing of the eleventh and twelfth opening and closing valves 12k, 12l can switch between heat medium flow passages in the heat medium circuit 10. Accordingly, the eleventh and twelfth opening and closing valves 12k, 12l of the present embodiment serve as the flow passage switching means for switching the heat medium flow passage in the heat medium circuit 10.

On the other hand, along a merging passage 10b of the heat medium circuit 10 where flows of heat media merge together, first to fifth flow passage switching valves 13a to 13e for switching the heat medium flow passage are arranged respectively on an outlet side of a heat medium passage of the first module M1, on an inlet side of the evaporator 34, on an inlet side of the condenser 32, on the outlet side of the heat medium passage of the second module M2, and on an outlet side of the low-temperature heat source 4.

Operations of these first to fifth flow passage switching valves 13a to 13e are controlled by output signals from the control device 60. The heat medium flow passage in the heat medium circuit 10 can be switched through control of the first to fifth flow passage switching valves 13a to 13e. Accordingly, similar to the eleventh and twelfth opening and closing valves 12k, 12l, the first to fifth flow passage switching valves 13a to 13e of the present embodiment serve as the flow passage switching means for switching the heat medium flow passage in the heat medium circuit 10.

Next, the refrigeration cycle 30 for temperature regulation will be described. This refrigeration cycle 30 is configured as a vapor-compression type refrigeration cycle (heat pump cycle). In the refrigeration cycle 30 of the present embodiment, normal fluorocarbon refrigerant is employed for its refrigerant. The cycle 30 constitutes a subcritical refrigeration cycle in which the pressure of high-pressure refrigerant does not exceed the critical pressure of refrigerant.

A compressor 31 draws in, compresses, and discharges the refrigerant, and is an electric compressor that drives a fixed-capacity type compression mechanism (not shown) with a fixed discharging volume by an electric motor (not shown). For example, several kinds of compression mechanisms such as a scroll-type compression mechanism or a vane-type compression mechanism can be used for the compression mechanism.

The electric motor is a motor whose operation (rotating speed) is controlled by a control signal outputted from the control device 60. Either type of an alternating-current motor and a direct-current motor may be employed for the electric motor. A refrigerant discharge capacity of the compression mechanism can be changed through this control of the rotating speed. Accordingly, in the present embodiment, the electric motor constitutes a discharge capacity changing means for the compression mechanism.

The inlet side of the condenser 32 is connected to a discharge port side of the compressor 31. A refrigerant passage in which the refrigerant flows and a heat medium passage through which the heat medium flows are formed in the condenser 32. The condenser 32 is a heat release means that exchanges heat between the high-pressure refrigerant discharged from the compressor 31 and the heat medium to release the heat of the high-pressure refrigerant to the heat medium, thereby heating the heat medium.

An inlet side of a temperature type expansion valve 33 is connected to the outlet side of the condenser 32. As widely known, this temperature type expansion valve 33 regulates a refrigerant flow rate through regulation of its valve opening degree such that a degree of superheat of the refrigerant at the outlet of the evaporator 34 reaches a predetermined value.

The inlet side of the evaporator 34 is connected to an outlet side of the temperature type expansion valve 33. This evaporator 34 is an evaporation means that exchanges heat between the low-pressure refrigerant whose pressure is reduced by the temperature type expansion valve 33 and the heat medium to evaporate the low-pressure refrigerant, thereby cooling the heat medium. In addition, the outlet side of the evaporator 34 is connected to a suction side of the compressor 31.

Various kinds of control object equipments in the refrigeration cycle 30, in addition to various kinds of control object equipments 11a, 11b, 12k, 12l, 13a to 13e in the heat medium circuit 10, are connected to an output side of the control device 60 of the present embodiment. A configuration of the control device 60 for controlling the electric motor of the compressor 31 constitutes a discharge capacity control means that controls a refrigerant discharge capacity.

Figure 22:
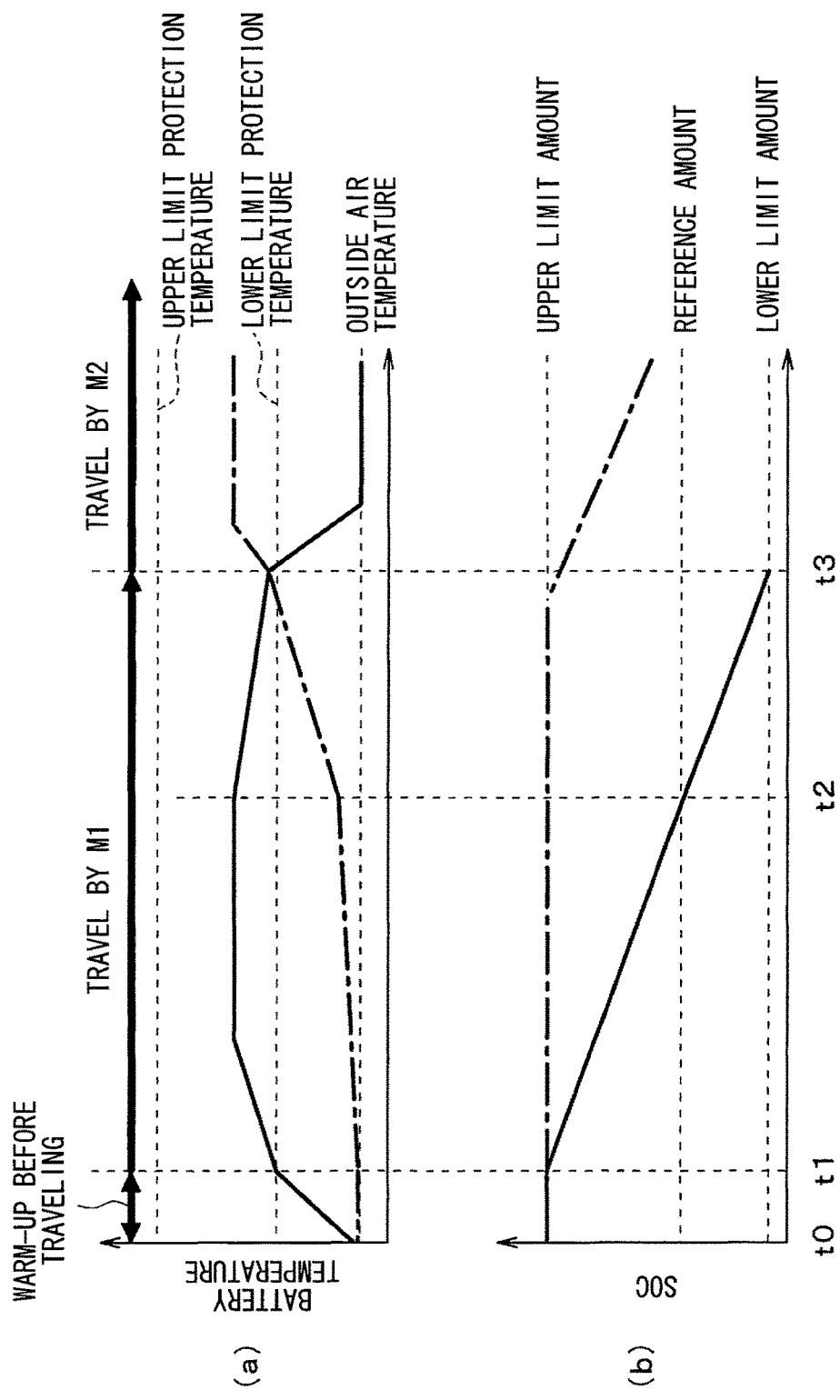
FIG. 22 is a timing chart illustrating a process for heat transfer between modules of the fourth embodiment.

A concrete example of control processing carried out by the control device 60 of the present embodiment will be described in reference to a timing chart illustrated in FIG. 22. A diagram (a) in FIG. 22 illustrates changes of temperatures of the modules M1, M2. A diagram (b) in FIG. 22 illustrates changes of the amounts of stored electricity of the modules M1, M2. Continuous lines in FIG. 22 indicate changes of the temperature and the amount of stored electricity of the first module M1. Alternate long and short dash lines in FIG. 22 indicate changes of the temperature and the amount of stored electricity of the second module M2.

In the present embodiment, there will be described a control processing for discharge and temperature control of the modules M1, M2 in a case of the vehicle travel being started in a state where the amount of electricity stored SOC in each of the modules M1, M2 is an upper limit amount and the battery temperature is lower than a lower limit temperature such as in winter. The control device 60 of the present embodiment makes the modules discharge an electrical current in predetermined order of the first module M1→the second module M2.

When an ignition switch of the vehicle is turned on, the control device 60 repeats loading of the detecting signals by various kinds of sensors, determination of operating states (output signals) of various kinds of control object equipments in accordance with the detecting signal or the like, and signal outputs into various kinds of control object equipments with each predetermined control period τ.

Specifically, when the ignition switch of the vehicle is turned on, as warming-up process before traveling, warming-up of the first module M1 that is to be used (discharge) first is started (time t0).

In this warming-up process of the first module M1, the eleventh opening and closing valve 12k in the heat medium circuit 10 is closed; and the first flow passage switching valve 13a switches into a heat medium flow passage through which the heat medium flows toward the high-temperature heat source 2. Furthermore, the second flow passage switching valve 13b switches into a heat medium flow passage whereby the heat medium does not flow toward the evaporator 34 or the third flow passage switching valve 13c. Then, the first heat medium pump 11a is operated with the operations of the second heat medium pump 11b, and the compressor 31 in the refrigeration cycle 30 stopped.

Figure 23:
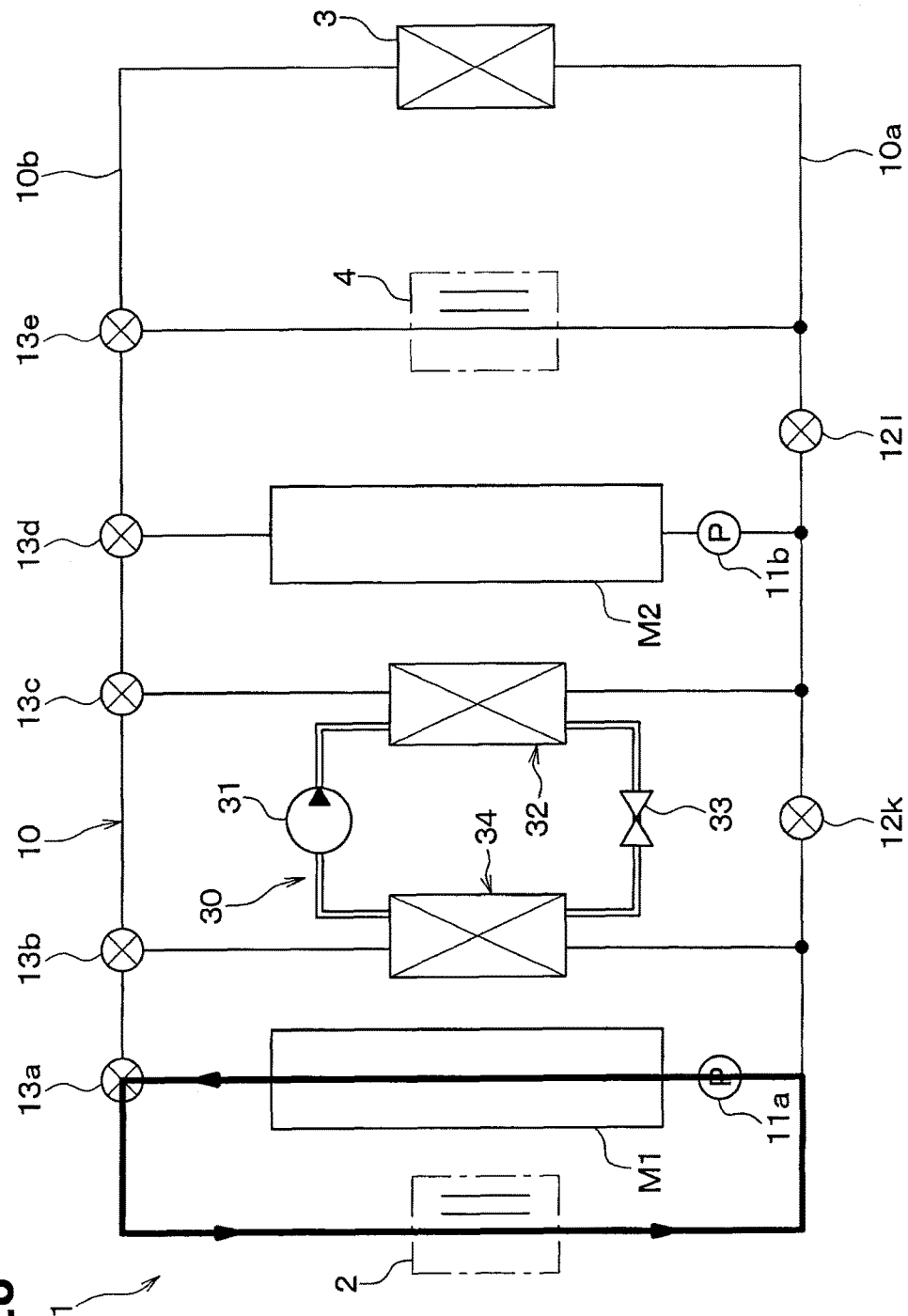
FIG. 23 is a diagram illustrating a flow of a heat medium and so forth at time of warming-up of a first module of the fourth embodiment.

As a result, in the warming-up process of the first module M1, as indicated by black arrows in FIG. 23, the heat medium pressure-fed by the first heat medium pump 11a circulates around the heat medium circuit 10 in order of the first module M1→the high-temperature heat source 2→the first heat medium pump 11a. In this case, the heat of the high-temperature heat source 2 is released to the first module M1 via the heat medium.

As above, in the warming-up process of the first module M1, the heat of the high-temperature heat source 2 is transferred to the first module M1, so that warming-up of the first module M1 can be realized.

Next, when the battery temperature of the first module M1 is raised to the lower limit protection temperature or higher (see time t1 in FIG. 22), the control device 60 turns on the first switch SW1 with the second and third switches SW 2 and 3 of the distributor 200 turned off. Accordingly, the electric motor for traveling is driven using electrical energy accumulated in the first module M1. Thus, traveling using the first module M1 is started. During use (discharge) of the first module M1, it is self-heated, so that the warming-up process of the first module M1 (transfer of heat from the high-temperature heat source 2 to the module M1) is stopped.

Traveling of the vehicle by the first module M1 is continued, and when the amount of electricity stored in the first module M1 becomes smaller than a predetermined reference amount (see time t2 in FIG. 22), warming-up of the second module M2 that is to be subsequently used (discharge) is started.

The first module M1 which is currently in use (discharging electricity) is maintained at a relatively high temperature (upper limit protection temperature or lower) because of its temperature rising in the warming-up process before traveling of the vehicle and its self-heating during the discharge. Accordingly, in the present embodiment, warming-up of the second module M2 is carried out by making efficient use of the heat of the currently used first module M1.

In this warming-up process of the second module M2, the eleventh opening and closing valve 12k in the heat medium circuit 10 is closed; and the first and second flow passage switching valves 13a, 13b switch such that the heat medium flows through the first module M1 and the evaporator 34 in the refrigeration cycle 30. Furthermore, the twelfth opening and closing valve 12l in the heat medium circuit 10 is closed; and the third and fourth flow passage switching valves 13c, 13d switch such that the heat medium flows through the second module M2 and the condenser 32 in the refrigeration cycle 30. Then, the first and second heat medium pumps 11a, and the compressor 31 in the refrigeration cycle 30 are operated. In this case, for example, the control device 60 determines the output signal into the electric motor of the compressor 31 such that the battery temperature of the second module M2 reaches a desired temperature.

Figure 24:
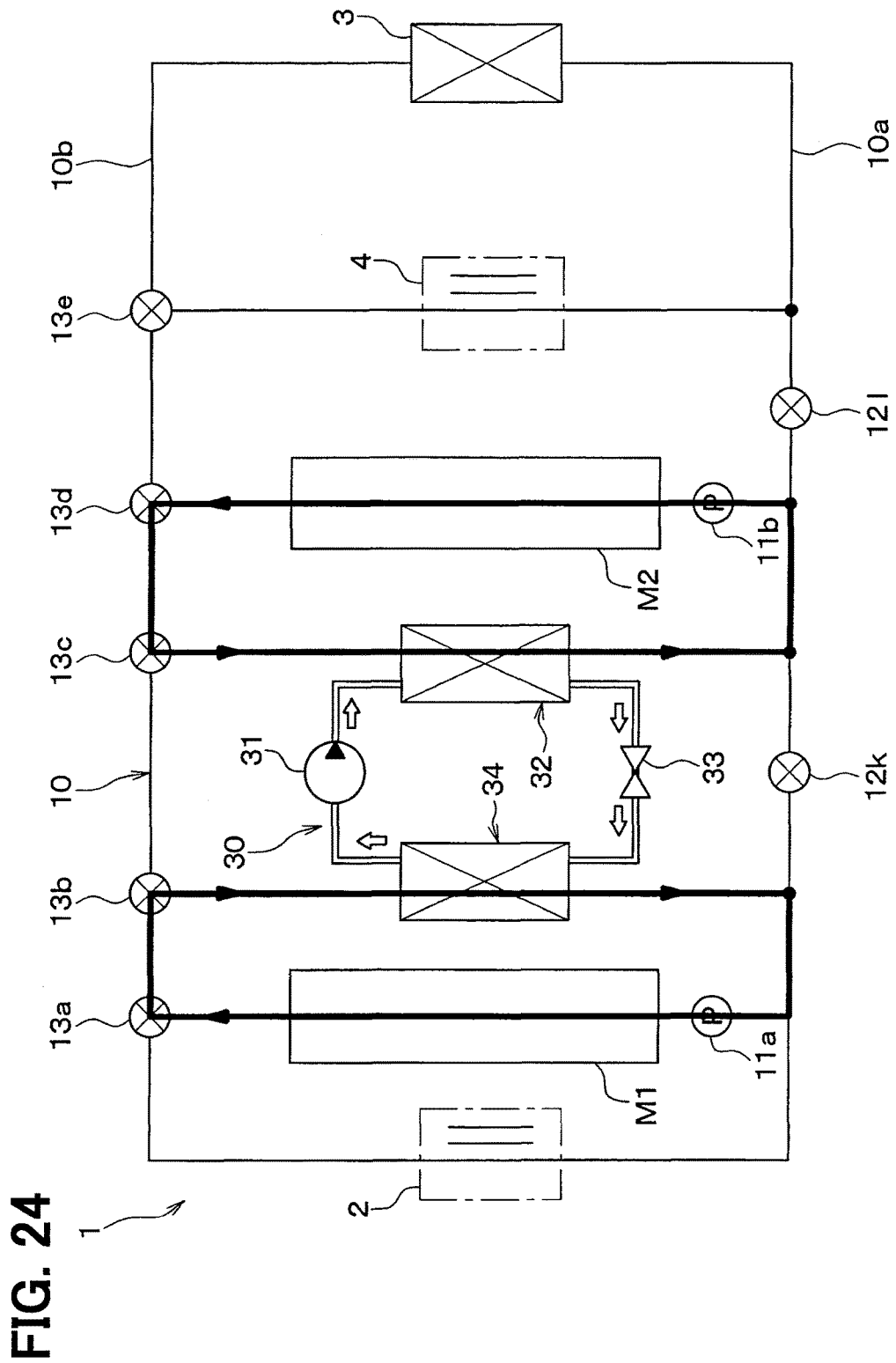
FIG. 24 is a diagram illustrating a flow of the heat medium and so forth at time of warming-up of a second module of the fourth embodiment.

As a result, in the warming-up process of the second module M2, as indicated by black arrows in FIG. 24, the heat medium pressure-fed by the first heat medium pump 11a circulates around the heat medium circuit 10 in order of the first module M1→the evaporator 34 in the refrigeration cycle 30→the first heat medium pump 11a. In addition, the heat medium pressure-fed by the second heat medium pump 11b circulates around the heat medium circuit 10 in order of the second module M2→the condenser 32 in the refrigeration cycle 30→the second heat medium pump 11b.

In the refrigeration cycle 30, the refrigerant discharged from the compressor 31 flows as indicated by white arrows in FIG. 24.

Specifically, the high-pressure refrigerant discharged from the compressor 31 flows into the condenser 32. The high-pressure refrigerant which has flowed into the condenser 32 exchanges heat with the heat medium passing through the second module M2 in the heat medium circuit 10 so as to release the heat. Accordingly, the heat medium passing through the second module M2 is heated. Additionally, in the heat medium circuit 10, the heat medium heated in the condenser 32 flows into the second module M2, so that the second module M2 is heated.

The high-pressure refrigerant flowing out of the condenser 32 has its pressure reduced until it becomes the low-pressure refrigerant at the temperature type expansion valve 33. Then, the low-pressure refrigerant whose pressure has been reduced by the temperature type expansion valve 33 flows into the evaporator 34. The low-pressure refrigerant which has flowed into the evaporator 34 absorbs heat from the heat medium passing through the first module M1 in the heat medium circuit 10 so as to be evaporated. The refrigerant which has flowed out of the evaporator 34 is drawn into the compressor 31 to be compressed again.

Accordingly, the heat medium passing through the first module M1 is cooled. In addition, in the heat medium circuit 10, the heat medium cooled by the evaporator 34 flows into the first module M1, so that the first module M1 is cooled.

As above, in the warming-up process of the second module M2, the heat of the first module M1 is absorbed by the evaporator 34 in the refrigeration cycle 30 through the heat medium; and the heat absorbed by the evaporator 34 can be released to the second module M2 at the condenser 32 via the heat medium. Thus, in the warming-up process of the second module M2 of the present embodiment, the heat of the first module M1 is transferred to the second module M2 through the refrigeration cycle 30. As a result, warming-up of the second module M2 can be realized. Also, at the same time as the warming-up of the second module M2, the first module M1 can be cooled. In this case, the heat is transferred between the first module M1 and the second module M2 by use of the refrigeration cycle 30. Consequently, the temperature of the second module M2 can be raised to a temperature that is higher than the first module M1.

Next, when the amount of electricity stored in the first module M1 approach a predetermined lower limit amount (see time t3 in FIG. 3), the power source for vehicle traveling is switched from the first module M1 into the second module M2. Specifically, the first switch SW1 of the distributor 200 is switched from ON into OFF, and the second switch SW2 is switched from OFF into ON. Accordingly, the electric motor for traveling is driven using electrical energy accumulated in the second module M2. Thus, traveling using the second module M2 is started. During use (discharge) of the second module M2, it is self-heated, so that the warming-up process of the second module M2 (transfer of heat from the first module M1 to the second module M2) is stopped. When the travel by the second module M2 is ended, cooling of the second module M2 is started.

In the cooling process of the second module M2, the twelfth opening and closing valve 12l in the heat medium circuit 10 is opened; and the eleventh opening and closing valve 12k is closed. Furthermore, the fourth and fifth flow passage switching valves 13d, 13e switch into a heat medium flow passage whereby the heat medium flows through the second module M2 and the outdoor heat exchanger 3. Then, the second heat medium pump 11b is operated with the operations of the first heat medium pump 11a and the compressor 31 in the refrigeration cycle 30 stopped.

Figure 25:
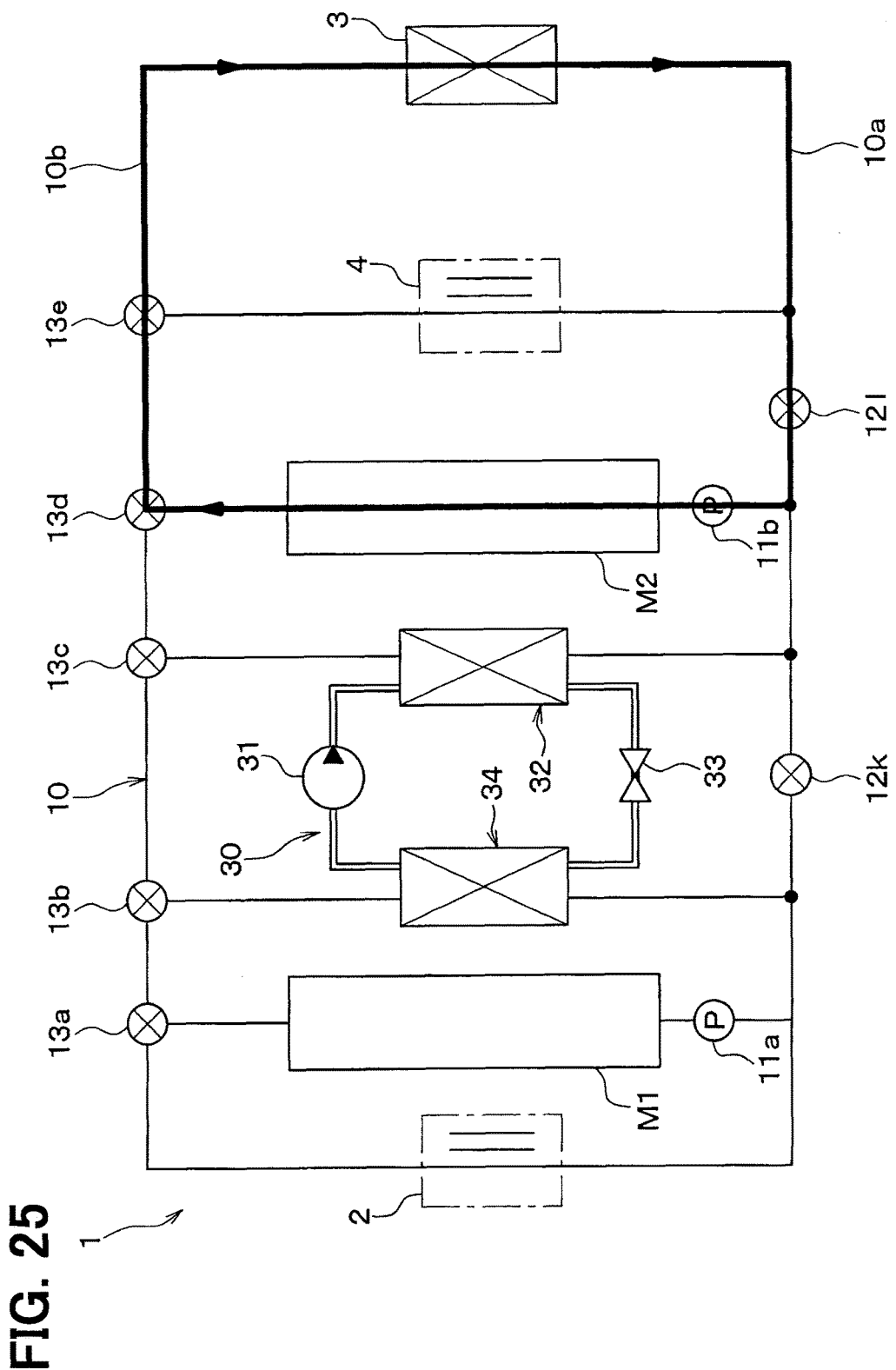
FIG. 25 is a diagram illustrating a flow of the heat medium and so forth at time of cooling of the second module of the fourth embodiment.

As a result, in the cooling process of the second module M2, as indicated by black arrows in FIG. 25, the heat medium pressure-fed by the second heat medium pump 11b circulates around the heat medium circuit 10 in order of the second module M2→the outdoor heat exchanger 3→the second heat medium pump 11b.

As above, in the cooling process of the second module M2, the heat of the used second module M2 is released to the outside air through the outdoor heat exchanger 3, so that cooling of the second module M2 can be realized.

The cooling process of the second module M2 is not limited to the release of the heat of the used second module M2 to the outside air through the outdoor heat exchanger 3. For example, in the cooling process of the second module M2, the fourth and fifth flow passage switching valves 13d, 13e may switch into a heat medium flow passage whereby the heat medium flows through the second module M2 and the low-temperature heat source 4; and the heat of the second module M2 may be absorbed by the low-temperature heat source 4. Accordingly, cooling of the second module M2 can be realized.

Figure 26:
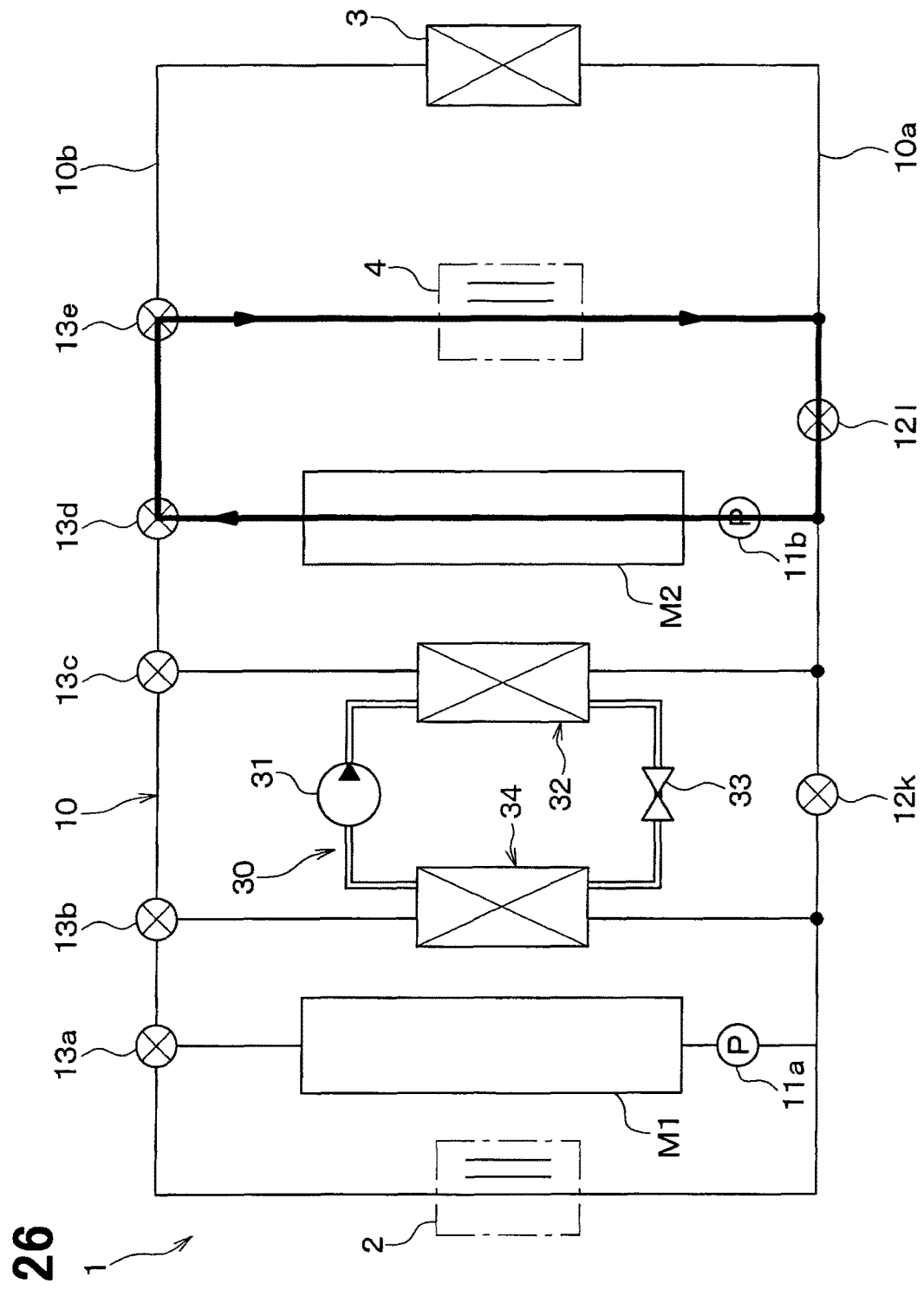
FIG. 26 is a diagram illustrating a flow of the heat medium and so forth at time of cooling of the second module of the fourth embodiment.
Figure 27:
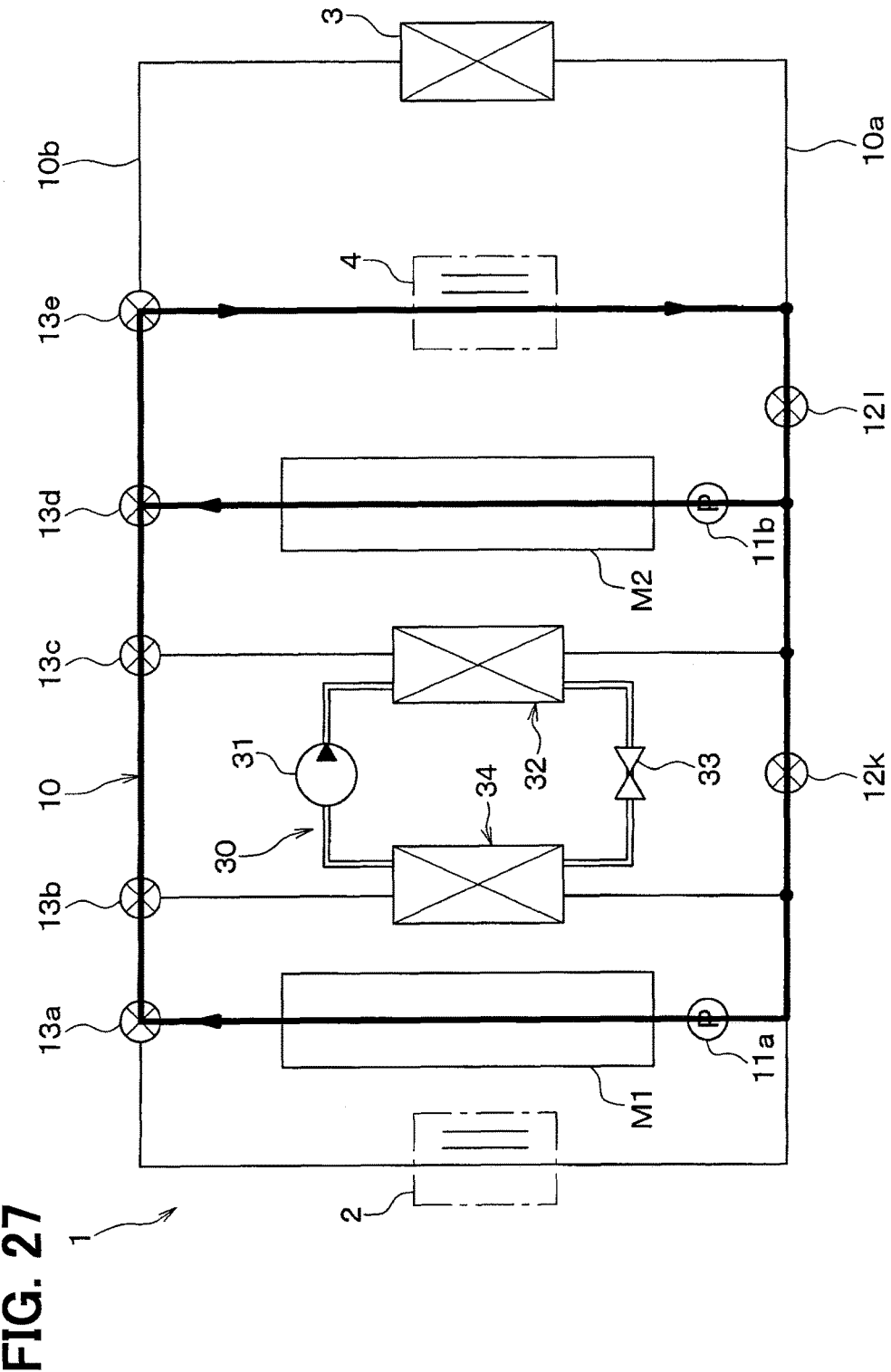
FIG. 27 is a diagram illustrating a flow of the heat medium and so forth at time of cooling of the modules of the fourth embodiment.

In this case, as indicated by black arrows in FIG. 26, the heat medium pressure-fed by the second heat medium pump 11b circulates around the heat medium circuit 10 in order of the second module M2→the low-temperature heat source 4→the second heat medium pump 11b.

If the modules M1, M2 need to be cooled at the same time, the first to fifth flow passage switching valves 13a to 13e switch into a heat medium flow passage whereby the heat medium which has passed through the low-temperature heat source 4 flows into both the first and second modules M1 and M2. Then, the first heat medium pump 11a and the second heat medium pump 11b are operated with the operation of the compressor 31 in the refrigeration cycle 30 stopped.

Accordingly, the heat of the modules M1, M2 is absorbed at the low-temperature heat source 4, so that cooling of the modules M1, M2 can be realized. In this case, as indicated by black arrows in FIG. 27, the heat medium pressure-fed by the first heat medium pump 11a circulates around the heat medium circuit 10 in order of the first module M1→the low-temperature heat source 4→the first heat medium pump 11a. The heat medium pressure-fed by the second heat medium pump 11b circulates around the heat medium circuit 10 in order of the second module M2→the low-temperature heat source 4→the second heat medium pump 11b.

In the above-described temperature regulating device 1 of the present embodiment, through control of the operations of the first and second heat medium pumps 11a, 11b, the eleventh and twelfth opening and closing valves 12k, 12l, the flow passage switching valves 13a to 13e, and the compressor 31 in the refrigeration cycle 30, by efficient use of the heat of a part of the modules M1, M2, the temperature of another part of the modules can be regulated. Accordingly, temperatures of the modules M1, M2 in the battery pack 100 can be efficiently regulated with an increase in the amount of energy given from the outside limited.

In the present embodiment, the heat transfer of the modules M1, M2 is achieved via the refrigeration cycle 30. Accordingly, the module having a low temperature before performing the heat transfer can be warmed up to a higher temperature than the module serving as a heat source.

The first and second heat medium pumps 11a, 11b; the eleventh and twelfth opening and closing valves 12k, 12l; the flow passage switching valves 13a to 13e; and the refrigeration cycle 30 of the present embodiment constitute a heat transfer means that transfers the heat of a part of the modules M1, M2 to another part of the modules.

Fifth Embodiment

A fifth embodiment will be described in reference to FIGS. 28 to 32.

The present embodiment is different from the fourth embodiment mainly in that a four-way valve 35 for switching a flow of refrigerant is added to a refrigeration cycle 30. In the present embodiment, explanation will be given with the description of a part similar or equivalent to the first to fourth embodiments omitted or simplified.

Figure 28:
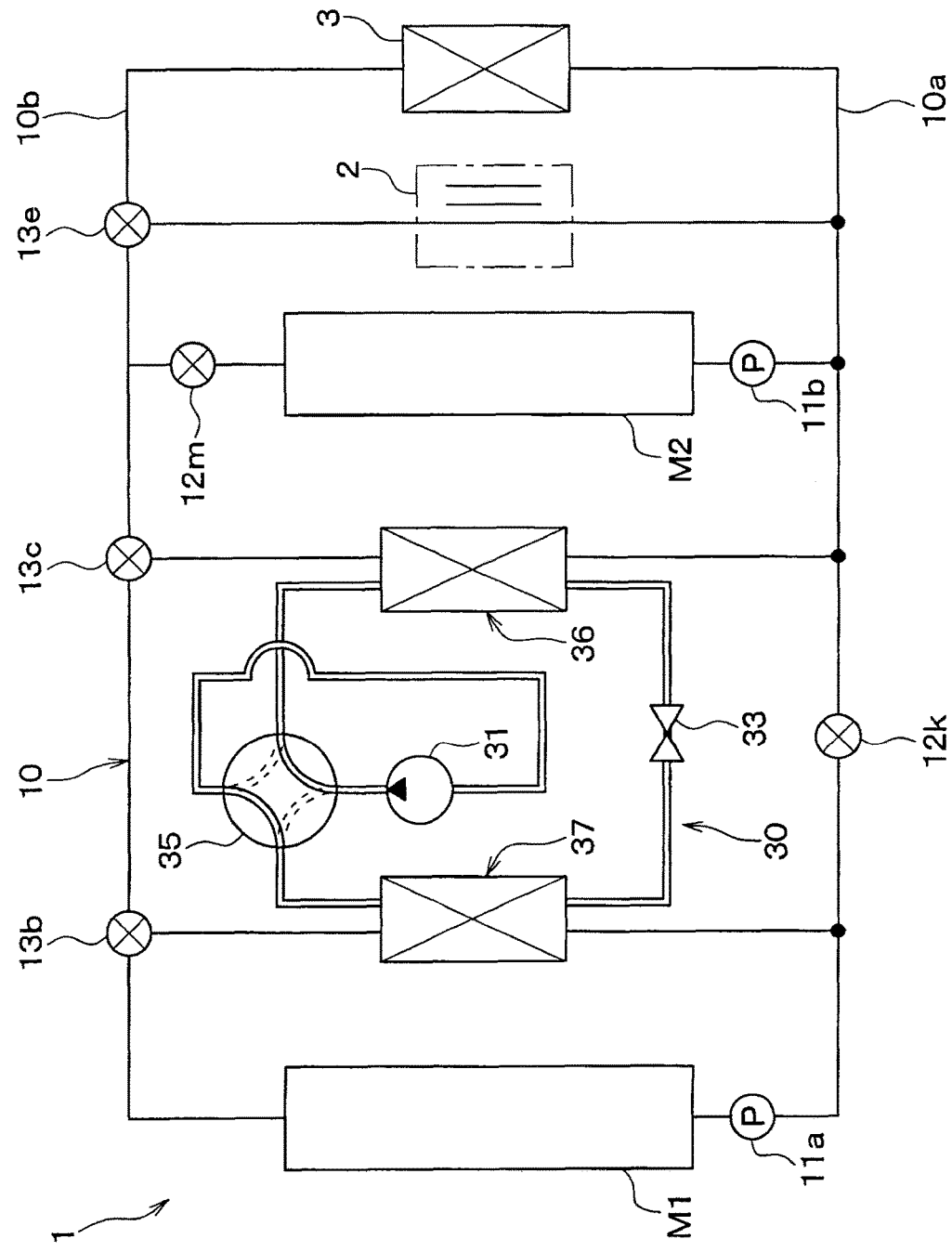
FIG. 28 is a diagram illustrating an entire configuration of a temperature regulating device in accordance with a fifth embodiment.

As illustrated in FIG. 28, a heat medium circuit 10 of the present embodiment is configured as a result of a parallel connection of modules M1, M2 in a battery pack 100; a high-temperature heat source 2; an outdoor heat exchanger 3 that performs heat exchange between outside air and the heat medium; and a first heat exchanger 36 and a second heat exchanger 37 in the refrigeration cycle 30. In the present embodiment, they are connected together such that the first module M1, the second heat exchanger 37, the first heat exchanger 36, the second module M2, the high-temperature heat source 2, and the outdoor heat exchanger 3 are arranged in this order.

A second heat medium pump 11b is disposed in the heat medium circuit 10 on one side of the second module M2. A thirteenth opening and closing valve 12m for opening or closing a downstream side of a heat medium passage of the second module M2 is disposed on the other end side of the second module M2.

This thirteenth opening and closing valve 12m is an electromagnetic valve whose operation is controlled by an output signal from a control device 60. Along with an eleventh opening and closing valve 12k and flow passage switching valves 13b, 13c, 13e, the thirteenth opening and closing valve 12m serves as the flow passage switching means.

In the refrigeration cycle 30 of the present embodiment, the four-way valve 35 as a refrigerant flow passage switching means for switching a flow passage of the refrigerant is disposed on a discharge side of a compressor 31. The operation of this four-way valve 35 is controlled by an output signal from the control device 60. Specifically, in accordance with the output signal from the control device 60, the four-way valve 35 switches between a first refrigerant flow passage whereby the refrigerant discharged from the compressor 31 flows through the first heat exchanger 36→a temperature type expansion valve 33→the second heat exchanger 37→the compressor 31; and a second refrigerant flow passage whereby the refrigerant flows through the second heat exchanger 37→the temperature type expansion valve 33→the first heat exchanger 36→the compressor 31.

If the refrigerant flow passage of the refrigeration cycle 30 is switched into the first refrigerant flow passage by the four-way valve 35, the first heat exchanger 36 functions as a condensation means, and the second heat exchanger 37 functions as the evaporation means. If the refrigerant flow passage of the refrigeration cycle 30 is switched into the second refrigerant flow passage by the four-way valve 35, the second heat exchanger 37 functions as the condensation means, and the first heat exchanger 36 functions as the evaporation means.

In the above-configured temperature regulating device 1, a flow of the heat medium in the heat medium circuit 10 at the time of warming-up processes of the modules M1, M2, and at the time of a cooling process of the second module M2 will be described in reference to FIGS. 29 to 32. In the present embodiment, timing for performing warming-up and cooling of the modules M1, M2 is similar to the fourth embodiment.

(a) Warming-Up of the First Module M1

In the warming-up process of the first module M1, the eleventh opening and closing valve 12$k$ in the heat medium circuit 10 is opened, and the thirteenth opening and closing valve 12 $m$ is closed. Furthermore, the second, third, and fifth flow passage switching valves 13$b$, 13$c$, 13$e$ switch into a heat medium passage connecting an outlet side of a heat medium passage of the first module M1 and the high-temperature heat source 2. Then, a first heat medium pump 11$a$ is operated.

Figure 29:
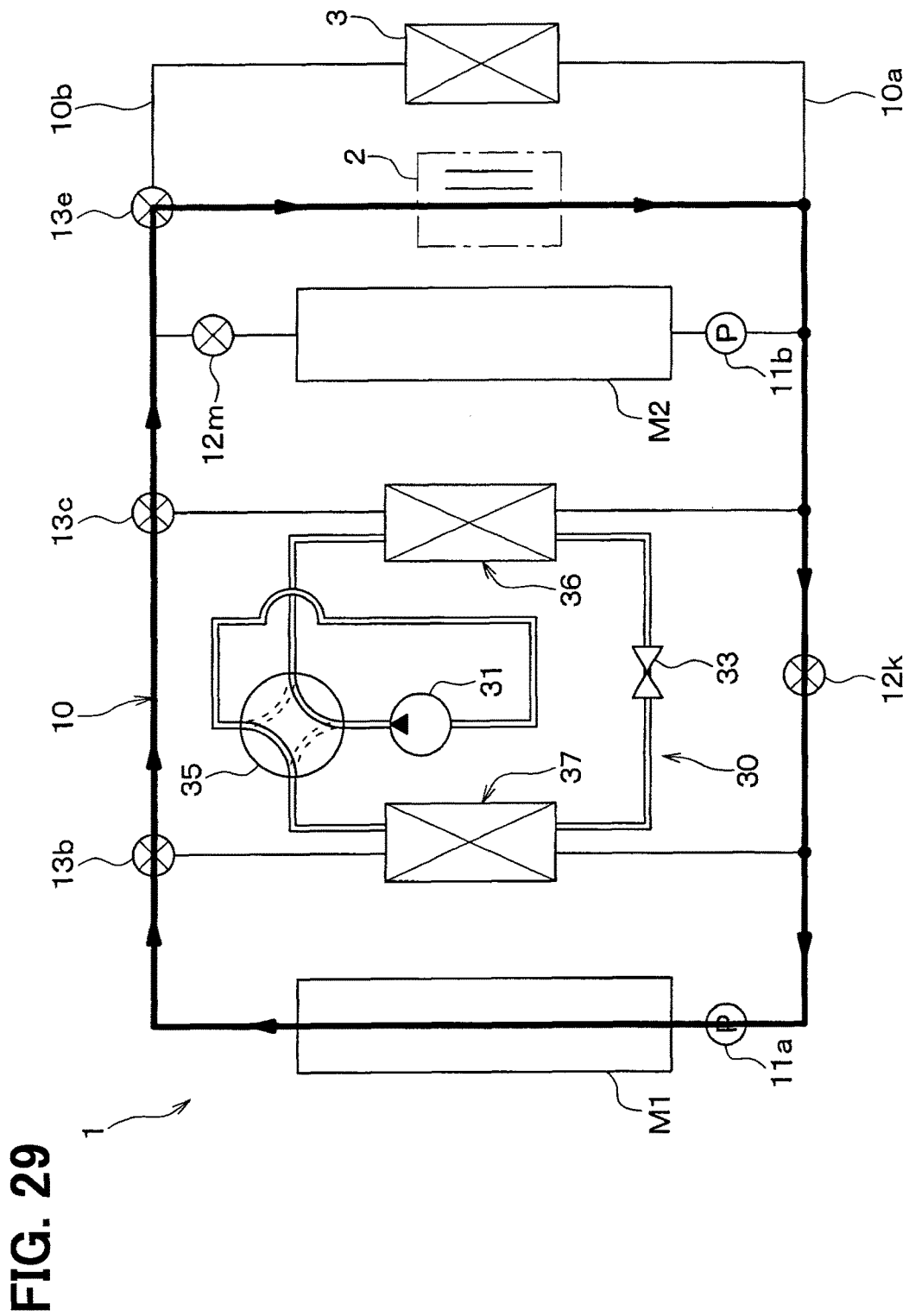
FIG. 29 is a diagram illustrating a flow of a heat medium and so forth at time of warming-up of a first module of the fifth embodiment.

As a result, in the warming-up process of the first module M1, as indicated by black arrows in FIG. 29, the heat medium pressure-fed by the first heat medium pump 11$a$ circulates around the heat medium circuit 10 in order of the first module M1→the high-temperature heat source 2→the first heat medium pump 11$a$. In this case, the heat of the high-temperature heat source 2 is released to the first module M1 via the heat medium.

As above, in the warming-up process of the first module M1, the heat of the high-temperature heat source 2 is transferred to the first module M1, so that warming-up of the first module M1 can be realized.

(b) Warming-Up of the Second Module M2

In the warming-up process of the second module M2, the eleventh opening and closing valve 12$k$ in the heat medium circuit 10 is closed; and the second flow passage switching valve 13$b$ switches into a heat medium passage connecting an outlet side of the heat medium passage of the first module M1 and an inlet side of the second heat exchanger 37. In addition, the thirteenth opening and closing valve 12$m$ in the heat medium circuit 10 is opened; and the third and fifth flow passage switching valves 13$c$, 13$e$ switch into a heat medium passage connecting an outlet side of the heat medium passage of the second module M2 and an inlet side of the first heat exchanger 36.

Furthermore, the refrigerant flow passage in the refrigeration cycle 30 is switched by the four-way valve 35 such that the refrigerant discharged from the compressor 31 flows through the first heat exchanger 36→the temperature type expansion valve 33→the second heat exchanger 37→the compressor 31. Then, the first and second heat medium pumps 11$a$, 11$b$, and the compressor 31 are operated.

Figure 30:
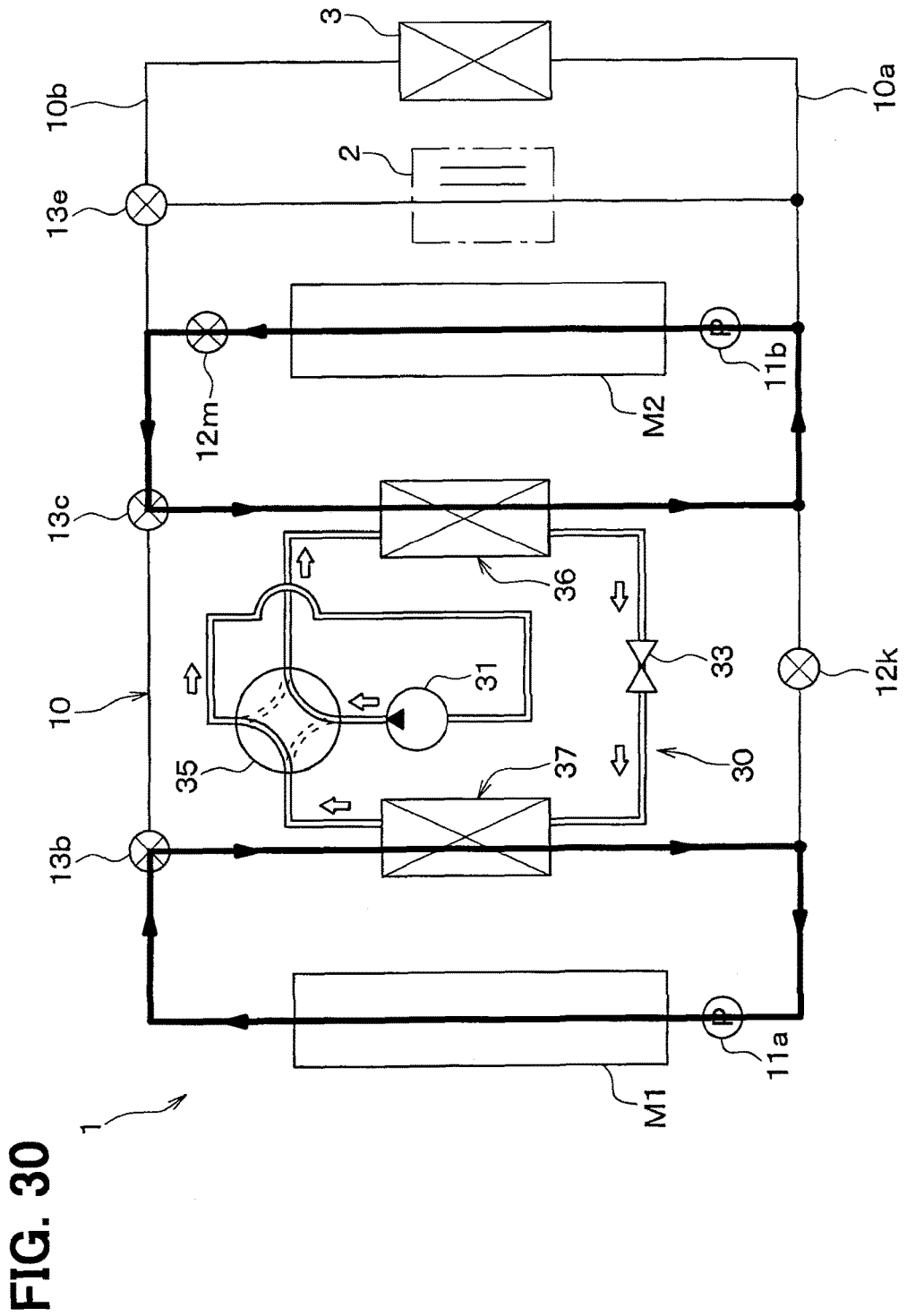
FIG. 30 is a diagram illustrating a flow of the heat medium and so forth at time of warming-up of a second module of the fifth embodiment.

As a result, in the warming-up process of the second module M2, as indicated by black arrows in FIG. 30, the heat medium pressure-fed by the first heat medium pump 11$a$ circulates around the heat medium circuit 10 in order of the first module M1→the second heat exchanger 37 in the refrigeration cycle 30→the first heat medium pump 11$a$. In addition, the heat medium pressure-fed by the second heat medium pump 11$b$ circulates around the heat medium circuit 10 in order of the second module M2→the first heat exchanger 36 in the refrigeration cycle 30→the second heat medium pump 11$b$.

In the refrigeration cycle 30, the refrigerant discharged from the compressor flows as indicated by white arrows in FIG. 30.

Specifically, the high-pressure refrigerant discharged from the compressor 31 flows into the first heat exchanger 36 which serves as the condensation means. The high-pressure refrigerant which has flowed into the first heat exchanger 36 exchanges heat with the heat medium passing through the second module M2 in the heat medium circuit 10 so as to release the heat. Accordingly, the heat medium passing through the second module M2 is heated. Additionally, in the heat medium circuit 10, the heat medium heated in the first heat exchanger 36 flows into the second module M2, so that the second module M2 is heated.

The high-pressure refrigerant flowing out of the first heat exchanger 36 has its pressure reduced until it becomes the low-pressure refrigerant at the temperature type expansion valve 33. Then, the low-pressure refrigerant whose pressure has been reduced by the temperature type expansion valve 33 flows into the second heat exchanger 37 which serves as the evaporation means. The low-pressure refrigerant which has flowed into the second heat exchanger 37 absorbs heat from the heat medium passing through the first module M1 in the heat medium circuit 10 so as to be evaporated. The refrigerant which has flowed out of the second heat exchanger 37 is drawn into the compressor 31 to be compressed again.

Accordingly, the heat medium passing through the first module M1 is cooled. In addition, in the heat medium circuit 10, the heat medium cooled by the second heat exchanger 37 flows into the first module M1, so that the first module M1 is cooled.

As above, in the warming-up process of the second module M2, the heat of the first module M1 is transferred to the second module M2 via the refrigeration cycle 30, so that warming-up of the second module M2 can be realized. At the same time as the warming-up of the second module M2, the first module M1 can be cooled. In this case, the heat of the first module M1 is transferred to the second module M2 using the refrigeration cycle 30. Consequently, the temperature of the second module M2 can be raised to a temperature that is higher than the first module M1.

(c) Cooling of the Second Module M2

In the cooling process of the second module M2, the thirteenth opening and closing valve 12$m$ in the heat medium circuit 10 is opened; and the eleventh opening and closing valve 12$k$ is closed. Furthermore, the third and fifth flow passage switching valves 13$c$, 13$e$ switch into a heat medium flow passage whereby the heat medium passing through the heat medium passage of the second module M2 flows into the outdoor heat exchanger 3. Then, the second heat medium pump 11$b$ is operated with the operations of the first heat medium pump 11$a$ and the compressor 31 in the refrigeration cycle 30 stopped.

Figure 31:
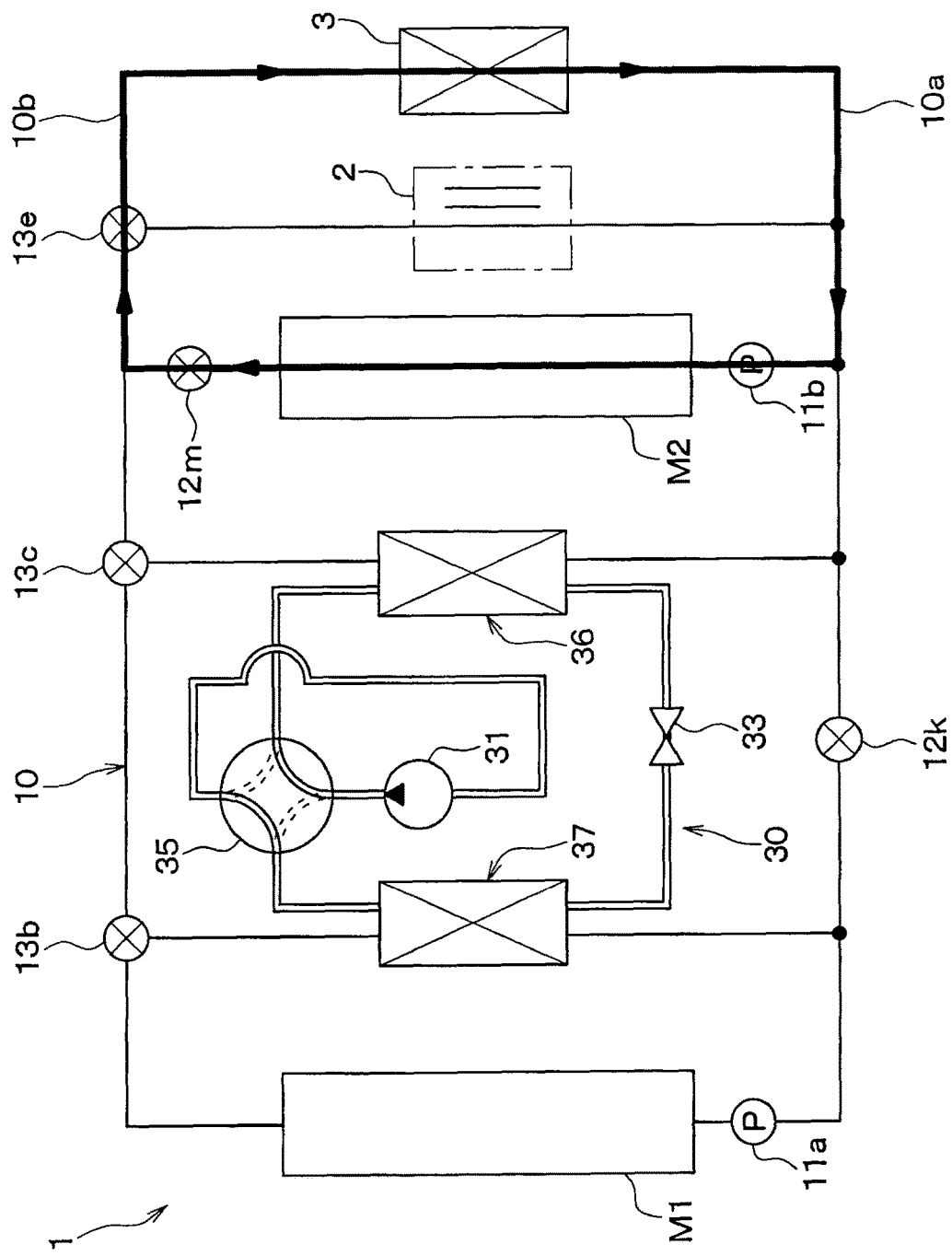
FIG. 31 is a diagram illustrating a flow of the heat medium and so forth at time of cooling of the second module of the fifth embodiment.

As a result, in the cooling process of the second module M2, as indicated by black arrows in FIG. 31, the heat medium pressure-fed by the second heat medium pump 11$b$ circulates around the heat medium circuit 10 in order of the second module M2→the outdoor heat exchanger 3→the second heat medium pump 11$b$. In this case, the heat of the second module M2 is released to the outside air through the outdoor heat exchanger 3.

As above, in the cooling process of the second module M2, the heat of the second module M2 is released to the outside air, so that cooling of the second module M2 can be realized.

(d) Heat Transfer Between the Modules M1, M2

In the above-described warming-up process of the second module M2, it is illustrated that the heat of the first module M1 is transferred to the second module M2 via the refrigeration cycle 30. Conversely, warming-up of the first module M1 can also be performed by transferring the heat of the second module M2 to the first module M1 via the refrigeration cycle 30.

In such a warming-up process of the first module M1, the heat medium circuit 10 is switched into a heat medium flow passage similar to the warming-up process of the second module M2 Furthermore, the refrigerant flow passage in the refrigeration cycle 30 is switched by the four-way valve 35 such that the refrigerant discharged from the compressor 31 flows through the second heat exchanger 37→the temperature type expansion valve 33→the first heat exchanger 36→the compressor 31.

Figure 32:
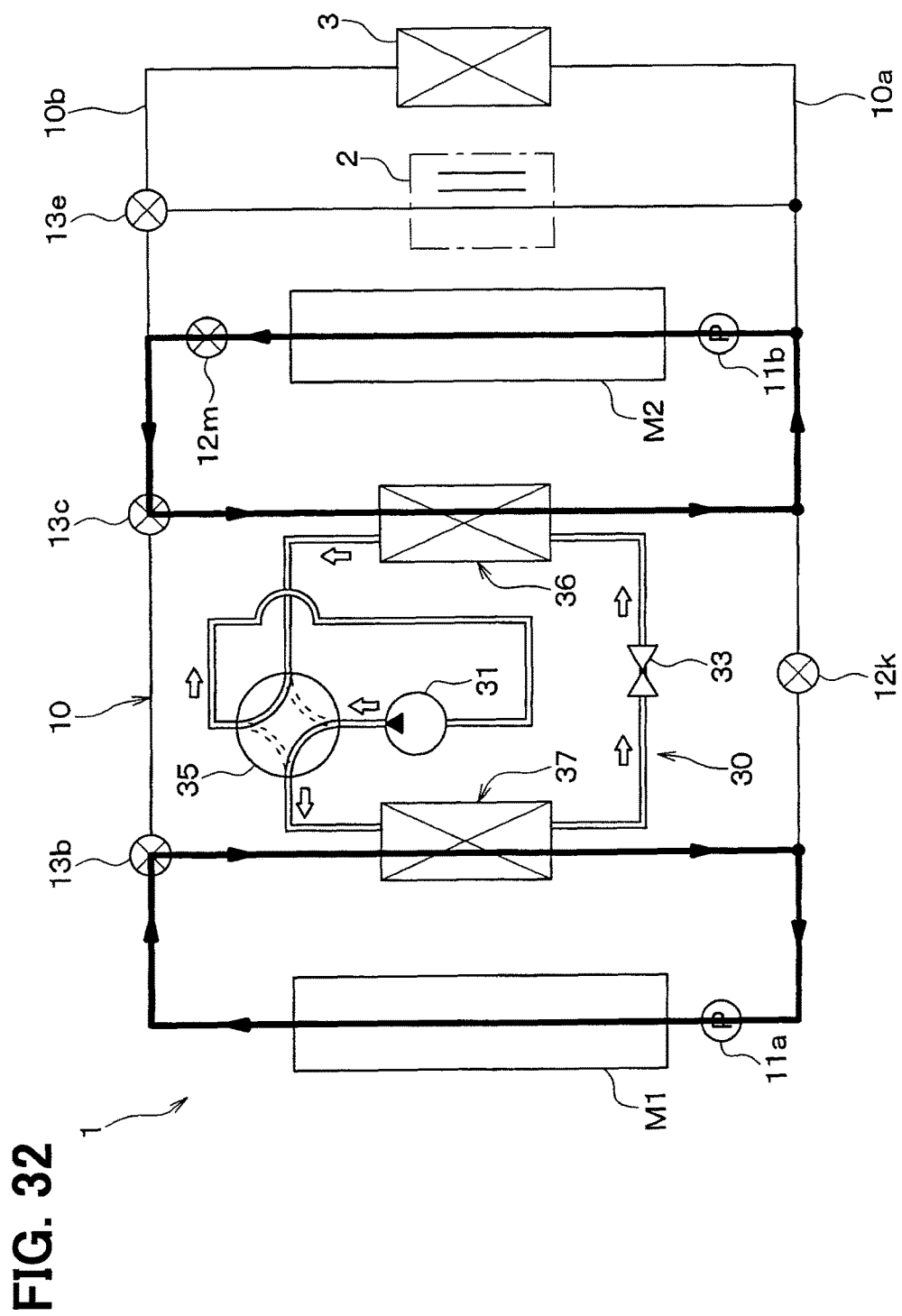
FIG. 32 is a diagram illustrating a flow of the heat medium and so forth at time of warming-up of the first module of the fifth embodiment.

As a result, as indicated by black arrows in FIG. 32, the heat medium pressure-fed by the first heat medium pump 11a circulates around the heat medium circuit 10 in order of the first module M1→the second heat exchanger 37 in the refrigeration cycle 30→the first heat medium pump 11a. In addition, the heat medium pressure-fed by the second heat medium pump 11b circulates around the heat medium circuit 10 in order of the second module M2→the first heat exchanger 36 in the refrigeration cycle 30→the second heat medium pump 11b.

In the refrigeration cycle 30, the refrigerant discharged from the compressor 31 flows as indicated by white arrows in FIG. 32. Specifically, the high-pressure refrigerant discharged from the compressor 31 flows into the second heat exchanger 37 which serves as the condensation means. The high-pressure refrigerant which has flowed into the second heat exchanger 37 exchanges heat with the heat medium passing through the first module M1 in the heat medium circuit 10 so as to release the heat. Accordingly, the heat medium passing through the first module M1 is heated. Additionally, in the heat medium circuit 10, the heat medium heated in the second heat exchanger 37 flows into the first module M1, so that the first module M1 is heated.

The high-pressure refrigerant flowing out of the second heat exchanger 37 has its pressure reduced until it becomes the low-pressure refrigerant at the temperature type expansion valve 33. Then, the low-pressure refrigerant whose pressure has been reduced by the temperature type expansion valve 33 flows into the first heat exchanger 36 which serves as the evaporation means. The low-pressure refrigerant which has flowed into the first heat exchanger 36 absorbs heat from the heat medium passing through the second module M2 in the heat medium circuit 10 so as to be evaporated. The refrigerant which has flowed out of the first heat exchanger 36 is drawn into the compressor 31 to be compressed again.

Accordingly, the heat medium passing through the second module M2 is cooled. In addition, in the heat medium circuit 10, the heat medium cooled by the first heat exchanger 36 flows into the second module M2, so that the second module M2 is cooled.

As above, in the process of warming-up of the first module M1 by the heat of the second module M2, the heat of the second module M2 is transferred to the first module M1 via the refrigeration cycle 30. Accordingly, warming-up of the first module M1 can be realized. At the same time as the warming-up of the first module M1, the second module M2 can be cooled.

In the above-described temperature regulating device 1 of the present embodiment, through control of the operations of the first and second heat medium pumps 11a, 11b, the eleventh and thirteenth opening and closing valves 12k, 12m, the flow passage switching valves 13b, 13c, 13e, and the compressor 31 in the refrigeration cycle 30, by efficient use of the heat of a part of the modules M1, M2, the temperature of another part of the modules can be regulated. Accordingly, temperatures of the modules M1, M2 in the battery pack 100 can be efficiently regulated with an increase in the amount of energy given from the outside limited.

In the present embodiment, the heat transfer of the modules M1, M2 is achieved via the refrigeration cycle 30. Accordingly, the module having a low temperature before performing the heat transfer can be warmed up to a higher temperature than the module serving as a heat source.

The first and second heat medium pumps 11a, 11b; the eleventh and thirteenth opening and closing valves 12k, 12m; the flow passage switching valves 13b, 13c, 13e; and the refrigeration cycle 30 of the present embodiment constitute a heat transfer means that transfers the heat of a part of the modules M1, M2 to another part of the modules.

Sixth Embodiment

A sixth embodiment will be described in reference to FIGS. 33 to 39.

The present embodiment is different from the fourth embodiment mainly in that a heat medium circuit 10 is constituted of three circuits. In the present embodiment, explanation will be given with the description of a part similar or equivalent to the first to fifth embodiments omitted or simplified.

Figure 33:
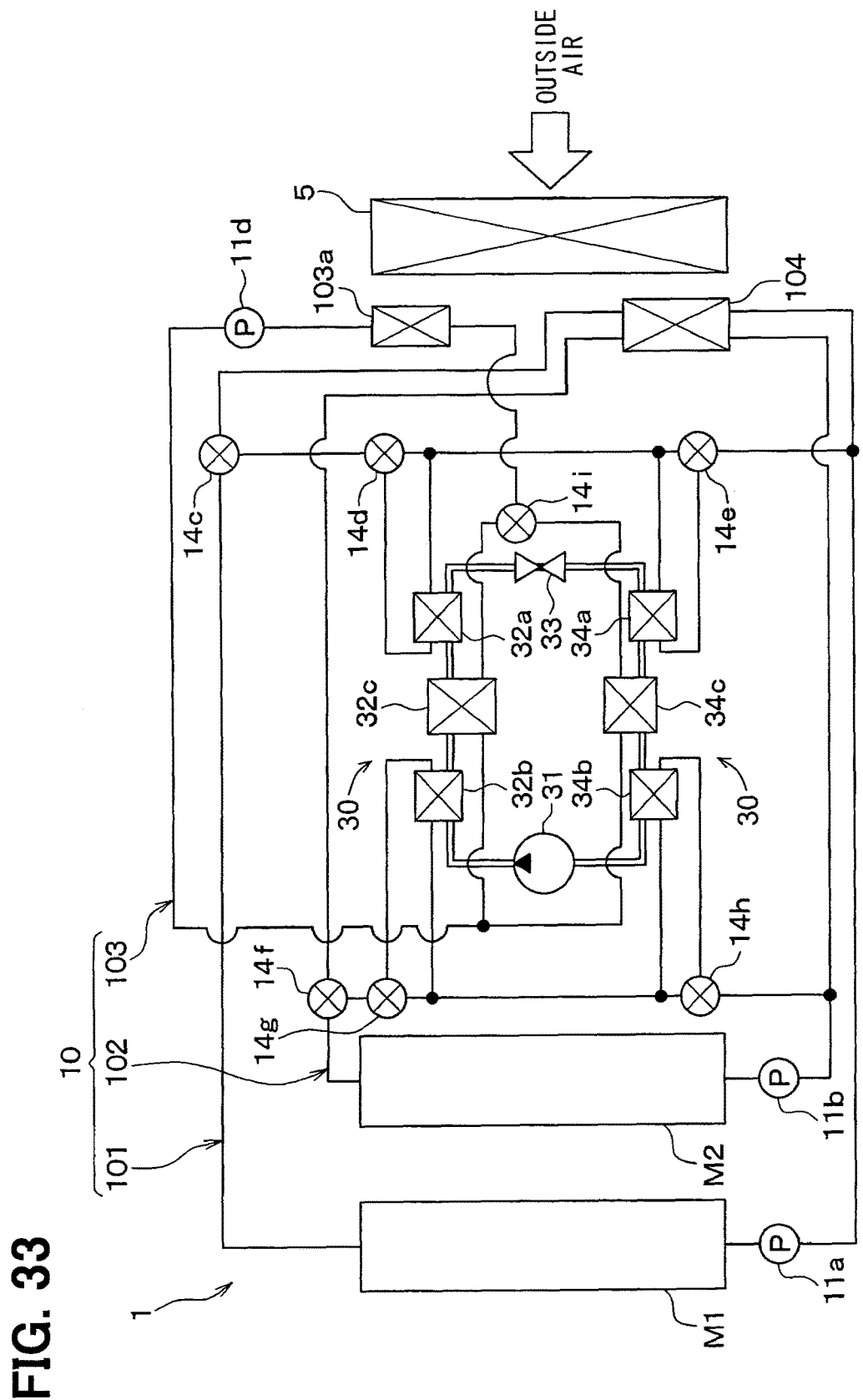
FIG. 33 is a diagram illustrating an entire configuration of a temperature regulating device in accordance with a sixth embodiment.

As illustrated in FIG. 33, the heat medium circuit 10 of the present embodiment includes a first heat medium circuit 101 connected to a heat medium passage of a first module M1, a second heat medium circuit 102 connected to a heat medium passage of a second module M2, and a third heat medium circuit 103 connected to a first outdoor heat exchanger 103a.

A first heat medium pump 11a that is connected to an inlet side of the heat medium passage of the first module M1 for pressure-feeding a heat medium into the heat medium passage of the first module M1 is disposed in the first heat medium circuit 101. Along the first heat medium circuit 101, there are provided three three-way valves 14c to 14e for switching into: a heat medium flow passage which guides the refrigerant flowing out of the heat medium passage of the first module M1 into a first condenser 32a described in greater detail hereinafter; a heat medium flow passage which guides the refrigerant flowing out of the heat medium passage of the first module M1 into a first evaporator 34a described in greater detail hereinafter; and a heat medium flow passage which guides the refrigerant flowing out of the heat medium passage of the first module M1 into a second outdoor heat exchanger 104 described in greater detail hereinafter.

The three-way valve 14c of the three three-way valves 14c to 14e switches a heat medium flow passage of the first heat medium circuit 101 between a heat medium flow passage whereby the heat medium flows toward the second outdoor heat exchanger 104, and a heat medium flow passage whereby the heat medium flows by bypassing the second outdoor heat exchanger 104.

The three-way valve 14d switches the heat medium flow passage of the first heat medium circuit 101 between a heat medium flow passage for flowing the heat medium toward the first condenser 32a, and a heat medium flow passage whereby the heat medium flows by bypassing the first condenser 32a.

The three-way valve 14e switches the heat medium flow passage of the first heat medium circuit 101 between a heat medium flow passage for flowing the heat medium toward the first evaporator 34a, and a heat medium flow passage whereby the heat medium flows by bypassing the first evaporator 34a.

A second heat medium pump 11b that is connected to an inlet side of the heat medium passage of the second module M2 for pressure-feeding the heat medium into the heat medium passage of the second module M2 is disposed in the second heat medium circuit 102. Along the second heat medium circuit 102, there are provided three three-way valves 14f to 14h for switching into: a heat medium flow passage which guides the refrigerant flowing out of the heat medium passage of the second module M2 into a second condenser 32b described in greater detail hereinafter; a heat medium flow passage which guides the refrigerant flowing out of the heat medium passage of the second module M2 into a second evaporator 34b described in greater detail hereinafter; and a heat medium flow passage which guides the refrigerant flowing out of the heat medium passage of the second module M2 into the second outdoor heat exchanger 104 described in greater detail hereinafter.

The three-way valve 14f of the three three-way valves 14f to 14h switch a heat medium flow passage of the second heat medium circuit 102 between a heat medium flow passage whereby the heat medium flows toward the second outdoor heat exchanger 104, and a heat medium flow passage whereby the heat medium flows by bypassing the second outdoor heat exchanger 104.

The three-way valve 14g switches the heat medium flow passage of the second heat medium circuit 102 between a heat medium flow passage for flowing the heat medium toward the second condenser 32b, and a heat medium flow passage whereby the heat medium flows by bypassing the second condenser 32b.

The three-way valve 14h switches the heat medium flow passage of the second heat medium circuit 102 between a heat medium flow passage for flowing the heat medium toward the second evaporator 34b, and a heat medium flow passage whereby the heat medium flows by bypassing the second evaporator 34b.

The second outdoor heat exchanger 104 is a composite-type heat exchanger that makes one heat medium of the heat medium flowing through the first heat medium circuit 101 and the heat medium flowing through the second heat medium circuit 102 exchange heat with outside air blown through a radiator 5; and that exchanges heat between the heat medium flowing through the first heat medium circuit 101 and the heat medium flowing through the second heat medium circuit 102.

A fourth heat medium pump 11d for circulating the heat medium in the circuit is disposed in the third heat medium circuit 103. The first outdoor heat exchanger 103a that makes the heat medium flowing through the third heat medium circuit 103 exchange heat with the outside air blown through the radiator 5 is disposed in the third heat medium circuit 103 on a heat medium suction side of the fourth heat medium pump 11d. A three-way valve 14i for switching between a heat medium flow passage which guides the heat medium pressure-fed by the fourth heat medium pump 11d into a third condenser 32c described in greater detail hereinafter; and a heat medium flow passage which guides the heat medium into a third evaporator 34c is disposed in the third heat medium circuit 103.

The operations of the three-way valves 14c to 14i arranged in these first to third heat medium circuits 101 to 103 are controlled by output signals from a control device 60. In addition, the three-way valves 14c to 14i function as the flow passage switching means that switches between the heat medium flow passages of the heat medium circuits 101 to 103.

In the refrigeration cycle 30 of the present embodiment, the second condenser 32b, the third condenser 32c, the first condenser 32a are connected together in this order in series on a discharge side of a compressor 31. The first condenser 32a is a heat release means that releases the heat of the high-pressure refrigerant to the heat medium flowing through the first heat medium circuit 101. The second condenser 32b is a heat release means that releases the heat of the high-pressure refrigerant to the heat medium flowing through the second heat medium circuit 102. The third condenser 32c is a heat release means that releases the heat of the high-pressure refrigerant to the heat medium flowing through the third heat medium circuit 103.

In the refrigeration cycle 30 of the present embodiment, the first evaporator 34a, the third evaporator 34c, and the second condenser 34b are connected together in this order in series on an outlet side of a temperature type expansion valve 33. The first evaporator 34a is an evaporation means that absorbs the heat of the heat medium flowing through the first heat medium circuit 101 to evaporate the low-pressure refrigerant. The second evaporator 34b is an evaporation means that absorbs the heat of the heat medium flowing through the second heat medium circuit 102 to evaporate the low-pressure refrigerant. The third evaporator 34c is an evaporation means that absorbs the heat of the heat medium flowing through the third heat medium circuit 103 to evaporate the low-pressure refrigerant.

In the above-configured temperature regulating device 1, flows of the heat media in the heat medium circuits 101 to 103 at the time of warming-up processes of the modules M1, M2, and at the time of a cooling process of the second module M2 will be described in reference to FIGS. 34 to 39. In the present embodiment, timing for performing warming-up and cooling of the modules M1, M2 is similar to the fourth embodiment.

(a) Warming-Up of the First Module M1

In the warming-up process of the first module M1, the three-way valves 14c to 14e of the first heat medium circuit 101 switch into the heat medium passage connecting the outlet side of the heat medium passage of the first module M1 and the inlet side of the first condenser 32a. The three-way valve 14i in the third heat medium circuit 103 switches into a heat medium flow passage for guiding the heat medium pressure-fed by the fourth heat medium pump 11d into the third evaporator 34c. Then, the first and fourth heat medium pumps 11a, 11d, and the compressor 31 in the refrigeration cycle 30 are operated with the second heat medium pump 11b stopped.

Figure 34:
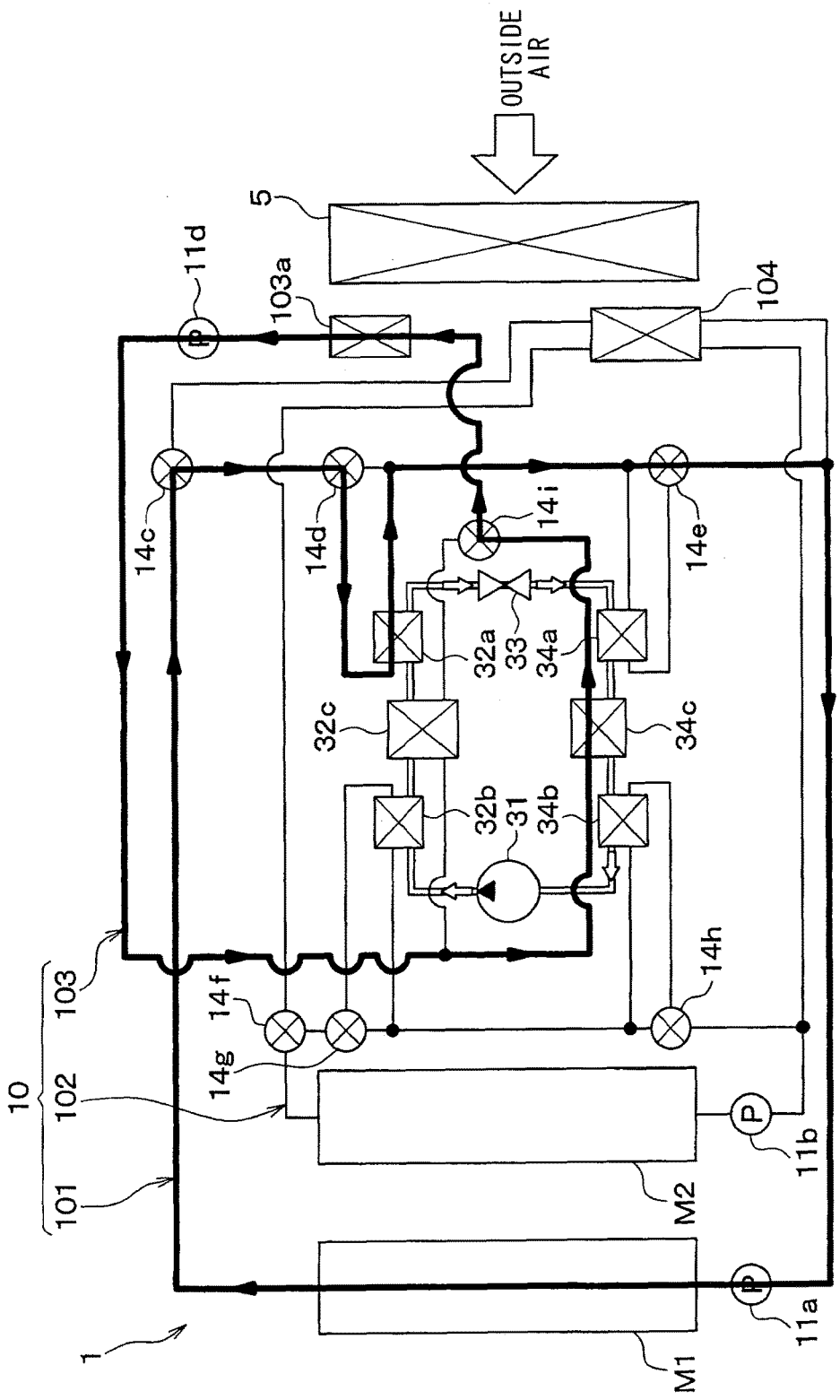
FIG. 34 is a diagram illustrating a flow of a heat medium and so forth at time of warming-up of a first module in the sixth embodiment.

As a result, in the warming-up process of the first module M1, as indicated by black arrows in FIG. 34, the heat medium pressure-fed by the first heat medium pump 11a circulates around the first heat medium circuit 101 in order of the first module M1→the first condenser 32a in the refrigeration cycle 30→the first heat medium pump 11a.

Moreover, the heat medium pressure-fed by the fourth heat medium pump 11d circulates around the third heat medium circuit 103 in order of the third evaporator 34c in the refrigeration cycle 30→the first outdoor heat exchanger 103a→the fourth heat medium pump 11d.

In the refrigeration cycle 30, the refrigerant discharged from the compressor 31 flows as indicated by white arrows in FIG. 34. Specifically, the high-pressure refrigerant discharged from the compressor 31 flows in order of the second condenser 32b→the third condenser 32c→the first condenser 32*a*. In this case, the high-pressure refrigerant which has flowed into the first condenser 32*a* exchanges heat with the heat medium passing through the first module M1 in the first heat medium circuit 101 so as to release the heat. Accordingly, the heat medium passing through the first module M1 is heated. Additionally, in the first heat medium circuit 101, the heat medium heated in the first condenser 32*a* flows into the first module M1, so that the first module M1 is heated.

The high-pressure refrigerant flowing out of the first condenser 32*a* has its pressure reduced until it becomes the low-pressure refrigerant at the temperature type expansion valve 33. The low-pressure refrigerant whose pressure has been reduced by the temperature type expansion valve 33 flows in order of the first evaporator 34*a*→the third evaporator 34*c*→the second evaporator 34*b*. In this case, the low-pressure refrigerant flowing into the third evaporator 34*c* absorbs the heat of the heat medium flowing through the third heat medium circuit 103 so as to be evaporated. In the third heat medium circuit 103, the heat medium whose temperature has been decreased in the third evaporator 34*c* has its temperature raised by the outside air at the first outdoor heat exchanger 103*a*.

As above, in the warming-up process of the first module M1, the heat of the high-pressure refrigerant in the refrigeration cycle 30 is transferred to the first module M1, so that warming-up of the first module M1 can be realized.

(b) Warming-Up of the Second Module M2

In the warming-up process of the second module M2, the three-way valves 14*c* to 14*e* of the first heat medium circuit 101 switch into the heat medium passage connecting the outlet side of the heat medium passage of the first module M1 and the inlet side of the first evaporator 34*a*. The three-way valves 14*f* to 14*h* of the second heat medium circuit 102 switch into the heat medium flow passage connecting the outlet side of the heat medium passage of the second module M2 and the inlet side of the second condenser 32*b*.

Then, the first and second heat medium pumps 11*a*, 11*b*, and the compressor 31 in the refrigeration cycle 30 are operated with the fourth heat medium pump 11*d* stopped.

Figure 35:
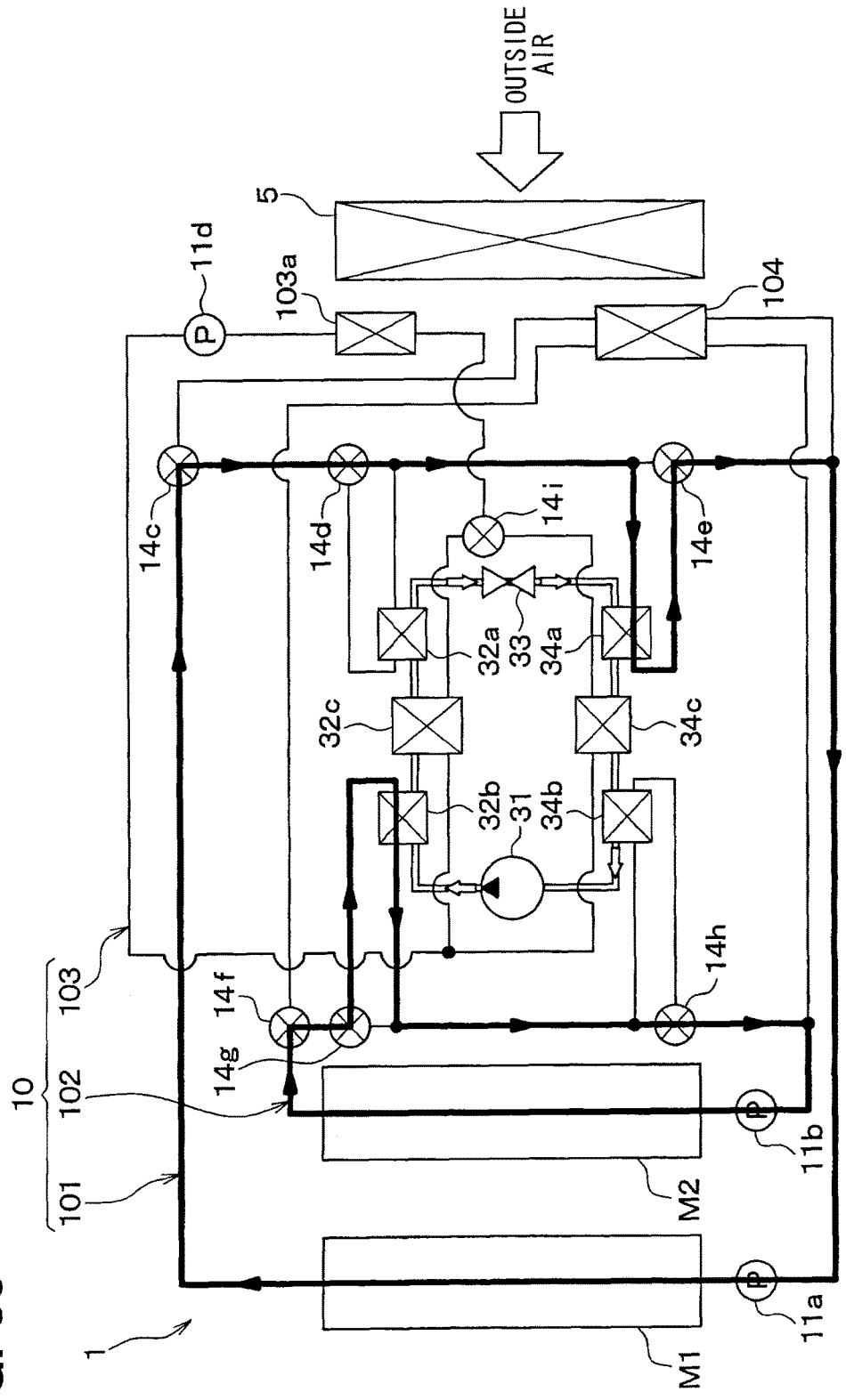
FIG. 35 is a diagram illustrating a flow of the heat medium and so forth at time of warming-up of a second module in the sixth embodiment.

As a result, in the warming-up process of the second module M2, as indicated by black arrows in FIG. 35, the heat medium pressure-fed by the first heat medium pump 11*a* circulates around the first heat medium circuit 101 in order of the first module M1→the first evaporator 34*a* in the refrigeration cycle 30→the first heat medium pump 11*a*.

In addition, the heat medium pressure-fed by the second heat medium pump 11*b* circulates around the second heat medium circuit 102 in order of the second module M2→the second condenser 32*b* in the refrigeration cycle 30→the second heat medium pump 11*b*.

In the refrigeration cycle 30, the refrigerant discharged from the compressor 31 flows as indicated by white arrows in FIG. 35. In this case, the high-pressure refrigerant which has flowed into the second condenser 32*b* exchanges heat with the heat medium passing through the second module M2 in the second heat medium circuit 102 so as to release the heat. Accordingly, the heat medium passing through the second module M2 is heated. Additionally, in the second heat medium circuit 102, the heat medium heated in the second condenser 32*b* flows into the heat medium flow passage of the second module M2, so that the second module M2 is heated.

The low-pressure refrigerant flowing into the first evaporator 34*a* absorbs the heat of the heat medium flowing through the first heat medium circuit 101 so as to be evaporated. Accordingly, the heat medium passing through the first module M1 is cooled. In addition, in the first heat medium circuit 101, the heat medium cooled by the first evaporator 34*a* flows into the heat medium passage of the first module M1, so that the first module M1 is cooled.

As above, in the warming-up process of the second module M2, the heat of the first module M1 is transferred to the second module M2 via the refrigeration cycle 30, so that warming-up of the second module M2 can be realized. Also, at the same time as the warming-up of the second module M2, the first module M1 can be cooled. In this case, the heat of the first module M1 is transferred to the second module M2 using the refrigeration cycle 30. Consequently, the temperature of the second module M2 can be raised to a temperature that is higher than the first module M1.

(c) Cooling of the Second Module M2

In the cooling process of the second module M2, the three-way valves 14*f* to 14*h* of the second heat medium circuit 102 switch into the heat medium flow passage connecting the outlet side of the heat medium passage of the second module M2 and the inlet side of the second outdoor heat exchanger 104. Then, the second heat medium pump 11*b* is operated with the first and fourth heat medium pumps 11*a*, 11*d* and the compressor 31 in the refrigeration cycle 30 stopped.

Figure 36:
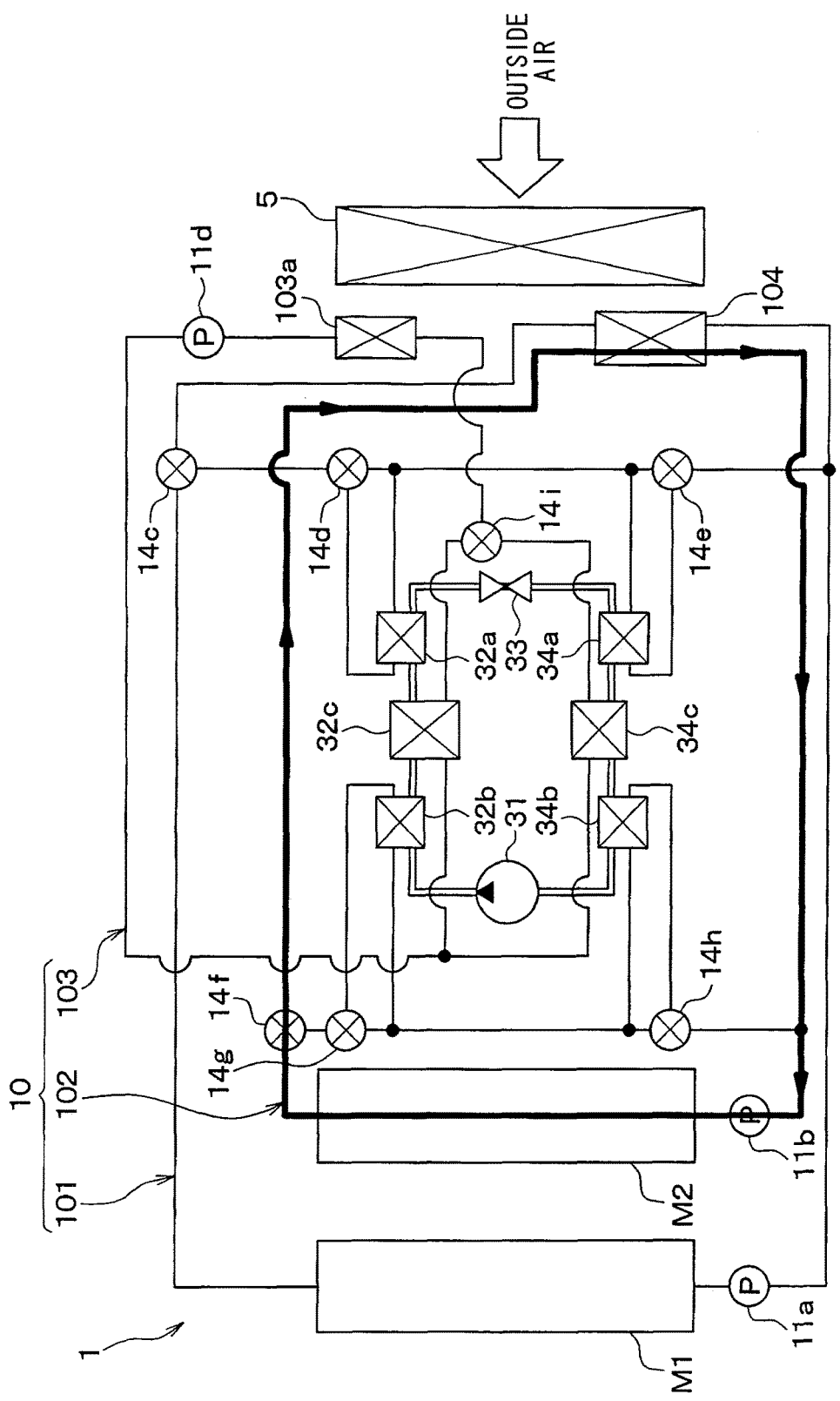
FIG. 36 is a diagram illustrating a flow of the heat medium and so forth at time of cooling of the second module in the sixth embodiment.

As a result, in the cooling process of the second module M2, as indicated by black arrows in FIG. 36, the heat medium pressure-fed by the second heat medium pump 11*b* circulates around the second heat medium circuit 102 in order of the second module M2→the second outdoor heat exchanger 104→the second heat medium pump 11*b*. In this case, the heat of the second module M2 is released to the outside air through the second outdoor heat exchanger 104.

As above, in the cooling process of the second module M2, the heat of the second module M2 is released to the outside air, so that cooling of the second module M2 can be realized.

(d) Cooling of the Modules M1, M2

In the case of cooling of the modules M1, M2, the three-way valves 14*c* to 14*e* of the first heat medium circuit 101 switch into the heat medium flow passage connecting the outlet side of the heat medium passage of the first module M1 and the inlet side of the first evaporator 34*a*. The three-way valves 14*f* to 14*h* of the second heat medium circuit 102 switch into the heat medium flow passage connecting the outlet side of the heat medium passage of the second module M2 and the inlet side of the second evaporator 34*b*. The three-way valve 14*i* in the third heat medium circuit 103 switches into a heat medium flow passage for guiding the heat medium pressure-fed by the fourth heat medium pump 11*d* into the third condenser 32*c*. The heat medium pumps 11*a*, 11*b*, 11*d*, and the compressor 31 in the refrigeration cycle 30 are operated.

Figure 37:
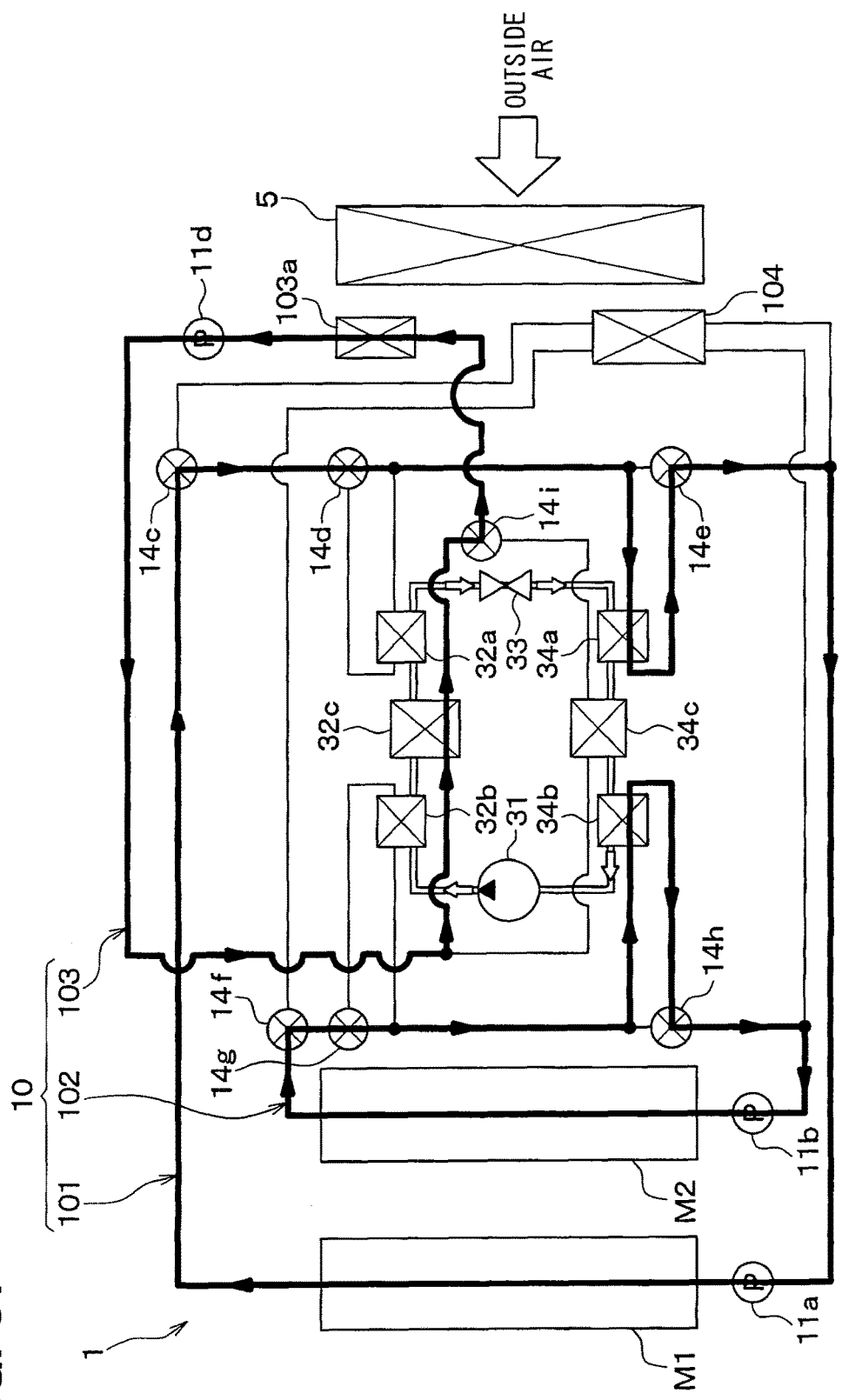
FIG. 37 is a diagram illustrating a flow of the heat medium and so forth at time of cooling of modules in the sixth embodiment.

As a result, in the cooling process of the modules M1, M2, as indicated by black arrows in FIG. 37, the heat medium pressure-fed by the first heat medium pump 11*a* circulates around the first heat medium circuit 101 in order of the first module M1→the first evaporator 34*a*→the first heat medium pump 11*a*. In addition, the heat medium pressure-fed by the second heat medium pump 11*b* circulates around the second heat medium circuit 102 in order of the second module M2→the second evaporator 34*b*→the second heat medium pump 11*b*. Moreover, the heat medium pressure-fed by the fourth heat medium pump 11*d* circulates around the third heat medium circuit 103 in order of the third condenser 32*c*→the first outdoor heat exchanger 103*a*.

In the refrigeration cycle 30, the refrigerant discharged from the compressor 31 flows as indicated by white arrows in FIG. 37. In this case, the high-pressure refrigerant flowing into the third condenser 32c exchanges heat with the heat medium circulating around the third heat medium circuit 103 so as to release heat.

Furthermore, the low-pressure refrigerant flowing into the first and second evaporators 34a, 34b absorbs the heat of the heat media flowing through the first and second heat medium circuits 101, 102 so as to be evaporated. Accordingly, the heat media which have passed through the first and second modules M1, M2 are cooled, and the modules M1, M2 are cooled.

As above, in the cooling process of the modules M1, M2, the heat of the modules M1, M2 is released to the outside air via the refrigeration cycle 30, so that cooling of the modules M1, M2 can be realized.

(e) First Heat Transfer Between the Modules M1 and M2

In the above-described warming-up process of the second module M2, it is illustrated that the heat of the first module M1 is transferred to the second module M2 via the refrigeration cycle 30. Alternatively, the heat of the first module M1 can also be transferred to the second module M2 without the refrigeration cycle 30.

In this case, the three-way valves 14c to 14e of the first heat medium circuit 101 switch into the heat medium flow passage connecting the outlet side of the heat medium passage of the first module M1 and the inlet side of the second outdoor heat exchanger 104. The three-way valves 14f to 14h of the second heat medium circuit 102 switch into the heat medium flow passage connecting the outlet side of the heat medium passage of the second module M2 and the inlet side of the second outdoor heat exchanger 104. Then, the first and second heat medium pumps 11a, 11b are operated with the fourth heat medium pump 11d and the compressor 31 in the refrigeration cycle 30 stopped.

Figure 38:
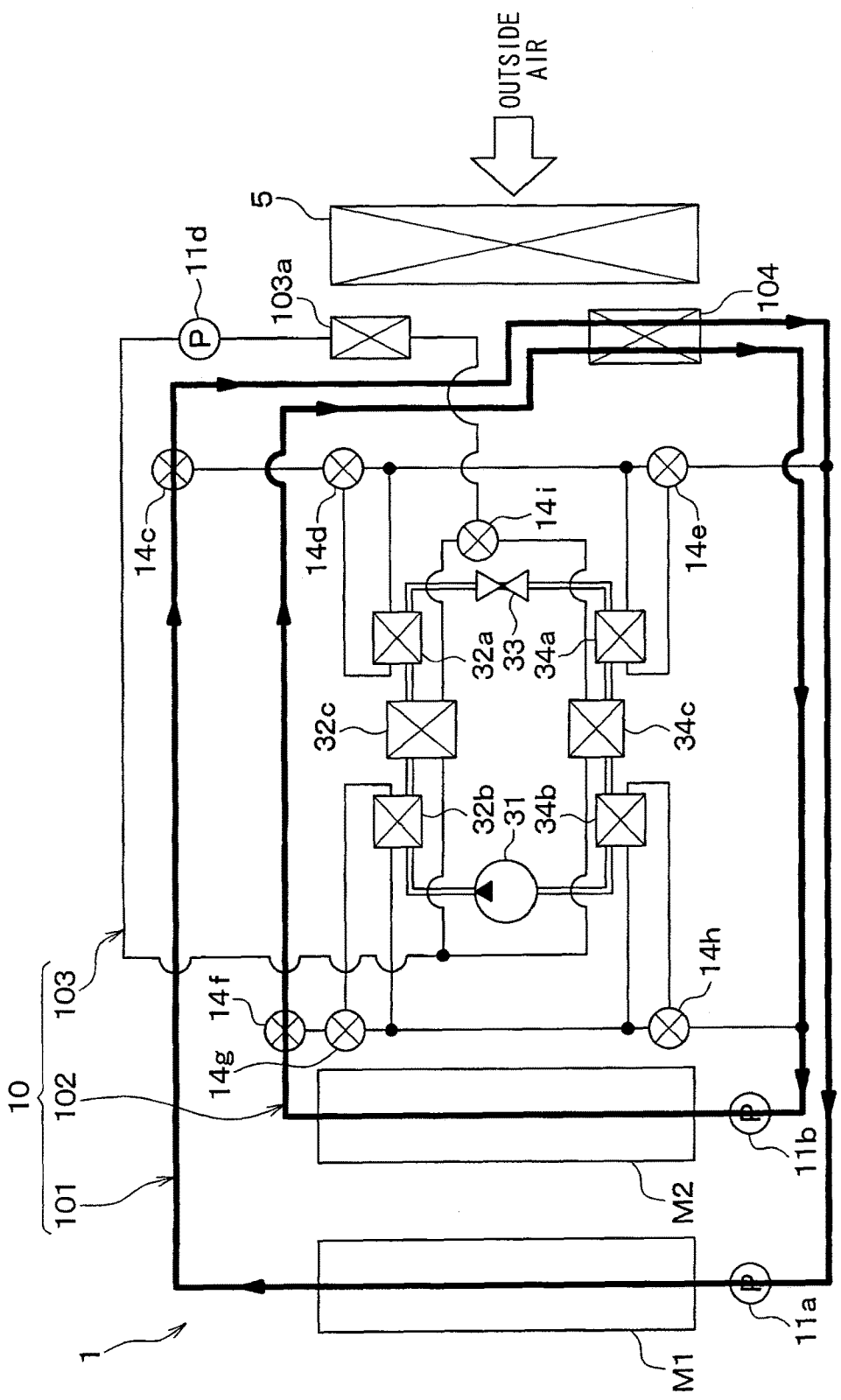
FIG. 38 is a diagram illustrating a flow of the heat medium and so forth at time of warming-up of the second module due to heat transfer between the modules in the sixth embodiment.

As a result, as indicated by black arrows in FIG. 38, the heat medium pressure-fed by the first heat medium pump 11a circulates around the first heat medium circuit 101 in order of the first module M1→the second outdoor heat exchanger 104→the first heat medium pump 11a. In addition, the heat medium pressure-fed by the second heat medium pump 11b circulates around the second heat medium circuit 102 in order of the second module M2→the second outdoor heat exchanger 104→the second heat medium pump 11b. In this case, the heat of the first module M1 is released to the heat medium flowing through the second heat medium circuit 102 through the second outdoor heat exchanger 104. Accordingly, the heat medium which has passed through the second module M2 is heated, and the second module M2 is heated. Thus, the warming-up of the second module M2 can be realized.

(f) Second Heat Transfer Between the Modules M1 and M2

In the above-described warming-up process of the second module M2, it is illustrated that the heat of the first module M1 is transferred to the second module M2 via the refrigeration cycle 30. Conversely, warming-up of the first module M1 can also be performed by transferring the heat of the second module M2 to the first module M1 via the refrigeration cycle 30.

In such a warming-up process of the first module M1, the three-way valves 14c to 14e of the first heat medium circuit 101 switch into the heat medium flow passage connecting the outlet side of the heat medium passage of the first module M1 and the inlet side of the first condenser 32a. Moreover, the three-way valves 14f to 14h of the second heat medium circuit 102 switch into the heat medium flow passage connecting the outlet side of the heat medium passage of the second module M2 and the inlet side of the second evaporator 34b. Then, the first and second heat medium pumps 11a, 11b, and the compressor 31 in the refrigeration cycle 30 are operated with the fourth heat medium pump 11d stopped.

Figure 39:
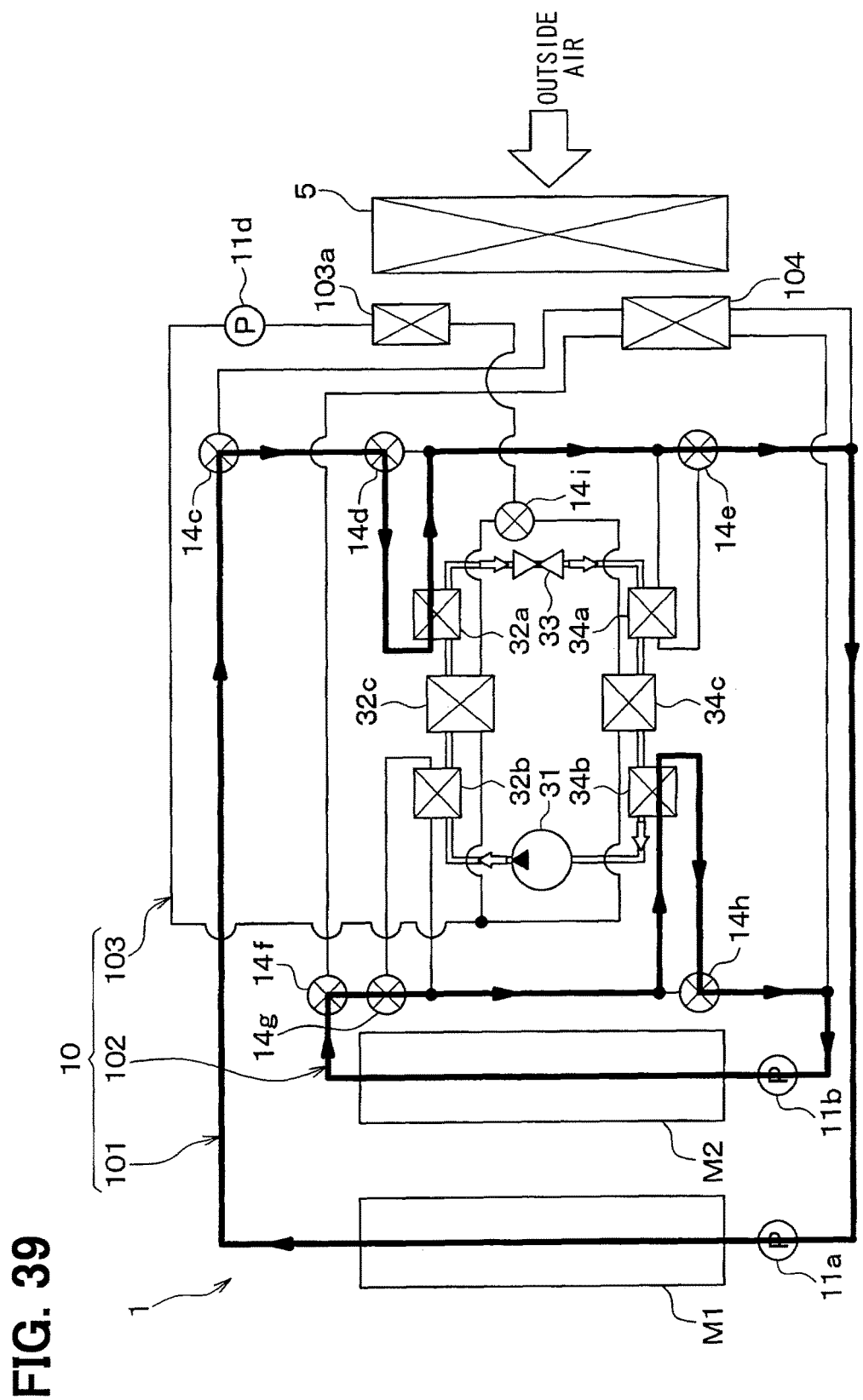
FIG. 39 is a diagram illustrating a flow of the heat medium and so forth at time of warming-up of the first module due to the heat transfer between the modules in the sixth embodiment.

As a result, as indicated by black arrows in FIG. 39, the heat medium pressure-fed by the first heat medium pump 11a circulates around the first heat medium circuit 101 in order of the first module M1→the first condenser 32a→the first heat medium pump 11a. In addition, the heat medium pressure-fed by the second heat medium pump 11b circulates around the second heat medium circuit 102 in order of the second module M2→the second evaporator 34b→the second heat medium pump 11b.

In the refrigeration cycle 30, the refrigerant discharged from the compressor 31 flows as indicated by white arrows in FIG. 39. In this case, the high-pressure refrigerant flowing into the first condenser 32a exchanges heat with the heat medium circulating around the first heat medium circuit 101 so as to release heat. Accordingly, the heat medium flowing through the first heat medium circuit 101 is heated, and the first module M1 is heated.

Furthermore, the low-pressure refrigerant which has flowed into the second evaporator 34b absorbs the heat of the heat medium flowing through the second heat medium circuit 102 so as to be evaporated. Accordingly, the heat medium which has passed through the second module M2 is heated, and the second module M2 is cooled.

As above, in the process of warming-up of the first module M1 by the heat of the second module M2, the heat of the second module M2 is transferred to the first module M1 via the refrigeration cycle 30, so that warming-up of the first module M1 can be realized. At the same time as the warming-up of the first module M1, the second module M2 can be cooled.

In the above-described temperature regulating device 1 of the present embodiment, through control of the operations of the heat medium pumps 11a, 11b, 11d, and the three-way valves 14e to 14i along the first to the third heat medium circuits 101, 102, 103, and the compressor 31 in the refrigeration cycle 30, by efficient use of the heat of a part of the modules M1, M2, the temperature of another part of the modules can be regulated. Accordingly, temperatures of the modules M1, M2 in the battery pack 100 can be efficiently regulated with an increase in the amount of energy given from the outside limited.

In the present embodiment, heat transfer of the modules M1, M2 through the refrigeration cycle 30 is achieved. Accordingly, the module having a low temperature before performing the heat transfer can be warmed up to a higher temperature than the module serving as a heat source.

The heat medium pumps 11a, 11b, the three-way valves 14e to 14h, and the refrigeration cycle 30 of the present embodiment constitute a heat transfer means that transfers the heat of a part of the modules M1, M2 to another part of the modules.

Seventh Embodiment

Figure 40:
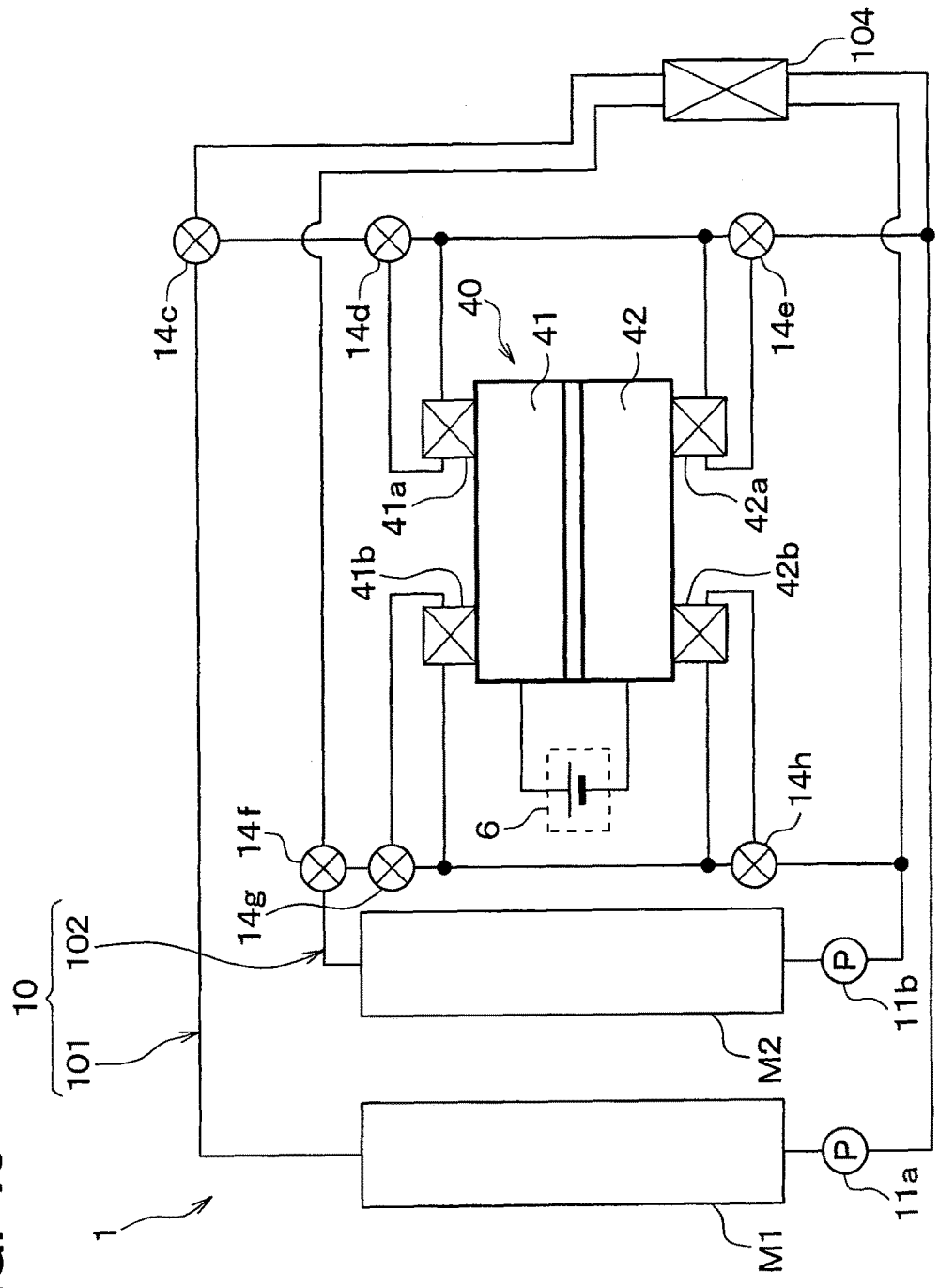
FIG. 40 is a diagram illustrating an entire configuration of a temperature regulating device in accordance with a seventh embodiment.

A seventh embodiment will be described in reference to FIG. 40.

The present embodiment is different from the sixth embodiment in that heat is transferred between modules M1 and M2 via a thermoelectric element (e.g., Peltier device) 40 having a heat release part 41 that releases heat upon energization and a heat absorption part 42 that absorbs heat upon energization. In the present embodiment, explanation will be given with the description of a part similar or equivalent to the first to sixth embodiments omitted or simplified.

The thermoelectric element 40 is connected to an in-vehicle battery 6 serving as a power source for a control device 60 and so forth. The thermoelectric element 40 is operated by supply of electric power from the in-vehicle battery 6. The energization of the thermoelectric element 40 is controlled by the control device 60.

A first heat releasing part 41a which releases the heat produced in the heat release part 41 to a heat medium flowing through a first heat medium circuit 101, and a second heat releasing part 41b which releases the heat to a heat medium flowing through a second heat medium circuit 102 are arranged in thermal contact with the heat release part 41 of this thermoelectric element 40.

A first heat absorbing part 42a which absorbs the heat of the heat medium flowing through the first heat medium circuit 101, and a second heat absorbing part 42b which absorbs the heat of the heat medium flowing through the second heat medium circuit 102 are arranged in thermal contact with the heat absorption part 42 of the thermoelectric element 40.

In the above-configured temperature regulating device 1, for example, in a case of transfer of heat of the first module M1 to the second module M2, three-way valves 14c to 14e along the first heat medium circuit 101 switch into a heat medium passage connecting an outlet side of a heat medium passage of the first module M1 and an inlet side of the first heat absorbing part 42a. Three-way valves 14f to 14h of the second heat medium circuit 102 switch into a heat medium flow passage connecting an outlet side of a heat medium passage of the second module M2 and an inlet side of the second heat releasing part 41b. Then, first and second heat medium pumps 11a, 11b are operated, and electric power is supplied to the thermoelectric element 40 from the in-vehicle battery 6.

As a result, the heat medium pressure-fed by the first heat medium pump 11a circulates around the first heat medium circuit 101 in order of the first module M1→the first heat absorbing part 42a→the first heat medium pump 11a. In this case, the heat of the heat medium which has passed through the first module M1 is absorbed into the heat absorption part 42 of the thermoelectric element 40 via the first heat absorbing part 42a. The heat medium circulating around the first heat medium circuit 101 is cooled. Accordingly, the 1st module M1 is cooled.

In addition, the heat medium pressure-fed by a second heat medium pump 11b circulates around the second heat medium circuit 102 in order of the second module M2→the second heat releasing part 41b→the second heat medium pump 11b. In this case, at the second heat releasing part 41b, the heat of the heat release part 41 of the thermoelectric element 40 is released to the heat medium which has passed through the second module M2. The heat medium circulating around the second heat medium circuit 102 is heated. Accordingly, the second module M2 is heated.

As above, the heat of the first module M1 is transferred to the second module M2 via the thermoelectric element 40, so that warming-up of the second module M2 can be realized. At the same time as the warming-up of the second module M2, the first module M1 can be cooled. In this case, the heat of the first module M1 is transferred to the second module M2 using the thermoelectric element 40. Consequently, the temperature of the second module M2 can be raised to a temperature that is higher than the first module M1.

Conversely, in a case of transfer of the heat of the second module M2 to the first module M1, the three-way valves 14c to 14e of the first heat medium circuit 101 switch into the heat medium flow passage connecting the outlet side of the heat medium passage of the first module M1 and the inlet side of the first heat releasing part 41a. Moreover, the three-way valves 14f to 14h of the second heat medium circuit 102 switch into the heat medium passage connecting the outlet side of the heat medium passage of the second module M2 and the inlet side of the second heat absorbing part 42b. Then, first and second heat medium pumps 11a, 11b are operated, and electric power is supplied to the thermoelectric element 40 from the in-vehicle battery 6.

As a result, the heat medium pressure-fed by the first heat medium pump 11a circulates around the first heat medium circuit 101 in order of the first module M1→the first heat releasing part 41a→the first heat medium pump 11a. In this case, through the first heat releasing part 41a, the heat of the heat release part 41 of the thermoelectric element 40 is released to the heat medium which has passed through the first module M1. The heat medium circulating around the first heat medium circuit 101 is heated. Accordingly, the 1st module M1 is heated.

In addition, the heat medium pressure-fed by the second heat medium pump 11b circulates around the second heat medium circuit 102 in order of the second module M2→the second heat absorbing part 42b→the second heat medium pump 11b. In this case, the heat of the heat medium which has passed through the second module M2 is absorbed into the heat absorption part 42 of the thermoelectric element 40 at the second heat absorbing part 42b. The heat medium circulating around the second heat medium circuit 102 is cooled. Accordingly, the second module M2 is cooled.

As above, the heat of the second module M2 is transferred to the first module M1 via the thermoelectric element 40, so that warming-up of the first module M1 can be realized. At the same time as the warming-up of the first module M1, the second module M2 can be cooled. In this case, the heat of the second module M2 is transferred to the first module M1 using the thermoelectric element 40. Consequently, the temperature of the first module M1 can be raised to a temperature that is higher than the second module M2.

In the above-described temperature regulating device 1 of the present embodiment, through control of the operations of the heat medium pumps 11a, 11b, and the three-way valves 14c to 14h along the first and second heat medium circuits 101, 102, and the energization of the thermoelectric element 40, by efficient use of the heat of a part of the modules M1, M2, the temperature of another part of the modules can be regulated. Accordingly, temperatures of the modules M1, M2 in the battery pack 100 can be efficiently regulated with an increase in the amount of energy given from the outside limited.

In the present embodiment, the heat transfer between the modules M1, M2 is achieved via the thermoelectric element 40. Accordingly, the module having a low temperature before performing the heat transfer can be warmed up to a higher temperature than the module serving as a heat source.

The heat medium pumps 11a, 11b, the three-way valves 14e to 14h, and the thermoelectric element 40 of the present embodiment constitute a heat transfer means that transfers the heat of a part of the modules M1, M2 to another part of the modules.

Eighth Embodiment

An eighth embodiment will be described in reference to FIG. 41. A temperature regulating device 1 of the present embodiment regulates temperatures of modules M1 to M3 constituting a battery pack 100 using air as a heat medium. An air passage (not shown) through which air can flow is formed inside each of the modules M1 to M3 of the present embodiment.

Figure 41:
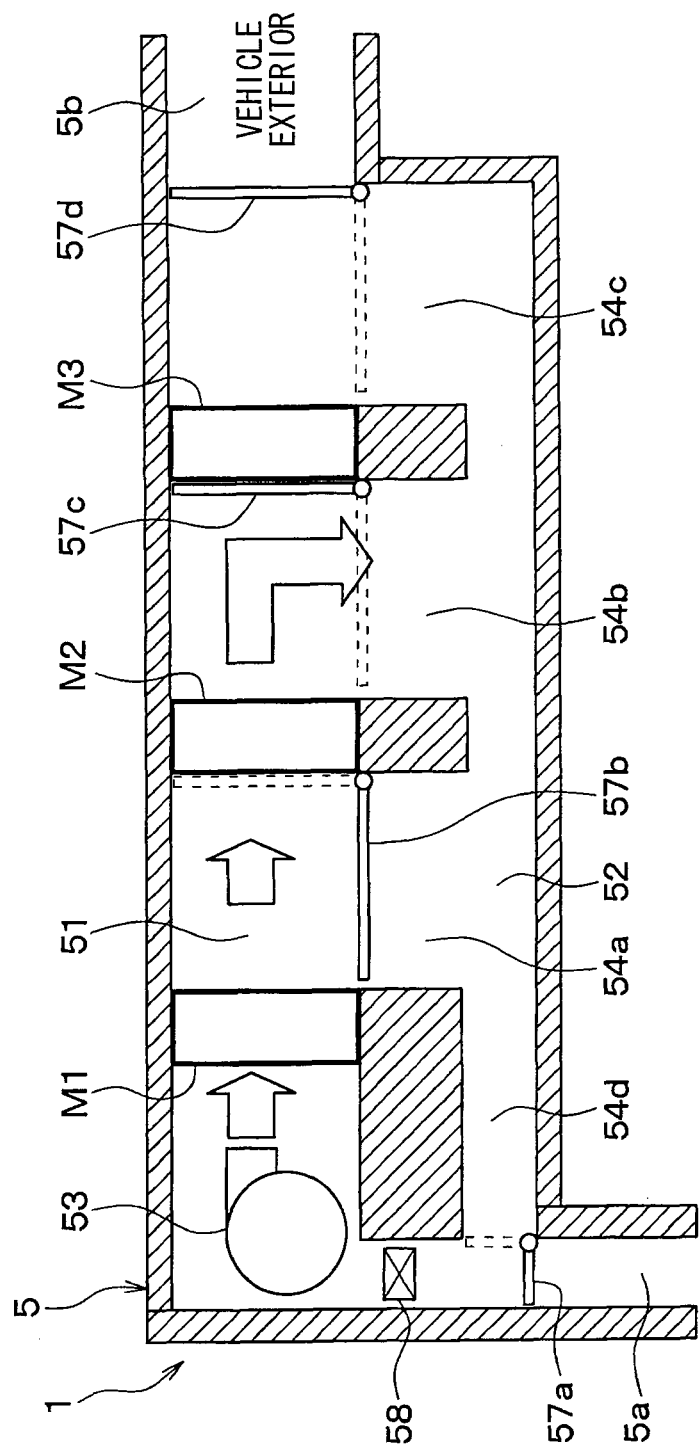
FIG. 41 is a diagram illustrating an entire configuration of a temperature regulating device in accordance with an eighth embodiment.

As illustrated in FIG. 41, the temperature regulating device 1 of the present embodiment includes a casing 5 defining an air passage for a flow of air whose temperature is regulated by such as a refrigeration cycle for air-conditioning the vehicle interior. An inlet 5*a* for introducing air into the casing 5, and an outlet 5*b* for guiding the air in the casing 5 to the outside of the vehicle are formed through this casing 5.

A first air passage 51 through which air flows toward the modules M1 to M3 of the battery pack 100, and a second air passage 52 for returning the air which has passed through the first to third modules M1 to M3 to an upstream side of the first to third modules M1 to M3 are formed inside the casing 5. The air passages 51, 52 formed in the casing 5 constitute a heat medium circuit in which air as a heat medium flows.

The modules M1 to M3 of the battery pack 100 are arranged side by side along the first air passage 51 in order of the first module M1, the second module M2, and the third module M3 in an air flow direction. A heat source (e.g., heat exchanger in which high-pressure refrigerant or low-pressure refrigerant in a refrigeration cycle for air-conditioning the vehicle interior flows) 58 for regulating the temperature of the air introduced from the inlet 5*a*; and a blower 53 for blowing the air toward the modules M1 to M3 are arranged in the first air passage 51 on the upstream side of the first module M1.

The second air passage 52 communicates with the first air passage 51 through a first communicating passage 54*a* which is formed in the first air passage 51 between the first module M1 and the second module M2. The second air passage 52 communicates with the first air passage 51 through a second communicating passage 54*b* which is formed in the first air passage 51 between the second module M2 and the third module M3. The second air passage 52 communicates with the first air passage 51 through a third communicating passage 54*c* which is formed in the first air passage 51 between the third module M3 and the outlet 5*b*. Furthermore, the second air passage 52 communicates with the upstream side of the heat source 58 in the air flow direction through a fourth communicating passage 54*d* which is formed between the inlet 5*a* and the heat source 58.

Inside the casing 5, there are arranged a first opening and closing door 57*a* for selectively opening or closing a communication between the inlet 5*a* and the fourth communicating passage 54*d*; a second opening and closing door 57*b* for selectively opening or closing a communication between the air passage formed in the second module M2 and the first communicating passage 54*a*; a third opening and closing door 57*c* for selectively opening or closing a communication between the air passage formed in the third module M3 and the second communicating passage 54*b*; and a fourth opening and closing door 57*d* for selectively opening or closing a communication between the third communicating passage 54*c* and the outlet 5*b*. These opening and closing doors 57*a* to 57*d* are driven by servomotors which are not shown.

Operations of the servomotors of the opening and closing doors 57*a* to 57*d* are controlled by output signals from a control device 60. The opening and closing doors 57*a* to 57*d* constitute the flow passage switching means that switches an air flow passage (heat medium flow passage) in the casing 5.

In the above-configured temperature regulating device 1, for example, in the case of warming-up of the first module M1, the fourth communicating passage 54*d* is closed by the first opening and closing door 57*a*; the first communicating passage 54*a* is closed by the second opening and closing door 57*b*; the second communicating passage 54*b* is closed by the third opening and closing door 57*c*; and the third communicating passage 54*c* is closed by the fourth opening and closing door 57*d*. Then, the blower 53 is operated with an inflow of high-pressure refrigerant or low-pressure refrigerant to the heat source 58 stopped.

Accordingly, warm air heated by such as a refrigeration cycle for air-conditioning the vehicle interior flows into the casing 5 through the inlet 5*a*. Then, the introduced warm air passes through the air passage in the first module M1 via the blower 53, and the first module M1 is heated. The air which has passed through the air passage in the first module M1 flows through the air passages in the second and third modules M2, M3. After that, the air is discharged into the vehicle exterior through the outlet 5*b*.

In the case of the warming-up of the second module M2 when temperature of the first module M1 is higher than temperature of the second module M2, as illustrated in FIG. 41, the inlet 5*a* is closed by the first opening and closing door 57*a*; the first communicating passage 54*a* is closed by the second opening and closing door 57*b*; the air passage formed in the third module M3 is closed by the third opening and closing door 57*c*; and the outlet 5*b* is closed by the fourth opening and closing door 57*d*. Then, the blower 53 is operated with an inflow of high-pressure refrigerant or low-pressure refrigerant to the heat source 58 stopped.

Accordingly, the air blown from the blower 53 passes through the air passage in the first module M1 and absorbs the heat of the first module M1 to have its temperature raised. Then, the air whose temperature has been raised passes through the air passage in the second module M2, and the second module M2 is heated. The air which has passed through the air passage in the second module M2 is drawn into the blower 53 through the second air passage 52 in the casing 5 to be blown toward the first module M1.

As above, warming-up of the second module M2 can be realized by the transfer of heat of the first module M1 to the second module M2 via the blown air. Also, at the same time as the warming-up of the second module M2, the first module M1 can be cooled.

In the case of warming-up of the third module M3 when the temperatures of the first and second modules M1, M2 are higher than the temperature of the third module M3, the inlet 5*a* is closed by the first opening and closing door 57*a*; the first communicating passage 54*a* is closed by the second opening and closing door 57*b*; the second communicating passage 54*b* is closed by the third opening and closing door 57*c*; and the outlet 5*b* is closed by the fourth opening and closing door 57*d*. Then, the blower 53 is operated with an inflow of high-pressure refrigerant or low-pressure refrigerant to the heat source 58 stopped.

Accordingly, the air blown from the blower 53 passes through the air passages in the first and second modules M1, M2 and absorbs the heat of the first and second modules M1, M2 to have its temperature raised. Then, the air whose temperature has been raised passes through the air passage in the third module M3, and the third module M3 is heated. The air which has passed through the air passage in the third module M3 is drawn into the blower 53 through the second air passage 52 in the casing 5 to be blown toward the first module M1.

As above, warming-up of the third module M3 can be realized by the transfer of heat of the first and second modules M1, M2 to the third module M3 via the blown air.

At the same time as the warming-up of the third module M3, the first and second modules M1, M2 can be cooled.

In the case of cooling of the third module M3 when the temperatures of the first and second modules M1, M2 are lower than the temperature of the third module M3, similar to the above-described warming-up of the third module M3, the inlet 5a is closed by the first opening and closing door 57a; the first communicating passage 54a is closed by the second opening and closing door 57b; the second communicating passage 54b is closed by the third opening and closing door 57c; and the outlet 5b is closed by the fourth opening and closing door 57d. Then, the blower 53 is operated with an inflow of high-pressure refrigerant or low-pressure refrigerant to the heat source 58 stopped.

Accordingly, when the air blown from the blower 53 passes through the air passages in the first and second modules M1, M2, the heat of blown air is released to the first and second modules M1, M2 and the blown air is cooled. Then, the cooled air passes through the air passage in the third module M3, and the third module M3 is cooled. The air which has passed through the air passage in the third module M3 is drawn into the blower 53 through the second air passage 52 in the casing 5 to be blown toward the first module M1.

As above, cooling of the third module M3 can be realized by the transfer of cold energy of the first and second modules M1, M2 to the third module M3 via the blown air.

In the temperature regulating device 1 of the above-described present embodiment, through control of the operations of the blower 53 and the opening and closing doors 57a to 57d, by efficient use of the heat of a part of the modules M1 to M3, the temperature of another part of the modules can be regulated. Accordingly, temperatures of the modules M1 to M3 in the battery pack 100 can be efficiently regulated with an increase in the amount of energy given from the outside limited.

The blower 53 and the opening and closing doors 57a to 57d of the present embodiment constitute a heat transfer means that transfers the heat of a part of the modules M1 to M3 to another part of the modules.

In the present embodiment, it is illustrated that by efficient use of the heat of a part of the modules M1 to M3, the temperature of another part of the modules is regulated. However, as a matter of course, the temperatures of the modules M1 to M3 can be regulated using the heat of the heat source 58.

The embodiments have been described above. Nevertheless, the present disclosure is not limited to these embodiments. Without departing from the scope of recitation of claims, the present disclosure is not limited to wording recited in claims and covers a range in which they can easily be replaced by a person skilled in the art. Furthermore, improvement based on knowledge usually possessed by a person skilled in the art can suitably be added to the present disclosure. For example, the present disclosure can be variously modified as follows.

(1) In the above embodiments, the temperature regulation processes at the time of discharge from the modules M1 to M3 constituting the battery pack 100 have been described. However, instead of these, for example, temperature regulation processes at the time of charging of the modules M1 to M3 can be carried out similarly.

(2) In the above embodiments, it is illustrated that discharges from the modules are performed in predetermined order and that warming-up of the modules is carried out in accordance with this order of discharge. However, the present disclosure is not limited to these.

For example, if the amounts of electricity stored in the modules M1 to M3 are different in the first embodiment and so forth, the module with the larger amount of stored electricity than the module being used may be used in priority by regulating the amounts of the heat media flowing into the heat medium passages of the modules. Accordingly, the heat of the module being used can be transferred preferentially to the module with the larger amount of stored electricity. In addition, determination of the order of use of the modules M1 to M3 is made by the use battery determination means 60a in the control device 60.

(3) In the above-described first embodiment, for example, it is illustrated that the heat of the third module M3 is released to the outside air through the outdoor heat exchanger 3 in the cooling process of the third module M3. However, the present disclosure is not limited to this. For example, when the temperatures of the first and second modules M1, M2 are lower than the third module M3, the third module M3 may be cooled by the transfer of heat of the third module M3 to the first and second modules M1, M2.

(4) In the above-described first embodiment, it is illustrated that, for example, of the modules M1 to M3, the heat of one module is transferred to another module. However, the present disclosure is not limited to this.

For example, of the modules M1 to M3, the heat of two or more modules may be transferred to another module; the heat of two or more modules may be transferred to the other two or more modules; or the heat of one module may be transferred to the other two or more modules.

If, of the modules M1 to M3, there are more than one module (transfer destination module) to which the heat of the module is transferred, the transfer destination module having the larger amount of heat that is exchanged with the module serving as a heat source, may be determined to be a module that is to be subsequently used. In addition, the determination of the order of use of the modules M1 to M3 is carried out by the use battery determination means 60a in the control device 60.

Moreover, the heat may be transferred preferentially to the module of the transfer destination modules that has the larger amount of stored electricity by regulating the amounts of the heat media flowing into the transfer destination modules.

(5) In the above-described fourth to sixth embodiments, it is illustrated that the vapor-compression type refrigeration cycle 30 is employed for the heat transfer means. However, instead of these, for example, an adsorption-type refrigeration cycle or an absorption-type refrigeration cycle may be used for the heat transfer means.

(6) In the above embodiments, there is described an example of temperature regulation of the battery pack 100 which is constituted of the two modules M1, M2, or the three modules M1 to M3 by the temperature regulating device 1. However, instead of these, temperature of the battery pack 100 constituted of four or more modules may be regulated.

(7) In the above embodiments, there is described an example of application of the battery temperature regulating device 1 of the present disclosure to the regulation of temperature of the battery pack 100 disposed in the vehicle. However, instead of these, for example, the battery temperature regulating device 1 of the present disclosure may be applied to the battery pack 100 which is used in a household, factory or the like.

(8) The above embodiments can be used suitably in combination to the extent possible.

While the present disclosure has been described with reference to embodiments thereof, it is to be understood that the disclosure is not limited to the embodiments and constructions. The present disclosure is intended to cover various modifications and equivalent arrangements. In addition, while the various combinations and configurations, other combinations and configurations, including more, less or only a single element, are also within the spirit and scope of the present disclosure.

The invention claimed is:

1. A battery temperature regulating device adapted for a battery pack that is configured by parallely connecting a plurality of battery groups, each of which is a series connection of a plurality of battery cells capable of charge and discharge, the device configured to regulate temperatures of the plurality of battery groups, the battery temperature regulating device comprising a heat transfer means for transferring heat from a first part of the plurality of battery groups to a second part of the plurality of battery groups, the second part of the plurality of battery groups having a larger amount of stored electricity than the first part of the plurality of battery groups; wherein
the first part of the plurality of battery groups includes a currently-used one of the plurality of battery groups;
the second part of the plurality of battery groups includes one of the plurality of battery groups having a larger amount of stored electricity than the currently-used one of the plurality of battery groups; and
the heat transfer means begins transferring the heat of the first part of the plurality of battery groups to the second part of the plurality of battery groups when an amount of electricity stored in the first part of the plurality of battery groups becomes smaller than a predetermined reference amount, and
the first part of the plurality of battery groups discharges electricity during the transferring of the heat from the first part of the plurality of battery groups to the second part of the plurality of battery groups.

2. The battery temperature regulating device according to claim 1, further comprising a use battery determination means for determining one of the plurality of battery groups that is to be subsequently-used, wherein the use battery determination means determines one of the second part of the plurality of battery groups having the largest amount of heat that is exchanged with the first part of the plurality of battery groups to be the one of the plurality of battery groups that is to be subsequently-used.

3. The battery temperature regulating device according to claim 1, wherein:
the heat transfer means includes a refrigeration cycle having an evaporation means for evaporating refrigerant, and a heat release means; and
the evaporation means exchanges heat between low-pressure refrigerant and the first part of the plurality of battery groups via a heat medium to absorb heat from the first part of the plurality of battery groups, and the heat release means exchanges heat between high-pressure refrigerant and the second part of the plurality of battery groups via the heat medium, so that the heat transfer means transfers the heat of the first part of the plurality of battery groups to the second part of the plurality of battery groups.

4. The battery temperature regulating device according to claim 1, wherein:
the heat transfer means includes a thermoelectric element having a heat release part that releases heat upon energization thereof and a heat absorption part that absorbs heat upon energization thereof;
the heat absorption part absorbs heat from the first part of the plurality of battery groups via a heat medium; and
the heat release part releases the heat to the second part of the plurality of battery groups via the heat medium.

5. The battery temperature regulating device according to claim 1, wherein:
the heat transfer means is disposed in a heat medium circuit through which a heat medium flows;
the heat transfer means includes a flow passage switching means for switching a heat medium flow passage in the heat medium circuit; and
the flow passage switching means is configured to be capable of switching the heat medium flow passage to guide the heat medium, which absorbs the first heat of the part of the plurality of battery groups, into the second part of the plurality of battery groups.

6. The battery temperature regulating device according to claim 1, wherein:
the heat transfer means includes a refrigeration cycle having an evaporation means for evaporating refrigerant, and a heat release means; and
the evaporation means exchanges heat between low-pressure refrigerant and the first part of the plurality of battery groups via a heat medium to absorb heat from the first part of the plurality of battery groups, and the heat release means exchanges heat between high-pressure refrigerant and the second part of the plurality of battery groups via the heat medium, so that the heat transfer means transfers the heat of the first part of the plurality of battery groups to the second part of the plurality of battery groups.

7. The battery temperature regulating device according to claim 2, wherein:
the heat transfer means includes a refrigeration cycle having an evaporation means for evaporating refrigerant, and a heat release means; and
the evaporation means exchanges heat between low-pressure refrigerant and the first part of the plurality of battery groups via a heat medium to absorb heat from the first part of the plurality of battery groups, and the heat release means exchanges heat between high-pressure refrigerant and the second part of the plurality of battery groups via the heat medium, so that the heat transfer means transfers the heat of the first part of the plurality of battery groups to the second part of the plurality of battery groups.

8. The battery temperature regulating device according to claim 2, wherein:
the heat transfer means includes a thermoelectric element having a heat release part that releases heat upon energization thereof and a heat absorption part that absorbs heat upon energization thereof;
the heat absorption part absorbs heat from the first part of the plurality of battery groups via a heat medium; and
the heat release part releases heat to the second part of the plurality of battery groups via the heat medium.

9. The battery temperature regulating device according to claim 2, wherein:
the heat transfer means includes a thermoelectric element having a heat release part that releases heat upon energization thereof and a heat absorption part that absorbs heat upon energization thereof;
the heat absorption part absorbs heat from the first part of the plurality of battery groups via a heat medium; and
the heat release part releases heat to the second part of the plurality of battery groups via the heat medium.

10. The battery temperature regulating device according to claim 2, wherein:
- the heat transfer means is disposed in a heat medium circuit through which a heat medium flows;
- the heat transfer means includes a flow passage switching means for switching a heat medium flow passage in the heat medium circuit; and
- the flow passage switching means is configured to be capable of switching the heat medium flow passage to guide the heat medium, which absorbs the heat of the first part of the plurality of battery groups, into the second part of the plurality of battery groups.

11. The battery temperature regulating device according to claim 1, wherein the heat transfer means stops the transferring of heat when the second part of the plurality of battery groups reaches a specified temperature.

12. A battery temperature regulating device in combination with a battery pack, the battery pack comprising:
- a plurality of battery groups connected in parallel, each of the plurality of battery groups including a plurality of battery cells connected in series; wherein
- the plurality of battery cells are capable of being charged and discharged;
- the battery temperature regulating device configured to regulate temperatures of the plurality of battery groups, the battery temperature regulating device comprising:
- a heat transfer device transferring heat from a first part of the plurality of battery groups to a second part of the plurality of battery groups; wherein
- the second part of the plurality has a larger amount of stored electricity than an amount of stored electricity than the first part of the plurality of battery groups;
- the heat transfer device begins transferring the heat of the first part of the plurality of battery groups to the second part of the plurality of battery groups when an amount of energy stored in the first part of the plurality of groups becomes smaller than a predetermined reference amount; and
- the first part of the plurality of battery groups discharges electricity during the transferring of the heat from the first part of the plurality of battery groups to the second part of the plurality of battery groups.

13. The battery temperature regulating device according to claim 12, wherein the heat transfer means stops the transferring of heat when the second part of the plurality of battery groups reaches a specified temperature.

* * * * *